United States Patent
Wang et al.

(10) Patent No.: US 11,800,488 B2
(45) Date of Patent: Oct. 24, 2023

(54) PAGING TRANSMISSION ON SIDELINK

(71) Applicant: QUALCOMM Incorporated, San Diego, CA (US)

(72) Inventors: Kaidong Wang, San Diego, CA (US); Jelena Damnjanovic, Del Mar, CA (US); Junyi Li, Fairless Hills, PA (US); Tao Luo, San Diego, CA (US); Jing Sun, San Diego, CA (US); Juan Montojo, San Diego, CA (US); Sony Akkarakaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/457,847

(22) Filed: Dec. 6, 2021

(65) Prior Publication Data

US 2022/0182971 A1    Jun. 9, 2022

Related U.S. Application Data

(60) Provisional application No. 63/123,369, filed on Dec. 9, 2020, provisional application No. 63/123,398, filed on Dec. 9, 2020, provisional application No. 63/123,390, filed on Dec. 9, 2020.

(51) Int. Cl.
*H04W 68/00* (2009.01)
*H04W 4/00* (2018.01)
*H04W 56/00* (2009.01)
*H04W 92/18* (2009.01)

(52) U.S. Cl.
CPC ..... *H04W 68/005* (2013.01); *H04W 56/0015* (2013.01); *H04W 92/18* (2013.01)

(58) Field of Classification Search
CPC ............. H04W 68/005; H04W 56/0015; H04W 92/18
USPC ........................................... 455/458
See application file for complete search history.

(56) References Cited

U.S. PATENT DOCUMENTS

| | | | | |
|---|---|---|---|---|
| 2010/0151865 A1* | 6/2010 | Camp, Jr. | ........... | H04W 72/046 455/445 |
| 2010/0203905 A1* | 8/2010 | Chaubey | ............... | H04W 68/00 455/458 |
| 2019/0045559 A1* | 2/2019 | Huang | ................ | H04B 17/318 |
| 2019/0053234 A1* | 2/2019 | Cui | ................... | H04W 72/0446 |
| 2019/0313260 A1* | 10/2019 | Zhang | ..................... | H04W 4/70 |
| 2019/0387498 A1* | 12/2019 | Li | ......................... | H04W 68/08 |
| 2020/0084747 A1* | 3/2020 | Hong | .................... | H04W 72/23 |

(Continued)

*Primary Examiner* — Mark G. Pannell
(74) *Attorney, Agent, or Firm* — Procopio, Cory, Hargreaves & Savitch

(57) ABSTRACT

A target user equipment (UE) may receive, from each relay UE of a set of relay UEs, a synchronization signal block (SSB) through each transmit beam of a set of transmit beams from the UE through each receive beam of a set of receive beams at the target UE. The relay UE may transmit the paging message through each transmit beam of the set of transmit beams. The target UE may determine a beam pair based on the received SSB, and receive the paging messaged using the beam pair. The target UE may also receive, from a relay UE, a paging message through one or more sidelink channels from each transmit beam of a set of transmit beams of the relay UE through each receive beam of a set of receive beams at the target UE and decode the received paging message.

29 Claims, 39 Drawing Sheets

(56) References Cited

U.S. PATENT DOCUMENTS

| | | | |
|---|---|---|---|
| 2020/0145080 A1* | 5/2020 | Tang | H04B 7/0695 |
| 2021/0099994 A1* | 4/2021 | Park | H04L 1/1812 |
| 2021/0250896 A1* | 8/2021 | Kim | H04W 68/005 |
| 2021/0258057 A1* | 8/2021 | Kim | H04B 17/318 |
| 2021/0258065 A1* | 8/2021 | Wang | H04W 56/001 |
| 2022/0060221 A1* | 2/2022 | Ko | H04L 5/0051 |
| 2022/0124475 A1* | 4/2022 | Kang | H04W 72/20 |
| 2023/0082719 A1* | 3/2023 | Rusek | H04W 52/0229 |

* cited by examiner

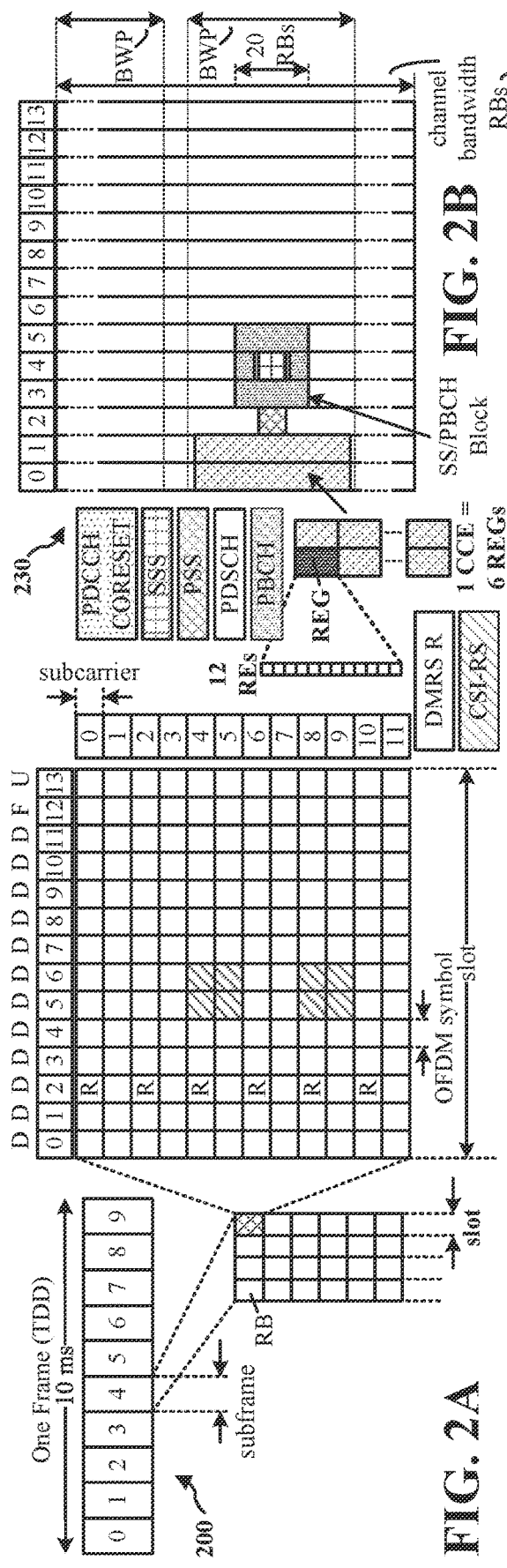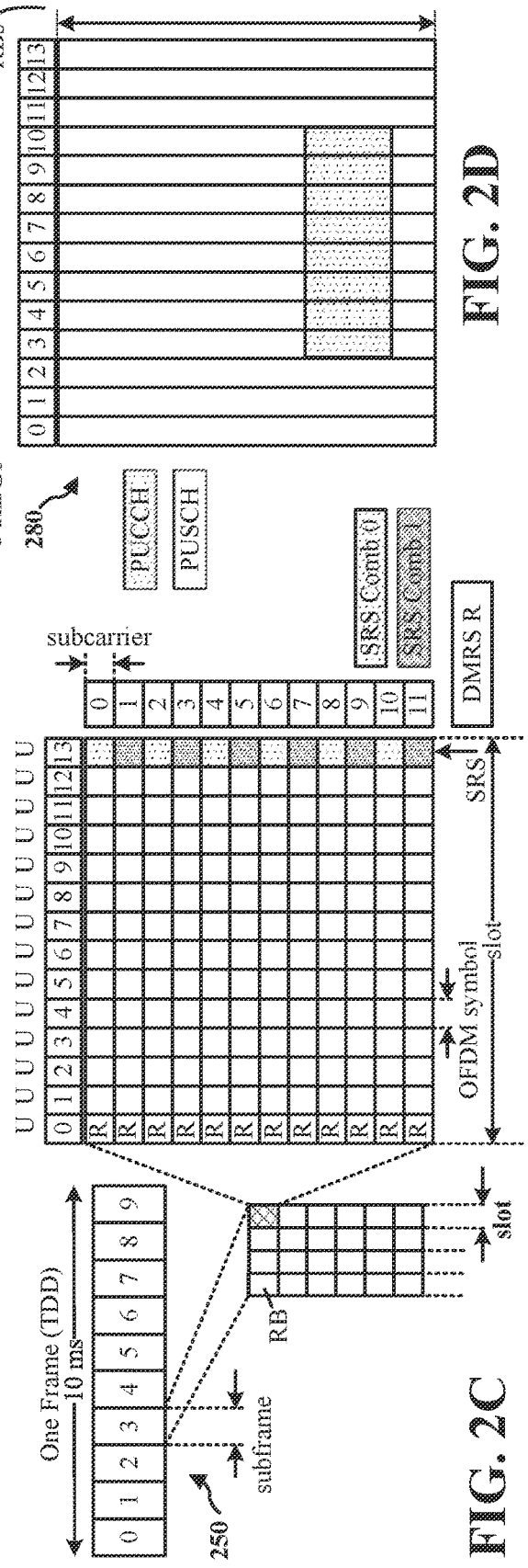

PAGING TRANSMISSION ON SIDELINK

CROSS REFERENCE TO RELATED APPLICATION(S)

This application claims the benefit of and priority to U.S. Provisional Application Ser. No. 63/123,369, entitled "METHOD AND APPARATUS FOR PAGING TRANSMISSION ON SIDELINK" and filed on Dec. 9, 2020, U.S. Provisional Application Ser. No. 63/123,390, entitled "METHODS AND APPARATUS FOR BEAM MANAGEMENT AND PAGING ON SIDELINK" and filed on Dec. 9, 2020, and U.S. Provisional Application Ser. No. 63/123,398, entitled "METHODS AND APPARATUS FOR PAGING ON SIDELINK" and filed on Dec. 9, 2020, each of which is expressly incorporated by reference herein in its entirety.

TECHNICAL FIELD

The present disclosure generally relates to communication systems, and more particularly, to a method for transmitting a paging message utilizing sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. A target user equipment (UE) may receive, from each relay UE of a set of relay UEs, a synchronization signal block (SSB) through each transmit beam of a set of transmit beams from the UE through each receive beam of a set of receive beams at the target UE. The relay UE may transmit the paging message through each transmit beam of the set of transmit beams. The target UE may determine a beam pair based on the received SSB, and receive the paging messaged using the beam pair.

The target UE may also receive, from a relay UE, a paging message through one or more sidelink channels from each transmit beam of a set of transmit beams of the relay UE through each receive beam of a set of receive beams at the target UE and decode the received paging message.

The set of transmit beams may include N transmit beams and the set of receive beams may include M receive beams. The set of transmit beams may include the beam s $t_1, t_2, \ldots, t_N$, and the set of receive beams may include the beams $r_1, r_2, \ldots, r_M$.

The target UE may receive, for each transmit beam of the N transmit beams, the paging message from a same transmit beam M times through each receive beam of the M receive beams, and the target UE may receive the paging messages from the relay UE may include receiving, for each of $i=1, 2, \ldots, N$, the paging message through beam pair $t_i$-$r_j$ for $j=1, 2, \ldots, M$.

The target UE may receive, for each receive beam of the M receive beams, the paging message through the receive beam from a different transmit beam of the N transmit beams, and the target UE may receive the paging messages from the relay UE may include receiving, for each of $j=1, 2, \ldots, M$, the paging message through beam pair $t_i$-$r_j$ for $i=1, 2, \ldots, N$.

The set of transmit beams may include N transmit beams and the set of receive beams may include one receive beam. The set of transmit beams may include the beams $t_1, t_2, \ldots, t_N$, and the set of receive beams may include the beam r. The target UE may receive the paging message from each transmit beam of the N transmit beams through the one receive beam, and the target UE may receive the paging message through beam pair $t_i$-r for $i=1, 2, \ldots, N$.

In response to receiving and decoding the paging message, the target UE may transmit, to the relay UE, an accept message indicating at least one transmit beam of the set of transmit beams. The target UE may also refine the receive beam by changing the receive beam.

In an aspect of the disclosure, a method, a computer-readable medium, and an apparatus are provided. The method of wireless communication, including sidelink communication, may include a base station, a relay UE, and a target UE. The relay UE may transmit, to the target UE, an SSB through each transmit beam of a set of transmit beams at the relay UE for each receive beam of a set of receive beams at the target UE, and the target UE may receive the SSB through each transmit beam of a set of transmit beams from a relay UE through each receive beam of a set of receive beams at the target UE.

The target UE may determine, based on the received SSBs, a transmit-beam receive-beam pair including one transmit beam from the set of transmit beams and one receive beam from the set of receive beams. The target UE may report the one transmit beam associated with the determined transmit-beam receive-beam pair to the relay UE. The relay UE may determine whether a reporting is received from the target UE indicating one transmit beam associated with a transmit-beam receive-beam pair based on the transmitted SSBs. The reporting may include a beam measurement report associated with the one transmit beam of the transmit-beam receive-beam pair. The reporting may include information indicating the one transmit beam associated with the transmit-beam receive-beam pair. The reporting may include at least one of layer-1 signaling, layer-2 signal, or layer-3 signaling.

The relay UE may transmit the paging message through one or more sidelink channels via the at least one transmit beam. In response to determining that the reporting is not received from the target UE, the paging message is transmitted N times through each transmit beam of the set of transmit beams. In response to determining that the reporting is received from the target UE, the paging message is transmitted once through the one transmit beam based on the received reporting. The target UE may receive the paging message through one or more sidelink channels via at least the determined transmit-beam receive-beam pair through the determined transmit-beam receive-beam pair.

The relay UE may receive, from a base station, a paging relay request message including the paging message for the target UE, the paging relay request message requesting the relay UE to transmit the paging message to the target UE based on the received paging relay request message.

In an aspect of the disclosure, a method, a computer-readable medium, and an apparatus are provided. A relay UE may generate an SSB indicating a sidelink synchronization identity (SSID) and a sidelink master information block (MIB-SL) including information indicating whether the relay UE can be a relay UE. The relay UE may transmit the SSB to a target UE. The target UE may receive, from each UE of a set of UEs, one or more SSBs, each of the one or more SSBs including information indicating one of whether the UE can be a relay UE or an SSID associated with the UE, determine a subset of UEs of the set of UEs based on the received one or more SSBs and the information indicating one of whether the UE can be a relay UE or the SSID from each UE of the set of UEs.

Each of the one or more SSBs from each UE in the set of UEs may include information indicating the SSID associated with the UE. The target UE may determine whether the SSID information in the one or more SSBs have a matching SSID information in a relay UE SSID list at the target UE. The target UE may determine the subset of UEs in response to determining that the SSID information in the SSB from each UE of the subset of UEs has matching SSID information in a relay UE SSID list at the target UE.

Each of the one or more SSBs from each UE in the set of UEs may include information indicating whether the UE can be a relay UE. The SSB from each UE of the set of UEs may include, and the MIB-SL may indicate either that the UE is not a relay UE or can be a relay UE. The MIB-SL may be received in a physical sidelink broadcast channel (PSBCH) within the SSB. The target UE may determine the subset of UEs of the set of UEs in response determining that the SSBs for each UE in the subset of UEs includes information indicating that the UE can be a relay UE.

The target UE may also determine whether the SSB has a reference signal received power (RSRP), a reference signal received quality (RSRQ), a signal-to-interference plus noise ratio (SINR), or a signal-to-noise ratio (SNR) greater than a threshold.

Accordingly, the target UE may determine to monitor the SSB beam from each UE of the set of UEs based on the MIB-SL, the SSID, and the metric of the SSB, and monitor the SSBs from the subset of UEs based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
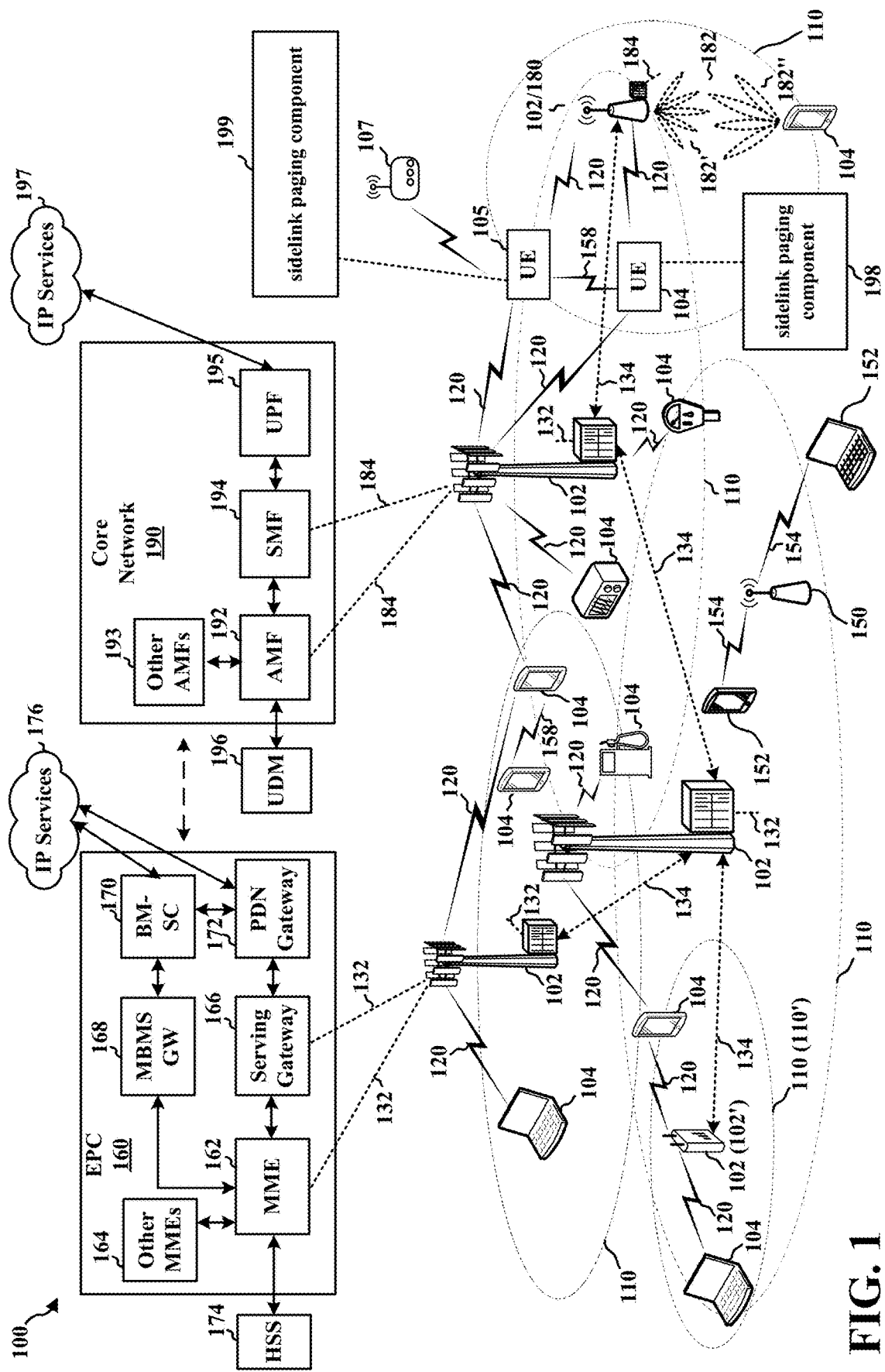
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104 and 105, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE may be a relay UE 104 including a sidelink paging component 198 configured to transmit paging message to a target UE 105 on the sidelink communication. In certain aspects, the UE may be a target UE 105 including a sidelink paging component 199 configured to receive the paging message from the relay UE 104 on the sidelink communication.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ lots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
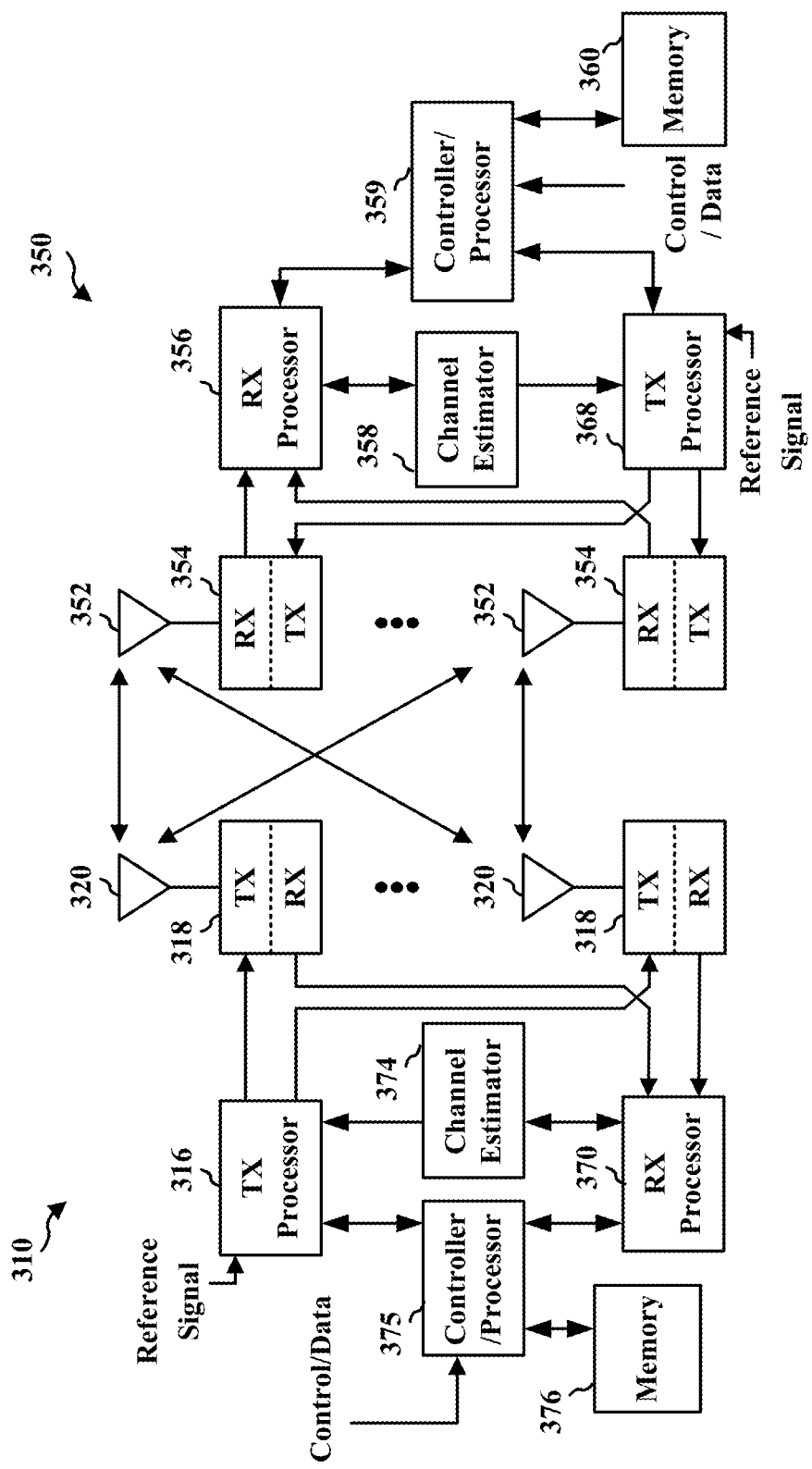
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink paging component 198 of the relay UE 104 of FIG. 1. At least one of the TX processor 368, the RX processor 356, and the controller/processor 359 may be configured to perform aspects in connection with the sidelink paging component 199 of the target UE 105 of FIG. 1.

Figure 4:
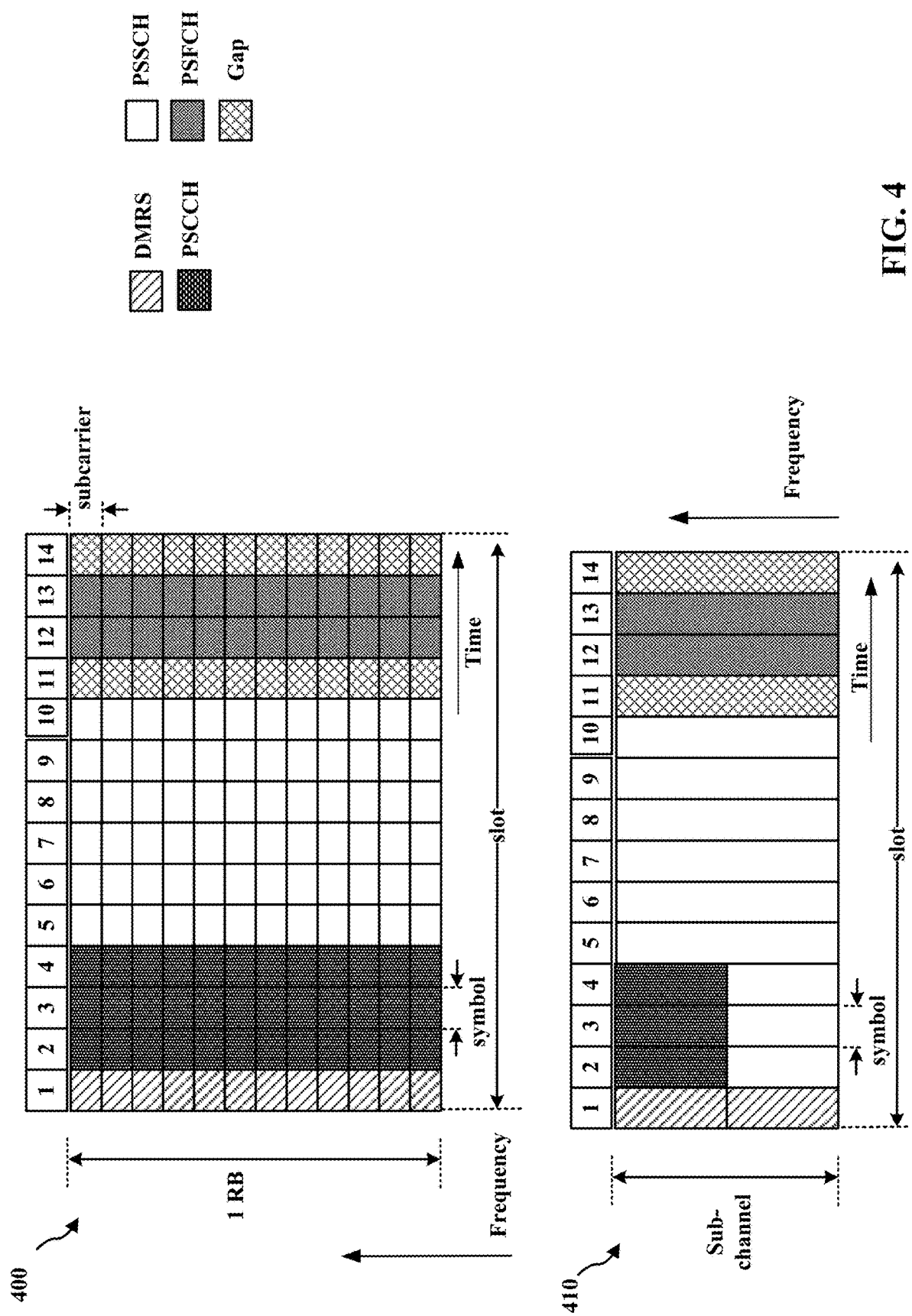
FIG. 4 illustrates examples of a sidelink slot structure.

FIG. 4 illustrates example diagrams 400 and 410 of example slot structures that may be used for sidelink communication (e.g., between the relay UE 104, the target UE 105, RSU 107, etc.). The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have different frame structures and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single slot transmission, e.g., which may correspond to a 0.5 ms transmission time interval (TTI). In some examples, slots may be aggregated, e.g., an aggregation of two 0.5 ms TTIs. Diagram 200 illustrates a single RB, whereas diagram 410 illustrates multiple RBs.

A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH, and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some examples.

Figure 5:
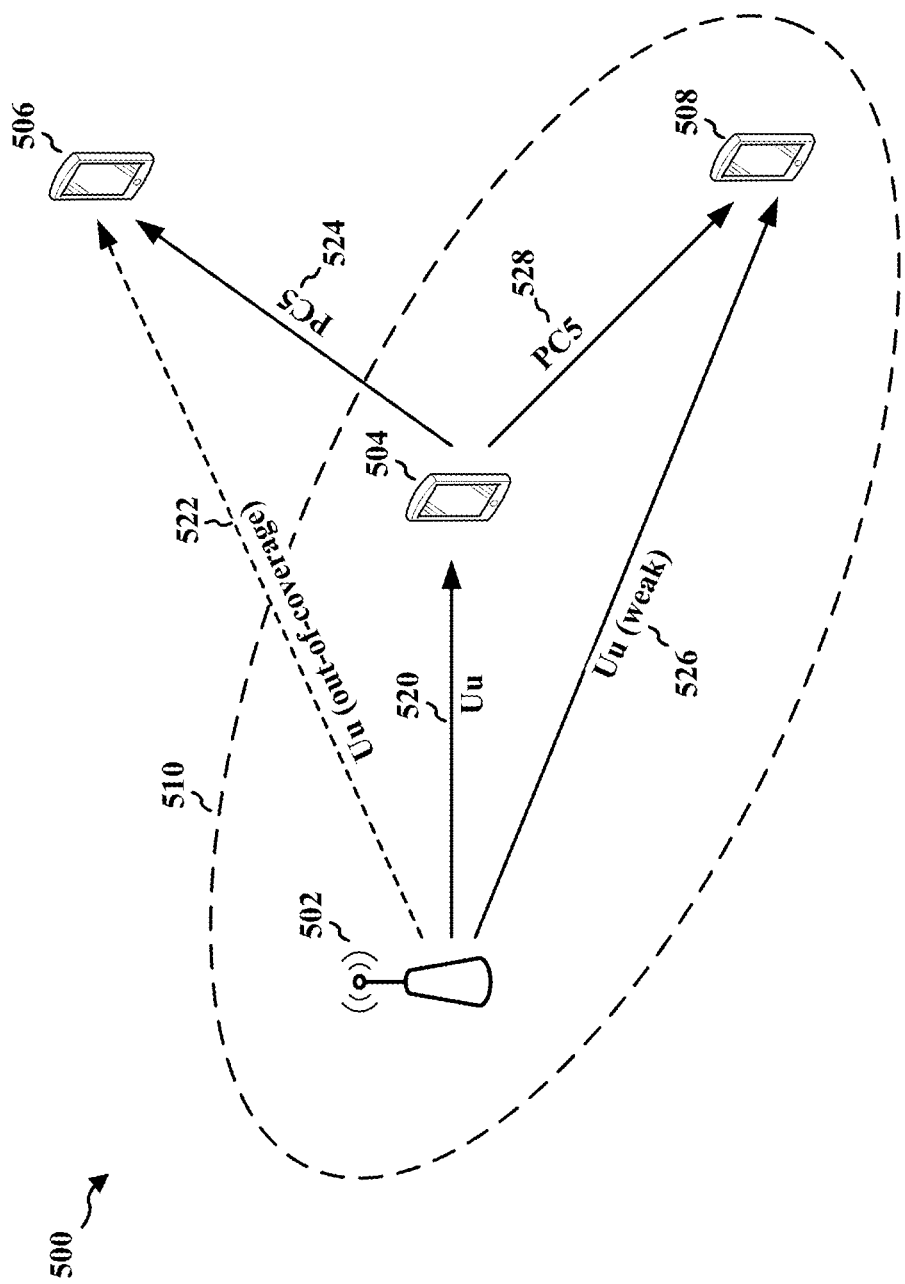
FIG. 5 illustrates an example of wireless communication.

FIG. 5 illustrates an example 500 of wireless communication. The example 500 of the wireless communication may include a base station 502 and UEs including a relay UE 504, a first target UE 506, and a second target UE 508. In some aspects, when the UEs do not have any ongoing data transmissions with the base station 502 or with each other, the UEs may enter an IDLE state or an INACTIVE state. When the base station 502 receives new data to be transmitted to at least one of the UEs in the IDLE state or the INACTIVE state, the base station 502 may transmit a paging message to the UEs in the IDLE state, so the UEs in the IDLE state or the INACTIVE state may respond corresponding to a type of the paging message sent from the base station 502 to the UE in the IDLE state or the INACTIVE state. The paging message may be transmitted for various purposes. For example, the base station 502 may transmit the paging message to trigger an RRC setup, modify system information, and/or broadcast an emergency message such as an earthquake and tsunami warning system (ETWS)/commercial mobile alert system (CMAS) message.

The base station 502 may transmit the paging message to the relay UE 504 that is in the IDLE state or INACTIVE state through the Uu interface. The base station may also transmit the paging message to the first target UE 506 and/or the second target UE 508 that are in the IDLE state or INACTIVE state through the Uu interface.

In some aspects, the base station 502 may not be able to successfully transmit the paging message to the first target UE 506 and/or the second target UE 508 due to the status of the Uu interface between the base station 502 and the first target UE 506 and/or the second target UE 508 that are in the IDLE state or INACTIVE state.

In some aspects, the first target UE 506 may be out-of-coverage, where the base station 502 cannot page the first target UE 506. That is, the base station 502 may determine to transmit the paging message to the first target UE 506 and attempt to transmit the paging message to the first target UE 506 through the Uu interface 522 between the base station 502 and the first target UE 506. However, the first target UE 506 may be outside the coverage 510 of the base station 502, and the base station 502 may not successfully transmit the paging message to the first target UE 506 that is outside the coverage 510 of the base station 502.

Accordingly, the base station 502 may ask the relay UE 504 to forward the paging message to reach the first target UE 506. The relay UE 504 may send the paging message to the target UE on the sidelink. That is, the base station 502 may transmit a paging relay request message to the relay UE 504 through the Uu interface 520 and request the relay UE 504 to transmit the paging message to the first target UE 506 through a PC5 interface 524 of sidelink communication.

In some aspects, the transmission of the paging message may fail due to a channel state of the Uu interface 526 between the base station 502 and the UE. That is, the base station 502 may determine to transmit the paging message to the second target UE 508 and attempt to transmit the paging message to the second target UE 508. However, the second target UE 508 may be located close to the boundary of the coverage of the base station 502, or the signal may be physically blocked by interferences, and the connection between the base station 502 and the second UE through the Uu interface may have a weak or low signal level and/or high noise level. Therefore, the transmission of the paging message to the second target UE 508 may have high latency or may not be successfully transmitted to the second target UE 508.

Accordingly, the paging may utilize signal diversity by a repetition of the paging message to the second target UE 508 via a sidelink communication and thus reduce the latency. That is, the base station 502 may transmit the paging relay request message to the relay UE 504 through the Uu interface 520 and request the relay UE 504 to transmit the paging message to the second target UE 508 through the PC5 interface 528 of sidelink communication.

In some aspects, the designs of the paging message dedicated to the Uu interface, the direct link between the base station 502 and the UEs, may be used to transmit the paging message between the base station 502 and the UEs, and the design of the paging message on the sidelink (PC5 interface), i.e., the link between the relay UE 504 and the target UEs may be used to transmit the paging message between the relay UE 504 and the target UEs.

The relay UE and the target UE may not have an established relay association. That is, the target UE may not know which relay UE may transmit the paging message to the target UE. In some aspects, the relay UE may periodically or aperiodically sweep the transmit beam to transmit the paging message to the target UE without the relay association.

Figure 6:
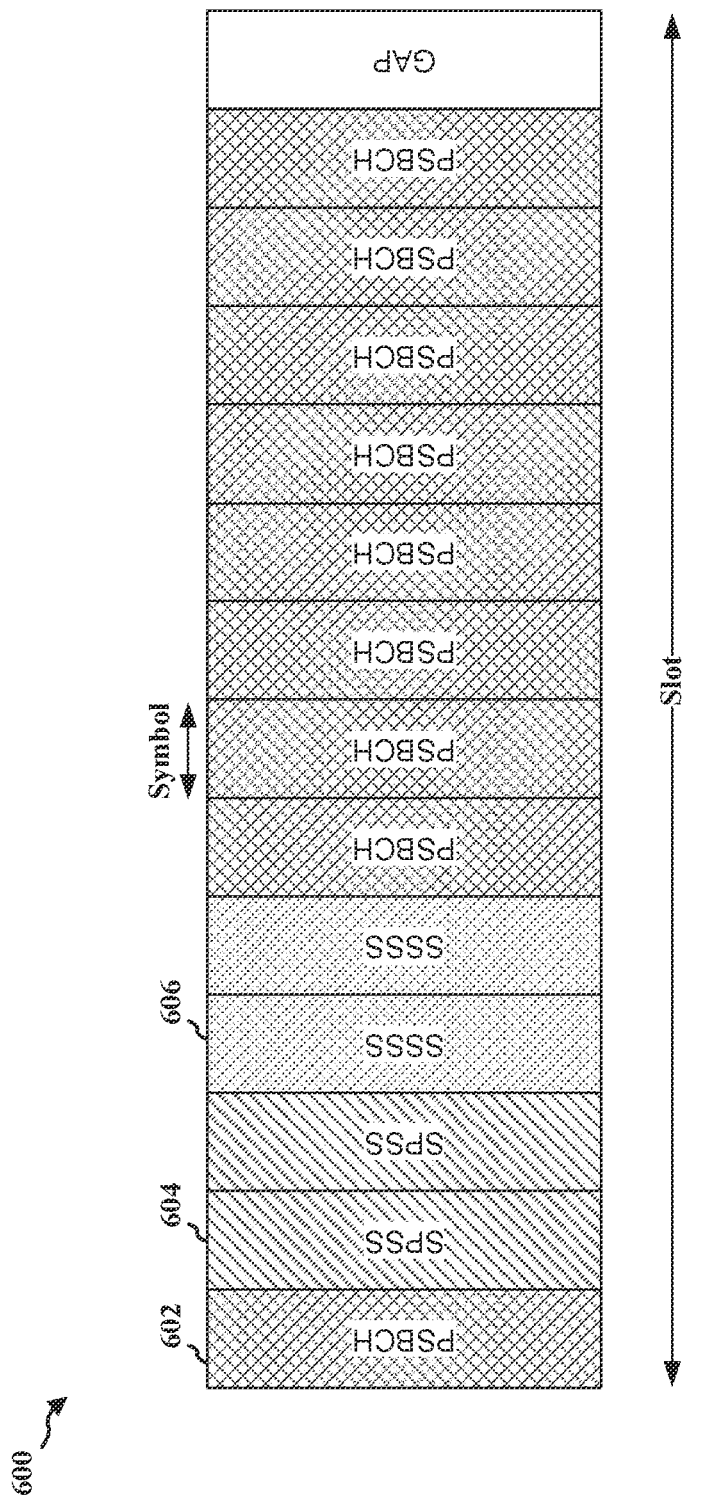
FIG. 6 illustrates an example of a slot format of the SSB.

FIG. 6 illustrates an example of a slot format 600 of the SSB. The SSB may include symbols for one of a physical sidelink broadcast channel (PSBCH) 602, a sidelink primary synchronization signal (SPSS) 604, and a sidelink secondary synchronization signal (SSSS) 606. For example, the example of the slot format 600 illustrates that the SSB includes seven symbols of PSBCH 602, two symbols of SPSS 604, and two symbols of SSSS 606. However, the examples are not necessarily limited thereto, and the slot format of the SSB may include different numbers of symbols allocated for the PSBCH 602, SPSS 604, and SSSS 606. The SSB may be transmitted periodically. For example, the SSB may be transmitted periodically at every 160 ms.

The PSBCH 602 may include a direct frame number (DFN), an indication of the slot, a symbol level time resources for sidelink transmissions, in-coverage indicator, etc. In some aspects, the PSBCH 602 may transmit the SL-BCH transport channel, which carries a sidelink master information block (MIB-SL) from the RRC layer.

The relay UE may receive an sidelink synchronization identity (SSID) $N_{ID}^{SL}$ from the base station. The base station may configure the SSID $N_{ID}^{SL}$ and transmit the SSID $N_{ID}^{SL}$ to the relay UE. There may be 672 unique SSIDs given based on $N_{ID}^{SL}=N_{ID,1}^{SL}+336 N_{ID,2}^{SL}$, where $N_{ID,1}^{SL} \in \{0, 1, \ldots, 335\}$ and $N_{ID,2}^{SL} \in \{0, 1\}$. The relay UE may receive the SSID from the base station and generate the SPSS 604 sequence and the SSSS 606 sequence. That is, the relay UE may generate two (2) SPSS 604 sequences based on the $N_{ID,2}^{SL} \in \{0, 1\}$ of the SSID, and 336 SSSS 606 sequences based on $N_{ID,1}^{SL} \in \{0, 1, \ldots, 335\}$ of the SSID received from the base station. The relay UE may detect the SPSS 604 and the SSSS 606 in the received SSB, and generate the $N_{ID,1}^{SL} \in \{0, 1, \ldots, 335\}$ and $N_{ID,2}^{SL} \in \{0, 1\}$ from the detected SPSS 604 and SSSS 606 sequences. Accordingly, the relay UE may determine the SSID $N_{ID}^{SL}=N_{ID,1}^{SL}+336N_{ID,2}^{SL}$ from the SPSS 604 and SSSS 606 of the received SSB.

Figure 7:
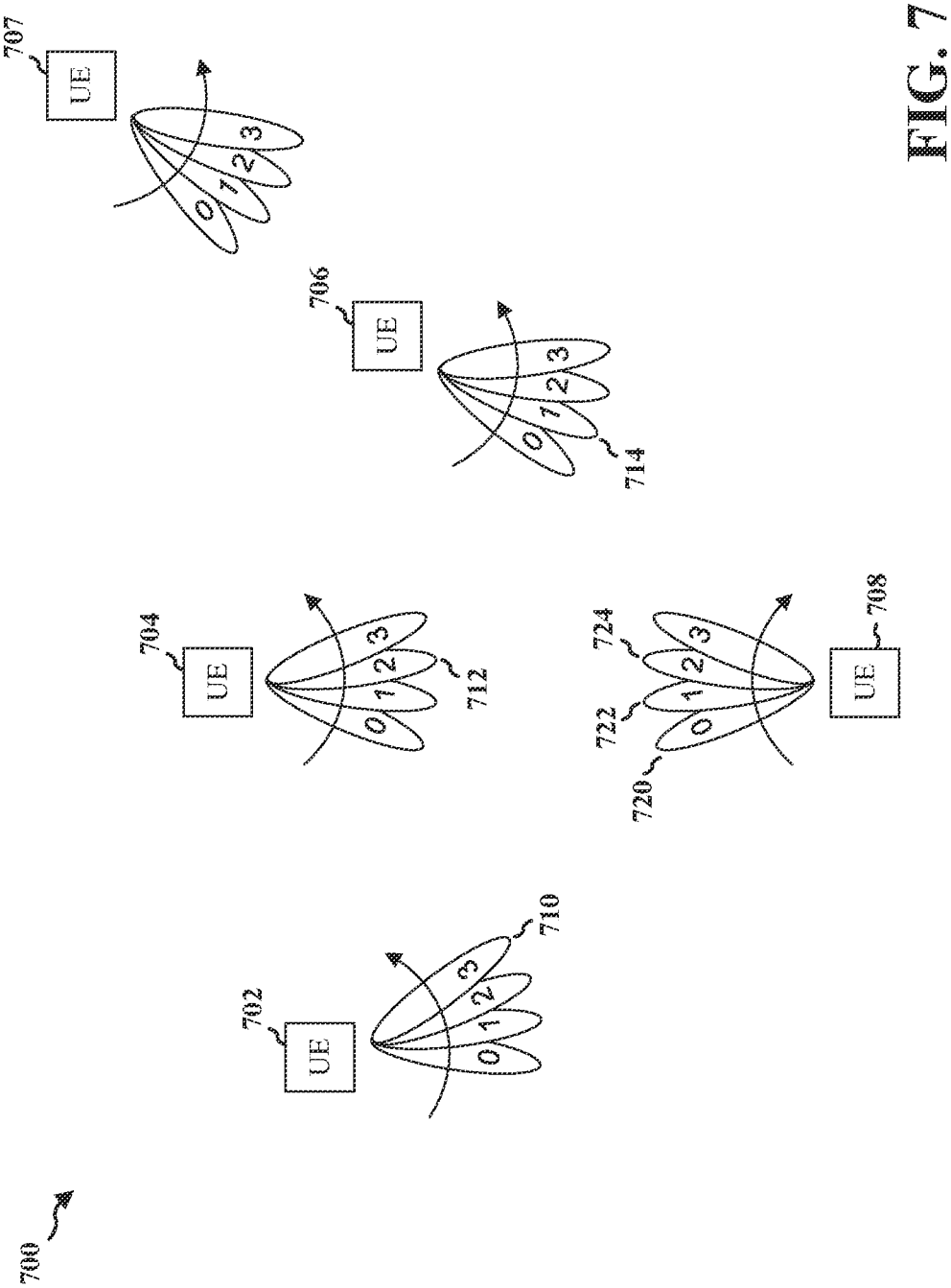
FIG. 7 illustrates an example of beamforming on sidelink communication.

FIG. 7 illustrates an example 700 of beamforming on sidelink communication. The example 700 of beamforming on sidelink communication may include a first relay UE 702, a second relay UE 704, a third relay UE 706, a fourth relay UE 707, and a target UE 708.

In some aspects, the relay UEs 702, 704, 706, and 707 and the target UE 708 may not have an established paging relay association. That is, the target UE 708 may not be aware of which relay UE may send the paging message. The target UE 708 may sweep the receive beams in all directions and detect suitable beams for each relay UE.

That is, the target UE 708 may not be aware of which relay UE of the relay UEs 702, 704, 706, and 707 may send the paging message, and therefore, the target UE 708 may sweep the receive beams to detect the transmit beams from the relay UEs 702, 704, 706, and 707 and determine or identify the suitable transmit-beam receive-beam pair for each relay UE of the relay UEs 702, 704, 706, and 707. Here, the suitable transmit-beam receive-beam pair may be determined or identified based on the received SSBs. That is, the target UE 708 may determine or identify the suitable transmit-beam receive-beam pair by selecting or identifying a pair of a receive beam and a transmit beam associated with the best or greatest metric measurement. For example, the metric may include a reference signal received power (RSRP) of the received SSB. In some aspects, the relay UE may repeat the paging message on all SSB beams. That is, one or more relay UE of the relay UEs 702, 704, 706, and 707 may repeat the transmission of the paging message on all transmit beams to the target UE, and the target UE 708 may receive the paging message from the one or more relay UEs of the relay UEs 702, 704, 706, and 707 based on the identified one or more transmit-beam receive-beam pairs.

In some aspects, the relay UEs may periodically sweep the SSB beams. That is, the relay UEs may periodically sweep the transmit beams transmitting the SSBs. Different relay UEs may use the same time location to transmit the same SSB beams, and a prospective target UE may detect different SSB beams from different relay UEs. That is, the target UEs may receive the periodically transmitted SSBs through beam sweeps of the transmit beams, and detect the different SSBs transmitted from different relay UEs. There may be a coordination between relay UEs such that they use different SSB beams. That is, the different relay UEs may be configured to transmit different SSBs. For example, the base station may configure the relay UEs to transmit different SSBs to prospective target UEs. The target UE may search for the suitable SSB beams from all detected relay UEs. That is, the target UE may detect the SSBs transmitted from the relay UEs, and determine a beam pair for each relay UEs transmitting the SSBs. The beam pair may include a transmit beam of the relay UE and a receive beam of the target UE.

For example, the target UE may measure the SSB beams and get the suitable beam pairs for the first relay UE 702, the second relay UE 704, and the third relay UE 706. The fourth relay UE 707 may be placed far away from the target UE 708, and the target UE may not receive SSB beams from the fourth relay UE 707. For example, the target UE may receive the SSBs from the first relay UE 702 transmitted through a number of transmit beams of the first relay UE. The target UE may determine that the transmit beam 710 and the receive beam 720 used for transmitting the SSB3 signal as the beam pair for the first relay UE 702. For example, the target UE may receive the SSBs from the second relay UE 704 transmitted through a number of transmit beams of the second relay UE. The target UE may determine that the transmit beam 712 and the receive beam 722 used for transmitting the SSB2 signal as the beam pair for the second relay UE 704. For example, the target UE may receive the SSBs from the third relay UE 706 transmitted through a number of transmit beams of the third relay UE. The target UE may determine that the transmit beam 714 and the receive beam 724 used for receiving the SSB1 signal as the beam pair for the third relay UE 702.

Accordingly, the target UE may determine the suitable SSB beams for the first relay UE, the second relay UE, and the third relay UE based on the periodic SSB signals transmitted by the first relay UE, the second relay UE, and the third relay UE, as follows.

| Relay UE | Suitable SSB beam seen from the target UE |
| --- | --- |
| First Relay UE | SSB3 |
| Second Relay UE | SSB2 |
| Third Relay UE | SSB1 |
| Fourth Relay UE | N/A |

The target UE may determine the beam pair for the relay UEs based on the periodic beam sweeps including the SSB, and the target UE may know suitable SSB beams for each relay UE based on the periodically transmitted SSB signals. That is, based on the periodic transmission of the SSB signals from the relay UEs through the transmit beam sweeps of the relay UEs, the target UE may determine the beam pair including one transmit beam and one receive beam for the relay UEs. A relay UE, on the other hand, may not know the suitable SSB beam for remote UE and may serve multiple remote UEs. So the relay UE may sweep the paging message on all SSB beams. That is, a relay UE may transmit the paging message to the target UE, and without knowing the beam pair identified by the target UE, the relay UE may transmit the paging message by sweeping the paging on all transmit beams. The target UE may receive the paging message using the identified beam pair including one transmit beam and one receive beam for the relay UE.

In some aspects, the relay UEs may aperiodically transmit the SSB beams. The target UE may not have a paging relay association with a relay UE, the relay UE may transmit the SSB beams prior to the paging message transmission to enable timely beam detection. That is, the relay UE may refrain from periodically transmitting the SSB, and transmit the SSB prior to transmitting the paging message to the prospective target UE. Since the relay UE may reduce the number of signal transmission, the relay UE may save power and have reduced power consumption.

In a first aspect, the relay UE may perform one beam sweep to transmit the paging message, and the target UE may perform N beam sweeps to receive the paging message transmitted by the relay UE. In a second aspect, the relay UE may perform M beam sweeps to transmit the paging message, and the target UE may perform one beam sweep to receive the paging message transmitted by the relay UE. In a third aspect, the relay UE may perform one beam sweep to transmit the paging message, and the target UE may perform no beam sweep to receive the paging message transmitted by the relay UE.

Figure 8:
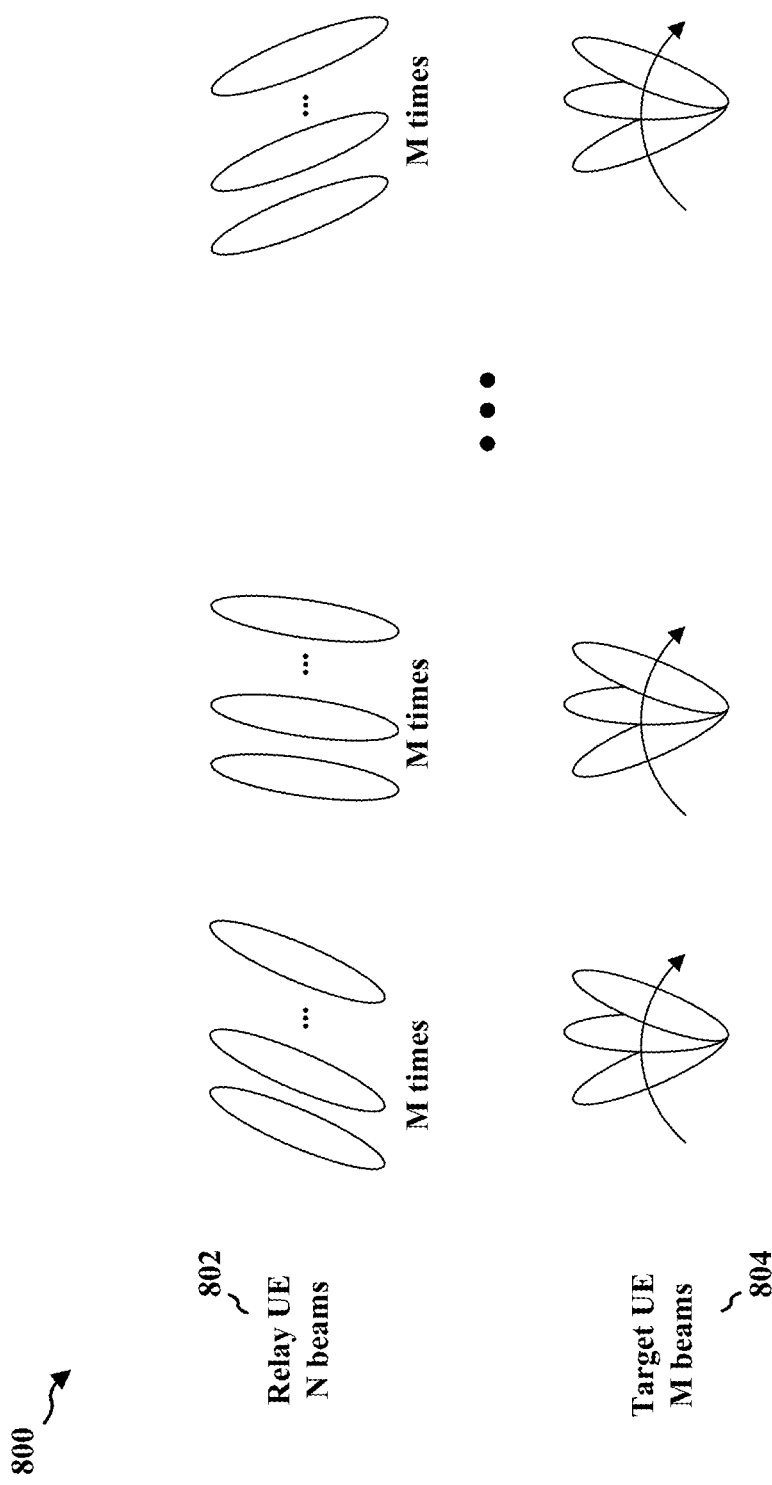
FIG. 8 illustrates an example of transmitting paging message on sidelink communication.

FIG. 8 illustrates an example 800 of transmitting paging message on sidelink communication. The transmit beams may include N transmit beams 802 and the receive beams may include M receive beams 804. The relay UE may sweep the SSB beams once, and the paging message may be sent on each beam direction. That is, the relay UE may transmit the paging messages to the target UE by transmitting, for each transmit beam of the set of N transmit beams 802, the paging message from a same transmit beam M times for each receive beam of the set of M receive beams 804. The target UE may sweep the receive beams N times, once within each SSB beam. That is, the target UE may receive the paging message from the relay UE by receiving, for each transmit beam of the set of N transmit beams 802, the paging message from a same transmit beam M times through each receive beam of the set of M receive beams 804. The transmit beam may include the beams $t_1, t_2, \ldots, t_N$, and the receive beams may include the beams $r_1, r_2, \ldots, r_M$. The relay UE may transmit the paging messages to the target UE by transmitting, for each of i=1, 2, . . . , N, the paging message through beam pair $t_i$-$r_j$ for j=1, 2, . . . , M.

The paging message may be for the RRC setup on the Uu interface, and the target UE may perform a random access procedure on the Uu interface. The paging message may be for the RRC setup on the PC5 interface, and the target UE may respond to the paging message with an accept message, the accept message including the optimal SSB beam information. That is, the target UE may transmit the accept message to the relay UE indicating the one transmit beam of the set of transmit beams, in this case, the N transmit beams 802. The target UE may refrain from performing a receive Rx beam refinement on the PC5 interface. The first aspect of the aperiodic transmission of the paging message on the sidelink communication illustrated in the FIG. 8 may be slower than the third aspect of the aperiodic transmission of the paging message on the sidelink communication.

Figure 9:
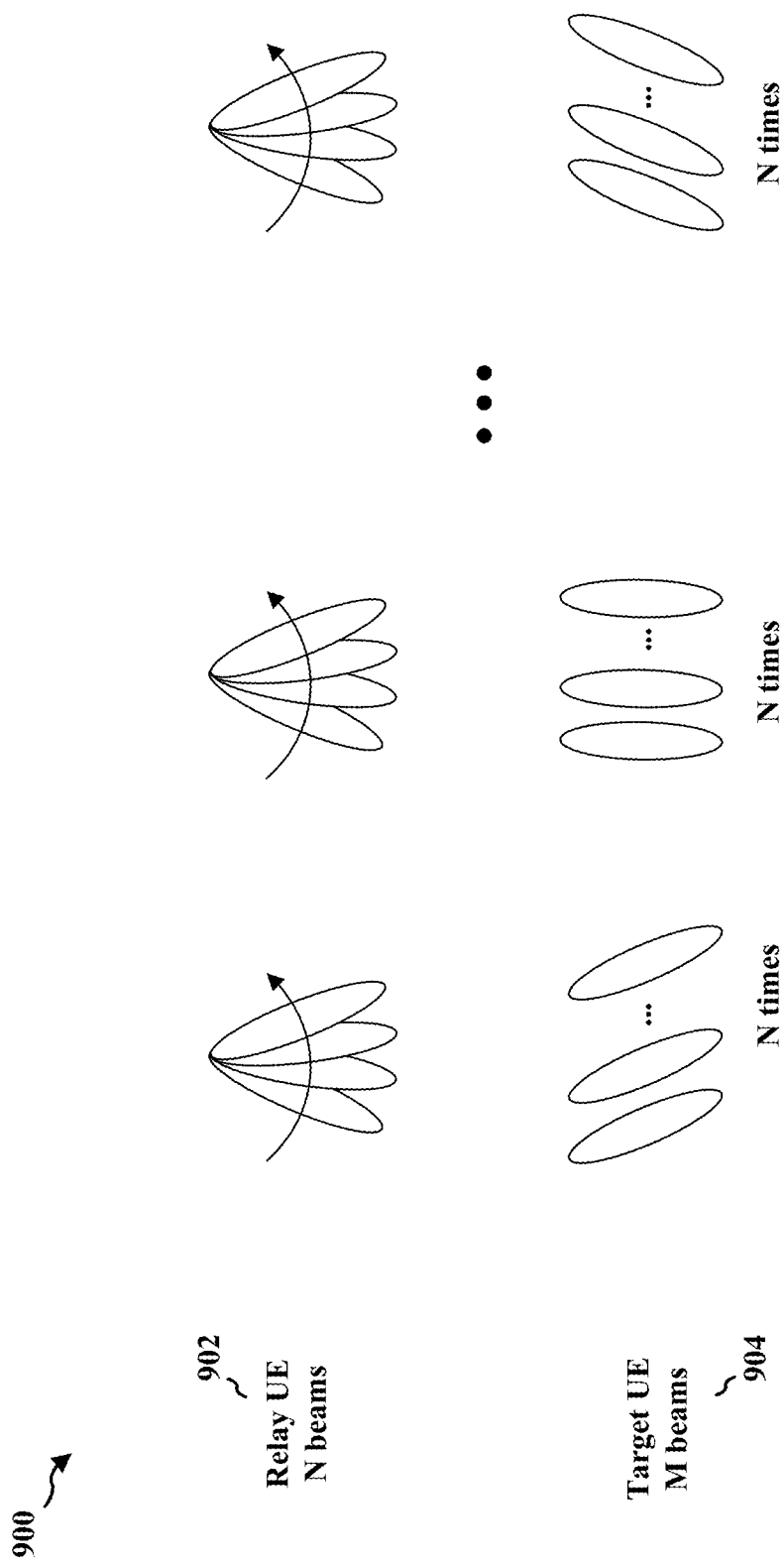
FIG. 9 illustrates an example of transmitting paging message on sidelink communication.

FIG. 9 illustrates an example 900 of transmitting paging message on sidelink communication. The transmit beams may include N transmit beams 902 and the receive beams may include M receive beams 904. The relay UE may sweep the transmit beam M times, and the paging message may be sent on each beam direction. That is, the relay UE may transmit the paging messages to the target UE by transmitting, for each receive beam of the M receive beams 904, the paging message for the receive beam from a different transmit beam of the N transmit beams 902. The target UE may sweep the receive beams once. That is, the target UE may receive, for each receive beam of the set of M receive beams 904, the paging message through the receive beam from a different transmit beam of the set of N transmit beams 902. The N transmit beams 902 may include the beams $t_1, t_2, \ldots, t_N$, and the M receive beams 904 may include the beams $r_1, r_2, \ldots, r_M$. The relay UE may transmit the paging messages to the target UE by transmitting, for each of j=1, 2, . . . , M, the paging message through beam pair $t_i$-$r_j$ for i=1, 2, . . . , N.

The paging message may be for the RRC setup on the Uu interface, and the target UE may perform a random access on the Uu interface. The paging message may be for the RRC setup on the PC5 interface, and the target UE may respond to the paging message with an accept message, the accept message including the optimal transmit beam information. That is, the target UE may transmit the accept message to the relay UE indicating the one transmit beam of the set of transmit beams, in this case, the N transmit beams 902. The target UE may refrain from performing a receive beam refinement on the PC5 interface. The second aspect of the aperiodic transmission of the paging message on the sidelink communication illustrated in the FIG. 9 may be slower than the third aspect of the aperiodic transmission of the paging message on the sidelink communication.

Figure 10:
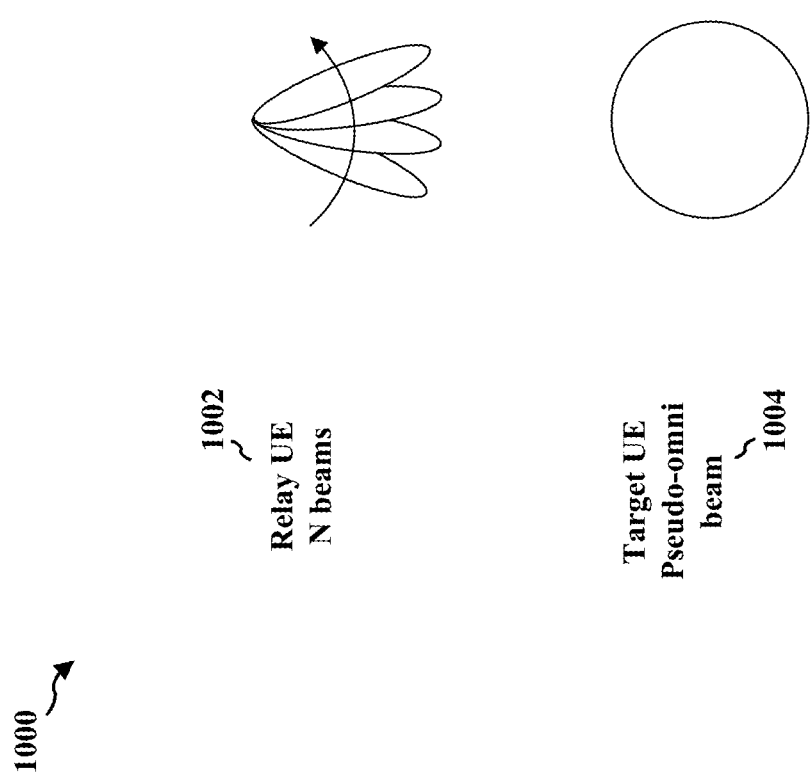
FIG. 10 illustrates an example of transmitting paging message on sidelink communication.

FIG. 10 illustrates an example 1000 of transmitting paging message on sidelink communication. The transmit beams may include N transmit beams 1002 and the receive beams may include one pseudo-omni receive beam 1004. The relay UE may sweep the transmit beam once, and the paging message may be sent on each beam direction. That is, the relay UE may transmit the paging messages to the target UE by transmitting, for each transmit beam of the set of N transmit beams 1002 for the one receive beam 1004. The target UE may receive the paging messages without beamforming. That is, the target UE may receive the paging message from each transmit beam of the set of N transmit beams 1002 through the one receive beam 1004 without beamforming. The set of transmit beams 1002 may include the transmit beams $t_1, t_2, \ldots, t_N$, and the receive beam 1004 may include the receive beam r. The relay UE may transmit the paging message through beam pair $t_i$-r for i=1, 2, . . . , N.

The paging message may be for the RRC setup on the Uu interface, and the target UE may perform a random access on the Uu interface. The paging message may be for the RRC setup on the PC5 interface, and the target UE respond to the paging message with an accept message, the accept message including the optimal Transmit beam information. That is, the target UE may transmit the accept message to the relay UE indicating the one transmit beam of the set of transmit beams, in this case, the N transmit beams 1002.

The target UE may also perform the beam refinement for the transmit beam and the receive beam. The third aspect of the aperiodic transmission of the paging message on the sidelink communication illustrated in the FIG. 9 may be fast, since no beam sweeping may be performed at the target UE.

Figure 11:
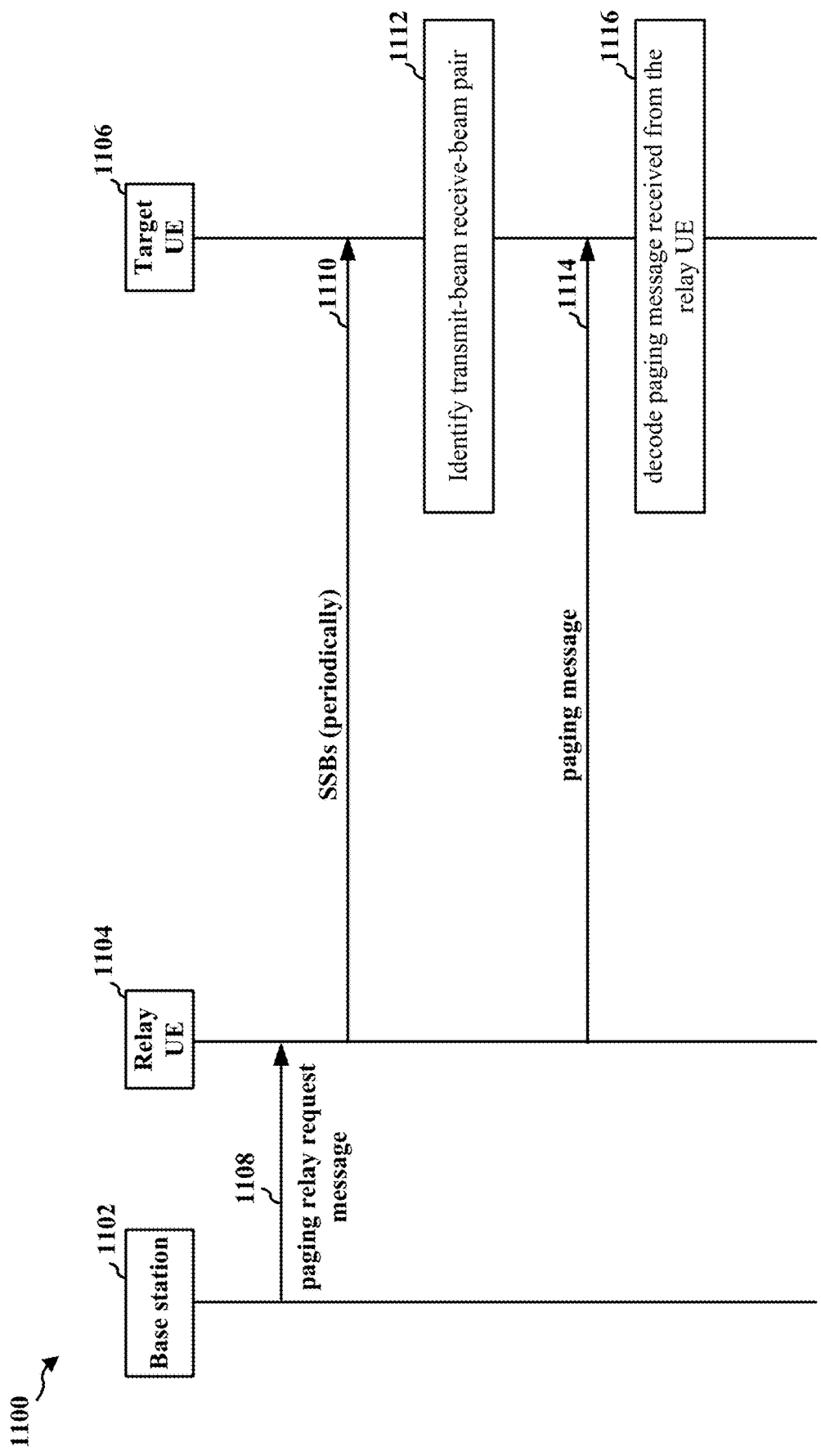
FIG. 11 is a call-flow diagram of a method of wireless communication.

FIG. 11 is a call-flow diagram 1100 of a method of wireless communication. The wireless communication of FIG. 11 may include a base station 1102, a relay UE 1104, and a target UE 1106. The target UE 1106 may receive, from each relay UE 1104 of a set of relay UEs 1104, an SSB through each transmit beam of a set of transmit beams from the UE through each receive beam of a set of receive beams at the target UE 1106. The relay UE 1104 may transmit the paging message through each transmit beam of the set of transmit beams. The target UE 1106 may determine or identify a beam pair based on the received SSB, and receive the paging messaged using the beam pair. The target UE 1106 may also receive, from a relay UE 1104, a paging message through one or more sidelink channels from each transmit beam of a set of transmit beams of the relay UE 1104 through each receive beam of a set of receive beams at the target UE 1106 and decode the received paging message.

At 1108, the relay UE 1104 may receive, from a base station 1102, a paging relay request message including a paging message for a target UE 1106. The base station 1102 may transmit the paging relay request message to request the relay UE 1104 to transmit the paging message to the target UE 1106.

At 1110, the relay UE 1104 may transmit the SSBs to the target UE 1106. The relay UE 1104 may transmit, to the target UE 1106, the SSB through each transmit beam of a set of transmit beams at the relay UE 1104, each transmit beam at the relay UE 1104 corresponding to one receive beam of a set of receive beams at the target UE 1106, where the SSB transmitted via each transmit beam at the relay UE 1104 is different from other SSBs transmitted via other transmit beams of the set of transmit beams at the relay UE 1104. The SSBs may be transmitted periodically to the target UE 1106. The target UE 1106 may receive, from each relay UE 1104 of a set of relay UEs, the SSB via each receive beam of a set of receive beams at the relay UE 1104, each receive beam at the target UE 1106 corresponding to one transmit beam of a set of transmit beams at the relay UE 1104, wherein the SSB received from the relay UE 1104 via each receive beam at the target UE 1106 is different from SSBs received from the relay UE 1104 via other receive beams of the set of receive beams at the target UE 1106.

At 1112, the target UE 1106 may identify, for each relay UE 1104 of the set of relay UEs 1104, a transmit-beam receive-beam pair for the relay UE 1104 based on the received SSBs. The transmit-beam receive-beam pair for the relay UE 1104 may include one transmit beam from the set of transmit beams at the relay UE 1104 and one receive beam from the set of receive beams at the target UE 1106.

At 1114, the relay UE 1104 may transmit, to the target UE 1106, a paging message through one or more sidelink channels via each transmit beam of the set of transmit beams. The target UE 1106 may receive, from each relay UE 1104 of the set of relay UEs 1104, the paging message through one or more sidelink channels via at least the transmit-beam receive-beam pair determined or identified for the relay UE 1104.

At 1116, the target UE 1106 may decode the paging message received from the relay UE 1104.

Figure 12:
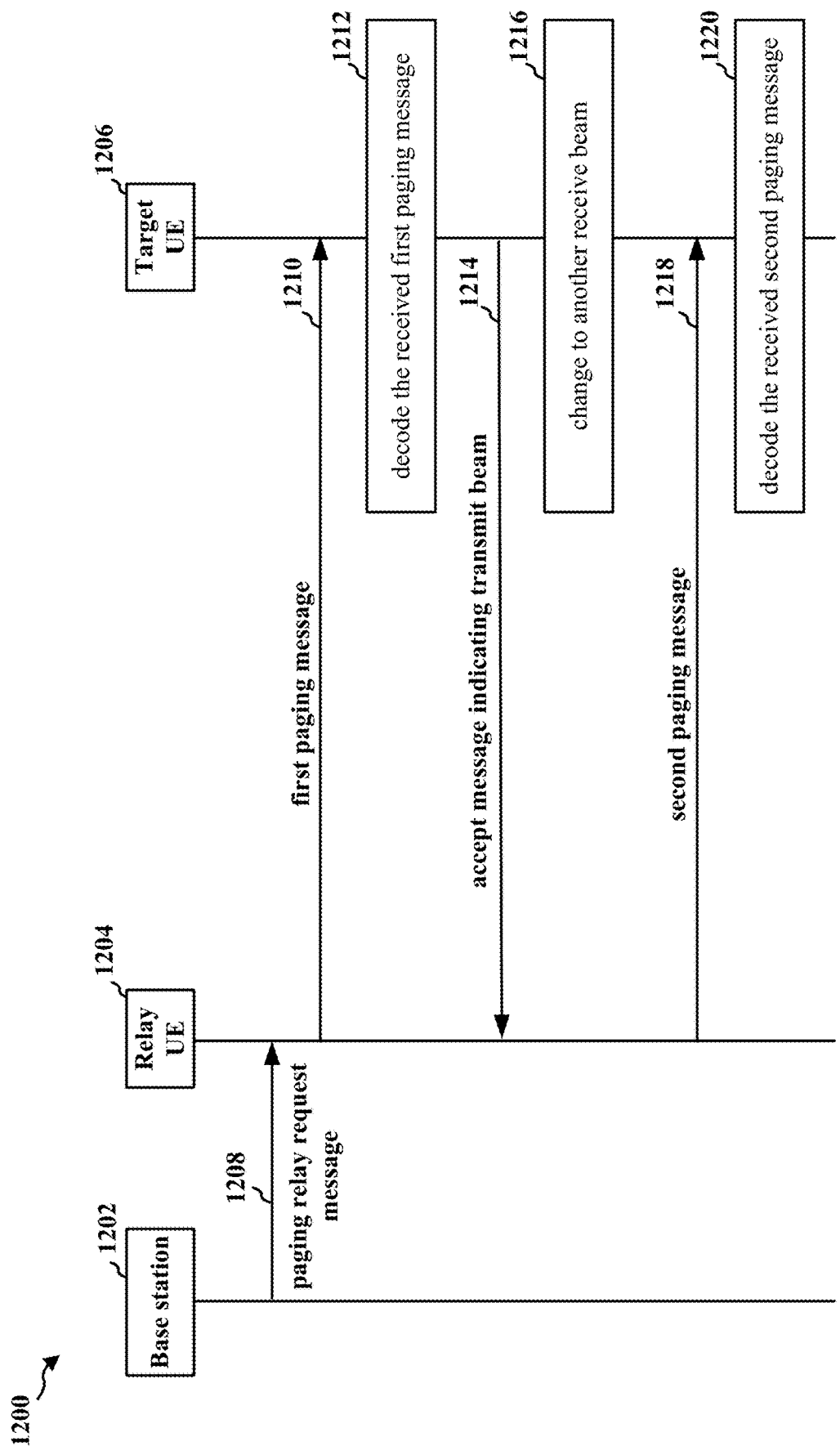
FIG. 12 is a call-flow diagram of a method of wireless communication.

FIG. 12 is a call-flow diagram 1200 of a method of wireless communication. The wireless communication of FIG. 12 may include a base station 1202, a relay UE 1204, and a target UE 1206. The relay UE 1204 may transmit a first paging message through each transmit beam of the set of transmit beams. The target UE 1206 may receive, from the relay UE 1204, the first paging message and decode the received first paging message. The target UE 1206 may transmit, to the relay UE 1204, an accept message indicating at least one transmit beam. The target UE 1206 may refine the receive beam by changing the receive beam to another receive beam and receive a second paging message on the another receive beam.

At 1208, the relay UE 1204 may receive, from a base station 1202, a paging relay request message including a paging message for a target UE 1206. The base station 1202 may transmit the paging relay request message to request the relay UE 1204 to transmit the paging message to the target UE 1206.

At 1210, the relay UE 1204 may transmit, based on the received paging relay request message, a first paging message to the target UE 1206 through each transmit beam of a set of transmit beams at the relay UE 1204, each transmit beam at the relay UE 1204 corresponding to one receive beam of a set of receive beam at the target UE 1206. The target UE 1206 may receive, from the relay UE 1204, the first paging message through one or more sidelink channels via each receive beam of a set of receive beams at the target UE 1206, each receive beam at the target UE 1206 corresponding to one transmit beam of a set of transmit beams at the relay UE 1204.

In one aspect, the relay UE 1204 may transmit the first paging messages to the target UE 1206 by transmitting, for each transmit beam of the set of N transmit beams, the first paging message from a same transmit beam M times for each receive beam of the set of M receive beams. The transmit beam may include the beams $t_1, t_2, \ldots, t_N$, and the receive beams may include the beams $r_1, r_2, \ldots, r_M$. The relay UE 1204 may transmit the first paging messages to the target UE 1206 by transmitting, for each of i=1, 2, . . . , N, the first paging message through beam pair $t_i$-$r_j$ for j=1, 2, . . . , M.

In another aspect, the relay UE 1204 may transmit the first paging messages to the target UE 1206 by transmitting, for each receive beam of the M receive beams, the first paging message for the receive beam from a different transmit beam of the N transmit beams. The N transmit beams may include the beams $t_1, t_2, \ldots, t_N$, and the M receive beams may include the beams $r_1, r_2, \ldots, r_M$. The relay UE 1204 may transmit the first paging messages to the target UE 1206 by transmitting, for each of j=1, 2, . . . , M, the first paging message through beam pair $t_i$-$r_j$ for i=1, 2, . . . , N.

In yet another aspect, the relay UE 1204 may transmit the first paging messages to the target UE 1206 by transmitting, for each transmit beam of the set of N transmit beams for the one receive beam. The set of transmit beams may include the transmit beams $t_1, t_2, \ldots, t_N$, and the receive beam may include the receive beam r. The relay UE 1204 may transmit the first paging message through beam pair $t_i$-r for i=1, 2, ..., N.

At 1212, the target UE 1206 may decode the received first paging message. The target UE 1206 may perform the procedures associated with the received first paging message.

At 1214, the target UE 1206 may transmit an accept message to the relay UE 1204 in response to receiving and decoding the first paging message from the relay UE 1204. The relay UE 1204 may receive, from the target UE 1206, the accept message in response to the transmitted paging message. The accept message may indicate at least one transmit beam of the set of transmit beams.

At 1216, the target UE 1206 may perform beam refining by changing the receive beam for receiving the paging message.

At 1218, the relay UE 1204 may transmit, to the target UE 1206 based on the accept message indicating the at least one transmit beam, a second paging message through one or more sidelink channels through each transmit beam of the at least one transmit beam of the relay UE 1204 for each receive beam of the set of receive beams at the target UE 1206. The target UE 1206 may receive, from the relay UE 1204, the second paging message through one or more sidelink channels from each receive beam of the at least one receive beam of the relay UE 1204 through each receive beam of a set of receive beams at the target UE 1206.

At 1220, the target UE 1206 may decode the second paging message received from the relay UE 1204.

Figure 13:
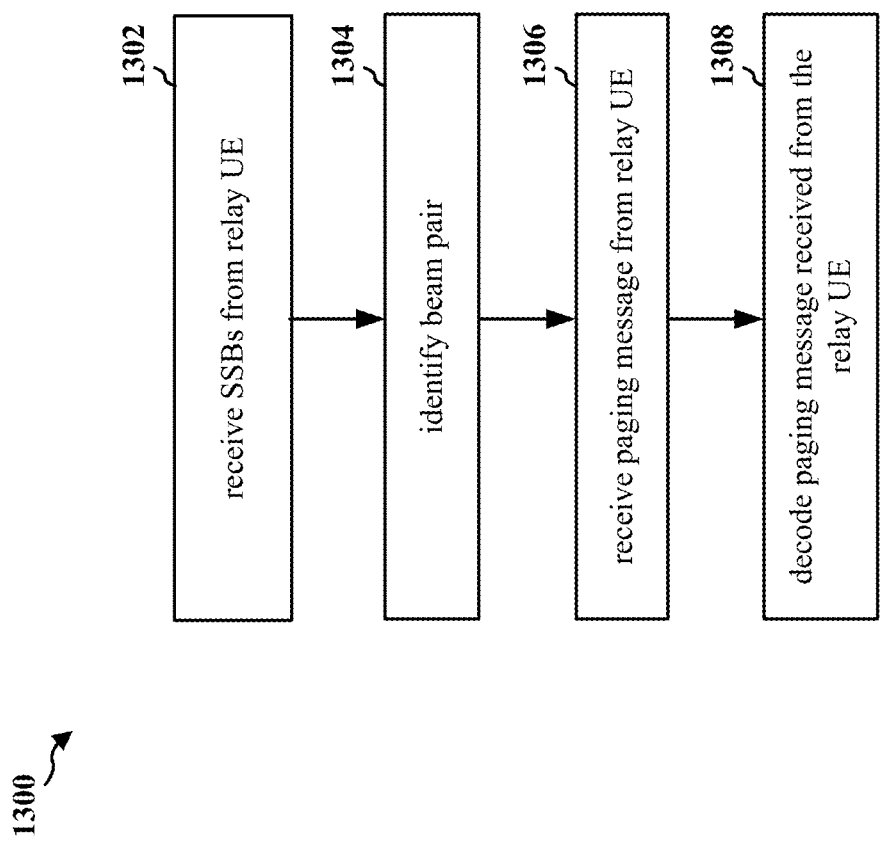
FIG. 13 is a flowchart of a method of wireless communication.

FIG. 13 is a flowchart 1300 of a method of wireless communication. The method may be performed by a first UE (e.g., the target UE 105, 506, 508, 708, and 1106; the apparatus 2102). Here, the first UE may be a target UE. The first UE may receive, from each relay UE of a set of relay UEs, an SSB through each transmit beam of a set of transmit beams from the UE through each receive beam of a set of receive beams at the first UE. The first UE may determine a beam pair based on the received SSB, and receive the paging messaged using the beam pair. The first UE may also receive, from a relay UE, a paging message through one or more sidelink channels from each transmit beam of the set of transmit beams at the relay UE through each receive beam of a set of receive beams at the first UE and decode the received paging message.

At 1302, the first UE may receive, from each relay UE of a set of relay UEs, an SSB via each receive beam of a set of receive beams at the relay UE, each receive beam at the first UE corresponding to one transmit beam of a set of transmit beams at the relay UE, wherein the SSB received from the relay UE via each receive beam at the first UE is different from SSBs received from the relay UE via other receive beams of the set of receive beams at the first UE. The SSBs may be received periodically from the relay UE. For example, at 1110, the target UE 1106 may receive SSBs from a relay UE 1104. Furthermore, 1302 may be performed by a sidelink beamforming component 2140.

At 1304, the first UE may identify, for each relay UE of the set of relay UEs, a transmit-beam receive-beam pair for the relay UE based on the received SSBs, the transmit-beam receive-beam pair for the UE including one transmit beam from the set of transmit beams at the relay UE and one receive beam from the set of receive beams at the first UE. The transmit-beam receive-beam pair for each relay UE may be identified periodically based on the received SSBs. For example, at 1112 the target UE 1106 may identify, for each relay UE 1104 of the set of relay UEs 1104, a transmit-beam receive-beam pair for the relay UE 1104 based on the received SSBs. Furthermore, 1304 may be performed by the sidelink beamforming component 2140.

At 1306, the first UE may receive, from each relay UE of the set of relay UEs, a paging message through one or more sidelink channels via at least the identified transmit-beam receive-beam pair for the relay UE. For example, at 1114 the target UE 1106 may receive, from the relay UE 1104, a paging message through one or more sidelink channels via each transmit beam of the set of transmit beams. Furthermore, 1306 may be performed by a sidelink paging component 2142.

At 1308, the first UE may decode the paging message received from the relay UE. For example, at 1116 the target UE 1106 may decode the paging message received from the relay UE 1104. Furthermore, 1308 may be performed by the sidelink paging component 2142.

Figure 14:
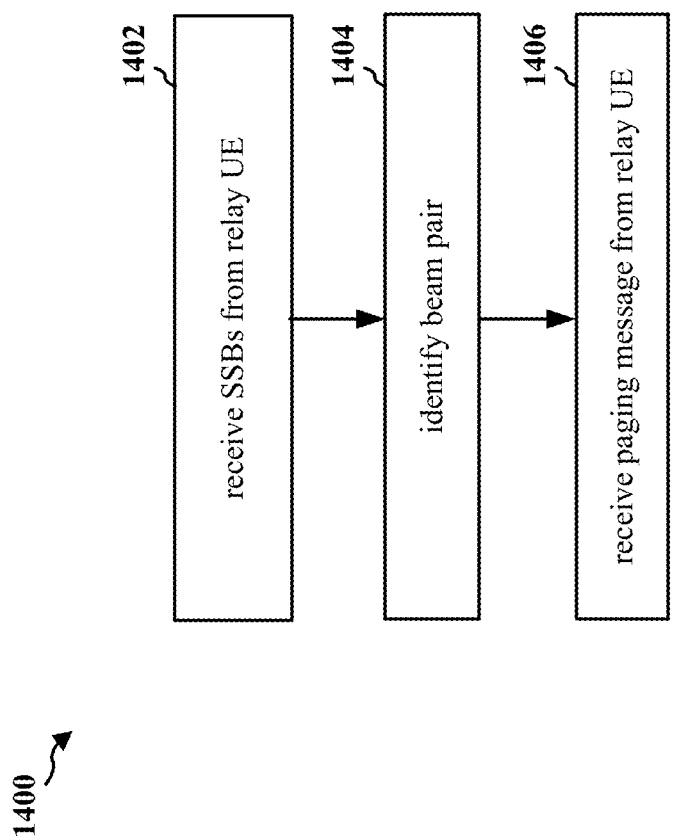
FIG. 14 is a flowchart of a method of wireless communication.

FIG. 14 is a flowchart 1400 of a method of wireless communication. The method may be performed by a first UE (e.g., the target UE 105, 506, 508, 708, and 1106; the apparatus 2102). Here, the first UE may be a target UE. The first UE may receive, from each relay UE of a set of relay UEs, an SSB through each transmit beam of a set of transmit beams from the UE through each receive beam of a set of receive beams at the first UE. The first UE may determine a beam pair based on the received SSB, and receive the paging messaged using the beam pair. The first UE may also receive, from a relay UE, a paging message through one or more sidelink channels from each transmit beam of a set of transmit beams of the relay UE through each receive beam of a set of receive beams at the first UE and decode the received paging message.

At 1402, the first UE may receive, from each relay UE of a set of relay UEs, an SSB via each receive beam of a set of receive beams at the relay UE, each receive beam at the first UE corresponding to one transmit beam of a set of transmit beams at the relay UE, wherein the SSB received from the relay UE via each receive beam at the first UE is different from SSBs received from the relay UE via other receive beams of the set of receive beams at the first UE. The SSBs may be received periodically from the relay UE. For example, at 1110, the target UE 1106 may receive SSBs from a relay UE 1104. Furthermore, 1402 may be performed by a sidelink beamforming component 2140.

At 1404, the first UE may identify, for each relay UE of the set of relay UEs, a transmit-beam receive-beam pair for the relay UE based on the received SSBs, the transmit-beam receive-beam pair for the UE including one transmit beam from the set of transmit beams at the relay UE and one receive beam from the set of receive beams at the first UE. The transmit-beam receive-beam pair for each relay UE may be identified periodically based on the received SSBs. For example, at 1112 the target UE 1106 may identify, for each relay UE 1104 of the set of relay UEs 1104, a transmit-beam receive-beam pair for the relay UE 1104 based on the received SSBs. Furthermore, 1404 may be performed by the sidelink beamforming component 2140.

At 1406, the first UE may receive, from each relay UE of the set of relay UEs, a paging message through one or more sidelink channels via at least the identified transmit-beam receive-beam pair for the relay UE. For example, at 1114 the target UE 1106 may receive, from the relay UE 1104, a paging message through one or more sidelink channels via each transmit beam of the set of transmit beams. Furthermore, 1406 may be performed by a sidelink paging component 2142.

Figure 15:
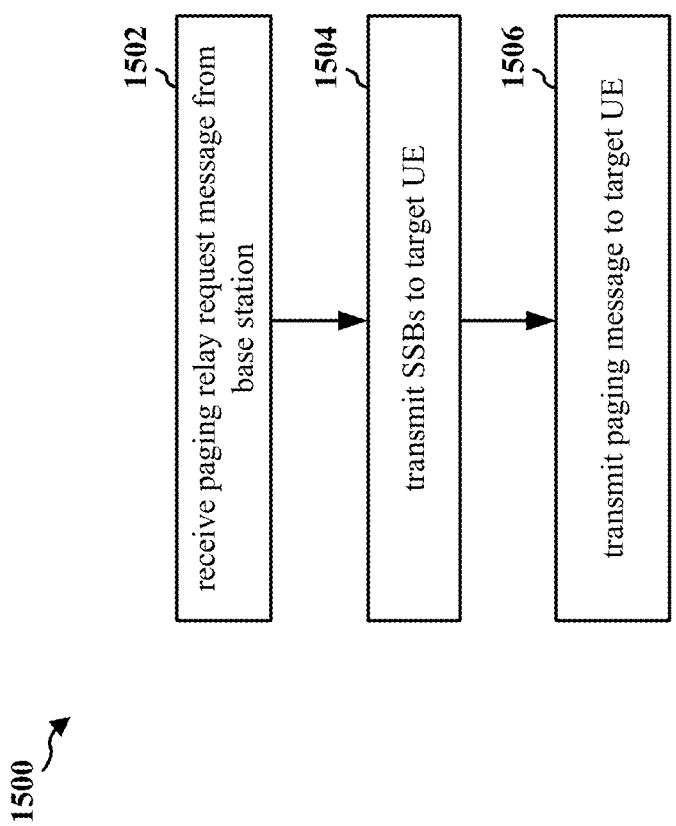
FIG. 15 is a flowchart of a method of wireless communication.

FIG. 15 is a flowchart 1500 of a method of wireless communication. The method may be performed by a second UE (e.g., the relay UE 104, 504, 702, 704, 706, and 1104; the apparatus 2202). Here, the second UE may be a relay UE. The second UE may transmit, to a first UE, the paging message through each transmit beam of the set of transmit beams for the first UE to identify a beam pair based on the received SSB, and receive the paging messaged using the beam pair. The second UE may also transmit, to the second UE, a paging message through one or more sidelink channels from each transmit beam of a set of transmit beams of the second UE through each receive beam of a set of receive beams at the first UE.

At 1502, the second UE may receive, from a base station, a paging relay request message including a paging message for a target UE (i.e., at 1108). The paging relay request message requesting the second UE to transmit the paging message to the target UE. For example, at 1108, the relay UE 1104 may receive, from a base station 1102, a paging relay request message including a paging message for a target UE 1106. Furthermore, 1502 may be performed by a sidelink paging component 2242.

At 1504, the second UE may transmit, to the target UE, a SSB through each transmit beam of a set of transmit beams at the second UE, each transmit beam at the second UE corresponding to one receive beam of a set of receive beams at the target UE, where the SSB transmitted via each transmit beam at the second UE is different from other SSBs transmitted via other transmit beams of the set of transmit beams at the second UE. The SSBs may be transmitted periodically to the target UE. For example, at 1110, the relay UE 1104 may transmit the SSBs to the target UE 1106. Furthermore, 1504 may be performed by a sidelink beamforming component 2240.

At 1506, the second UE may transmit, to the target UE, a paging message through one or more sidelink channels via each transmit beam of the set of transmit beams. For example, at 1114, the relay UE 1104 may transmit, to the target UE 1106, a paging message through one or more sidelink channels via each transmit beam of the set of transmit beams. Furthermore, 1506 may be performed by the sidelink paging component 2242.

Figure 16:
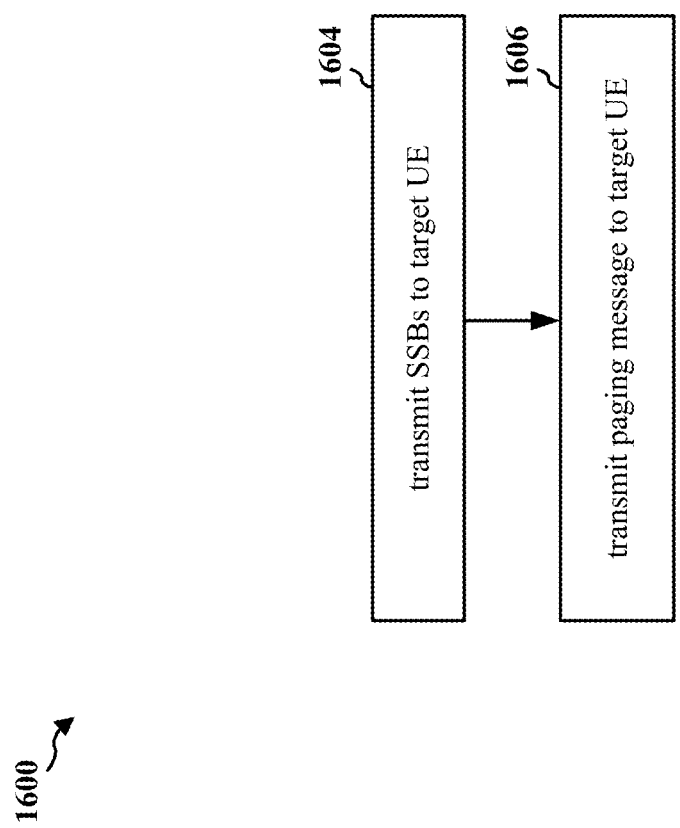
FIG. 16 is a flowchart of a method of wireless communication.

FIG. 16 is a flowchart 1600 of a method of wireless communication. The method may be performed by a second UE (e.g., the relay UE 104, 504, 702, 704, 706, and 1104; the apparatus 2202). Here, the second UE may be a relay UE. The second UE may transmit, to a first UE, the paging message through each transmit beam of the set of transmit beams for the first UE to identify a beam pair based on the received SSB, and receive the paging messaged using the beam pair. The second UE may also transmit, to the second UE, a paging message through one or more sidelink channels from each transmit beam of a set of transmit beams of the second UE through each receive beam of a set of receive beams at the first UE.

At 1604, the second UE may transmit, to the target UE, a SSB through each transmit beam of a set of transmit beams at the second UE, each transmit beam at the second UE corresponding to one receive beam of a set of receive beams at the target UE, where the SSB transmitted via each transmit beam at the second UE is different from other SSBs transmitted via other transmit beams of the set of transmit beams at the second UE. The SSBs may be transmitted periodically to the target UE. For example, at 1110, the relay UE 1104 may transmit the SSBs to the target UE 1106. Furthermore, 1604 may be performed by a sidelink beamforming component 2240.

At 1606, the second UE may transmit, to the target UE, a paging message through one or more sidelink channels via each transmit beam of the set of transmit beams. For example, at 1114, the relay UE 1104 may transmit, to the target UE 1106, a paging message through one or more sidelink channels via each transmit beam of the set of transmit beams. Furthermore, 1606 may be performed by the sidelink paging component 2242.

Figure 17:
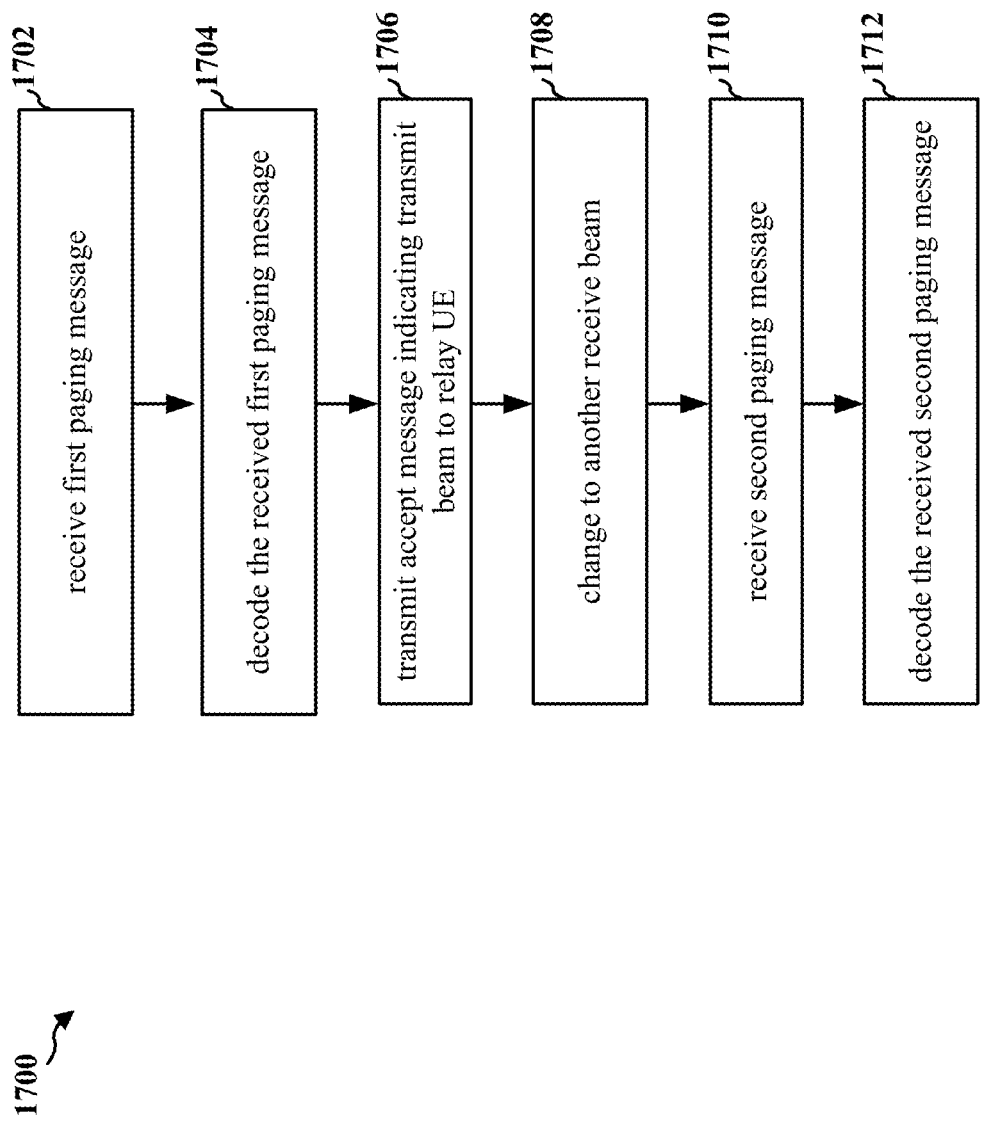
FIG. 17 is a flowchart of a method of wireless communication.

FIG. 17 is a flowchart 1700 of a method of wireless communication. The method may be performed by a first UE (e.g., the target UE 105, 506, 508, 708, and 1206; the apparatus 2102). Here, the first UE may be a target UE. The first UE may receive, from a second UE (e.g., a relay UE), the first paging message and decode the received first paging message. The first UE may transmit, to the second UE, an accept message indicating at least one transmit beam. The first UE may refine the receive beam by changing the receive beam to another receive beam and receive a second paging message on the another receive beam.

At 1702, the first UE may receive, from a second UE, a first paging message through one or more sidelink channels via each receive beam of a set of receive beams at the first UE, each receive beam at the first UE corresponding to one transmit beam of a set of transmit beams at the relay UE. For example, at 1210, the target UE 1206 may receive a first paging message from the relay UE 1204 through each transmit beam of a set of transmit beams at the relay UE for each receive beam of a set of receive beams at the target UE. Furthermore, 1702 may be performed by a sidelink paging component 2142.

The set of transmit beams may include N transmit beams including the transmit beams $t_1, t_2, \ldots, t_N$, and the set of receive beams may include M receive beams may include the receive beams $r_1, r_2, \ldots, r_M$. The paging messages may be received, for each transmit beam of the set of N transmit beams, from a same transmit beam M times through each receive beam of the set of M receive beams. The paging message may be received, for each of $i=1, 2, \ldots, N$, the paging message, through beam pair $t_i$-$r_j$ for $j=1, 2, \ldots, M$. The paging message may be received, for each receive beam of the set of M receive beams, from a different transmit beam of the set of N transmit beams. The paging message may be received, for each of $j=1, 2, \ldots, M$, the paging message through beam pair $t_i$-$r_j$ for $i=1, 2, \ldots, N$.

The set of transmit beams may include N transmit beams including the transmit beams $t_1, t_2, \ldots, t_N$, and the set of receive beams may include one receive beam r, and the paging message may be received from each transmit beam of the set of N transmit beams through the one receive beam. The paging message may be received from each transmit beam of the set of N transmit beams through the one receive beam.

At 1704, the first UE may decode the received first paging message. For example, at 1212, the target UE 1206 may decode the received first paging message. Furthermore, 1704 may be performed by the sidelink paging component 2142.

At 1706, the first UE may transmit, in response to receiving and decoding the paging message, an accept message to the second UE. The accept message may indicate at least one transmit beam of the set of transmit beams. For example, at 1214, the target UE 1206 may transmit an accept message to the relay UE 1204 in response to receiving and decoding the first paging message from the relay UE 1204. Furthermore, 1706 may be performed by a sidelink beamforming component 2140.

At 1708, the first UE may change the one receive beam for receiving paging message to a second receive beam. For example, at 1216, the target UE 1206 may perform beam refining by changing the receive beam for receiving the paging message. Furthermore, 1708 may be performed by the sidelink beamforming component 2140.

At 1710, the first UE may receive, from the second UE, a second paging message through one or more sidelink channels from each transmit beam of the at least one transmit beam of the second UE through each receive beam of a set of receive beams at the first UE. For example, at 1218, the target UE 1206 may receive, from the relay UE 1204, the second paging message through one or more sidelink channels from each receive beam of the at least one receive beam of the relay UE 1204 through each receive beam of a set of receive beams at the target UE 1206. Furthermore, 1710 may be performed by the sidelink paging component 2142.

At 1712, the first UE may decode the received second paging message. For example, at 1220, the target UE 1206 may decode the second paging message received from the relay UE 1204. Furthermore, 1712 may be performed by the sidelink paging component 2142.

Figure 18:
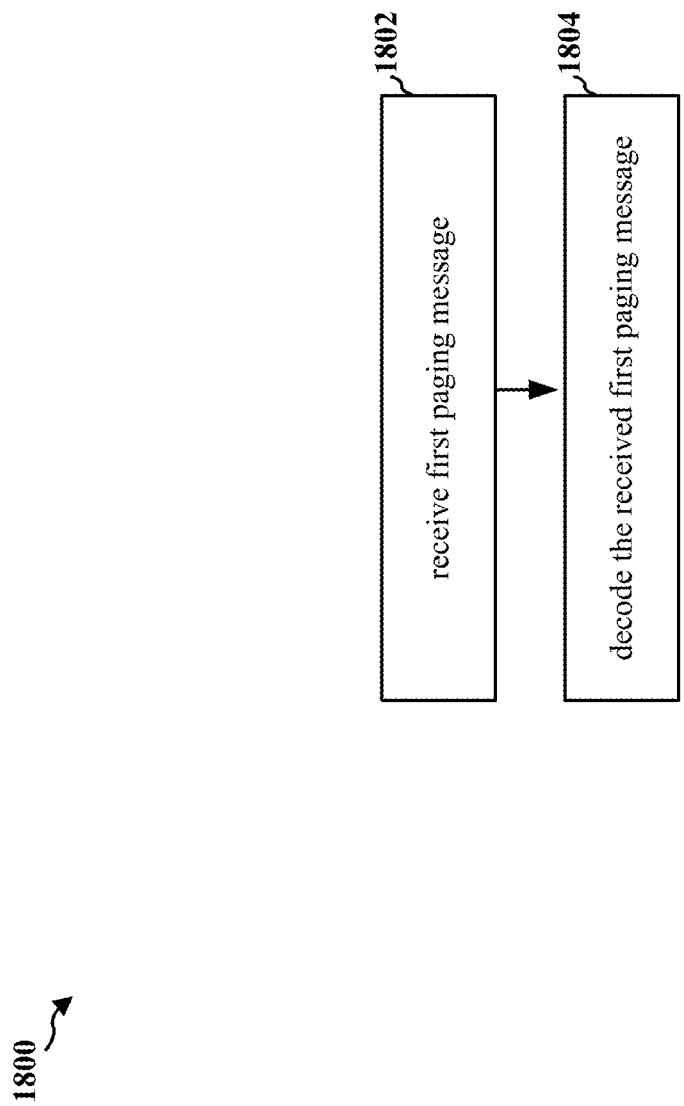
FIG. 18 is a flowchart of a method of wireless communication.

FIG. 18 is a flowchart 1800 of a method of wireless communication. The method may be performed by a first UE (e.g., the target UE 105, 506, 508, 708, and 1206; the apparatus 2102). Here, the first UE may be a target UE. The first UE may receive, from a second UE (e.g., a relay UE), the first paging message and decode the received first paging message. The first UE may transmit, to the second UE, an accept message indicating at least one transmit beam. The first UE may refine the receive beam by changing the receive beam to another receive beam and receive a second paging message on the another receive beam.

At 1802, the first UE may receive, from a second UE, a first paging message through one or more sidelink channels via each receive beam of a set of receive beams at the first UE, each receive beam at the first UE corresponding to one transmit beam of a set of transmit beams at the relay UE. For example, at 1210, the target UE 1206 may receive a first paging message from the relay UE 1204 through each transmit beam of a set of transmit beams at the relay UE for each receive beam of a set of receive beams at the target UE. Furthermore, 1802 may be performed by a sidelink paging component 2142.

The set of transmit beams may include N transmit beams including the transmit beams $t_1, t_2, \ldots, t_N$, and the set of receive beams may include M receive beams may include the receive beams $r_1, r_2, \ldots, r_M$. The paging messages may be received, for each transmit beam of the set of N transmit beams, from a same transmit beam M times through each receive beam of the set of M receive beams. The paging message may be received, for each of i=1, 2, . . . , N, the paging message, through beam pair $t_i$-$r_j$ for j=1, 2, . . . , M. The paging message may be received, for each receive beam of the set of M receive beams, from a different transmit beam of the set of N transmit beams. The paging message may be received, for each of j=1, 2, . . . , M, the paging message through beam pair $t_i$-$r_j$ for i=1, 2, . . . , N.

The set of transmit beams may include N transmit beams including the transmit beams $t_1, t_2, \ldots, t_N$, and the set of receive beams may include one receive beam r, and the paging message may be received from each transmit beam of the set of N transmit beams through the one receive beam. The paging message may be received from each transmit beam of the set of N transmit beams through the one receive beam.

At 1804, the first UE may decode the received first paging message. For example, at 1212, the target UE 1206 may decode the received first paging message. Furthermore, 1804 may be performed by the sidelink paging component 2142.

Figure 19:
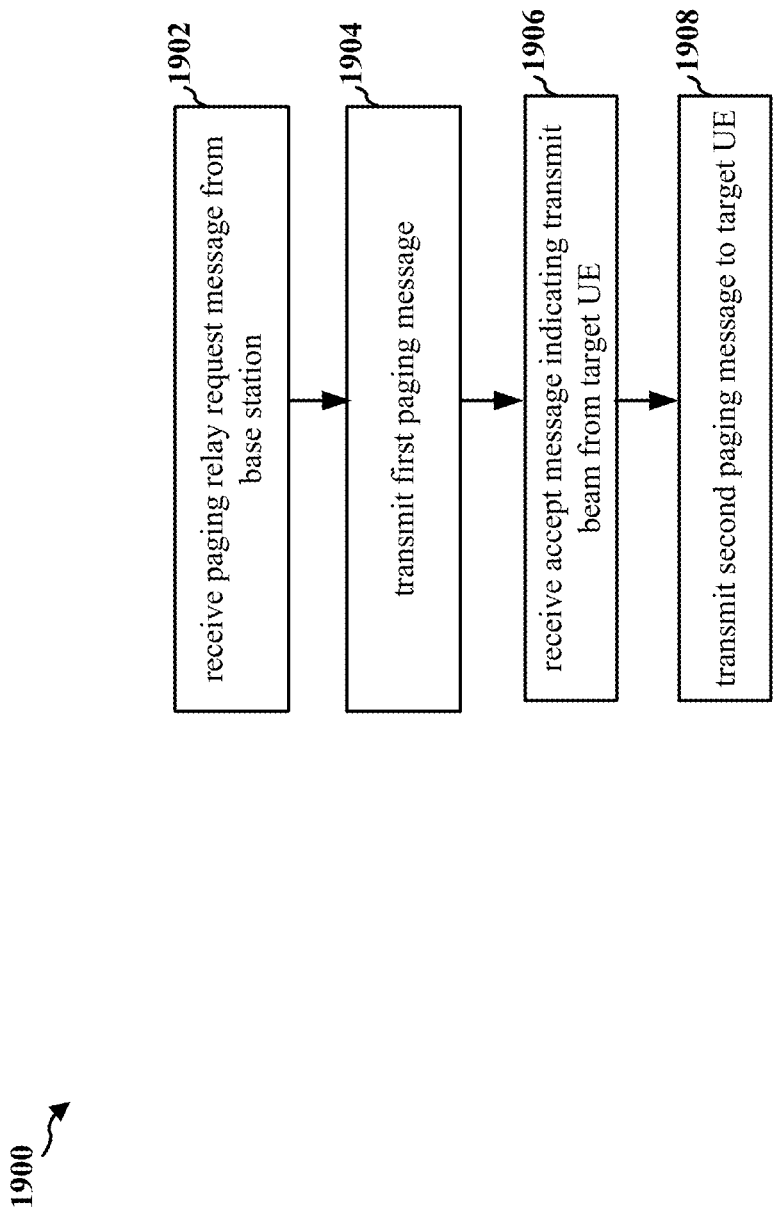
FIG. 19 is a flowchart of a method of wireless communication.

FIG. 19 is a flowchart 1900 of a method of wireless communication. The method may be performed by a second UE (e.g., the relay UE 104, 504, 702, 704, 706, 1104, and 1204; the apparatus 2202). Here, the second UE may be a relay UE. The second UE may transmit, to a first UE (e.g., a target UE), a first paging message or a second paging message through each transmit beam of the set of transmit beams.

At 1902, the second UE may receive, from a base station, a paging relay request message including a paging message for a target UE, the paging relay request message requesting the second UE to transmit the paging message to the target UE. For example, at 1210, the relay UE 1204 may receive, from a base station 1202, a paging relay request message including a paging message for a target UE 1206. Furthermore, 1902 may be performed by a sidelink paging component 2242.

At 1904, the second UE may transmit, to the target UE based on the received paging relay request message, paging message through each transmit beam of a set of transmit beams at the second UE, each transmit beam at the second UE corresponding to one receive beam of a set of receive beam at the target UE. For example, at 1210, the relay UE 1204 may receive, from the relay UE 1204, the first paging message through one or more sidelink channels from each transmit beam of a set of transmit beams of the relay UE 1204 through each receive beam of a set of receive beams at the target UE 1206. Furthermore, 1904 may be performed by the sidelink paging component 2242.

The set of transmit beams may include N transmit beams including the transmit beams $t_1, t_2, \ldots, t_N$, and the set of receive beams may include M receive beams may include the receive beams $r_1, r_2, \ldots, r_M$. The paging messages may be transmitted, for each transmit beam of the set of N transmit beams, from a same transmit beam M times through each receive beam of the set of M receive beams. The paging message may be transmitted, for each of i=1, 2, . . . , N, the paging message, through beam pair $t_i$-$r_j$ for j=1, 2, . . . , M. The paging message may be transmitted, for each receive beam of the set of M receive beams, from a different transmit beam of the set of N transmit beams. The paging message may be transmitted, for each of j=1, 2, . . . , M, the paging message through beam pair $t_i$-$r_j$ for i=1, 2, . . . , N.

The set of transmit beams may include N transmit beams including the transmit beams $t_1, t_2, \ldots, t_N$, and the set of receive beams may include one receive beam r, and the paging message may be transmitted from each transmit beam of the set of N transmit beams through the one receive beam. The paging message may be transmitted from each transmit beam of the set of N transmit beams through the one receive beam.

At 1906, the second UE may receive, from the target UE, an accept message in response to the transmitted paging message (i.e., at 1214). The accept message may indicate at least one transmit beam of the set of transmit beams. For example, at 1214, the relay UE 1204 may receive, from the target UE 1206, the accept message in response to the transmitted paging message. Furthermore, 1906 may be performed by a sidelink beamforming component 2240.

At 1908, the second UE may transmit, to the target UE based on the accept message indicating the at least one transmit beam, a second paging message through one or more sidelink channels through each transmit beam of the at least one transmit beam of the second UE for each receive beam of a set of receive beams at the target UE (i.e., at 1216). For example, at 1216, the relay UE 1204 may transmit, to the target UE 1206 based on the accept message indicating the at least one transmit beam, a second paging message through one or more sidelink channels through each transmit beam of the at least one transmit beam of the relay UE 1204 for each receive beam of a set of receive beams at the target UE 1206. Furthermore, 1908 may be performed by the sidelink paging component 2242.

Figure 20:
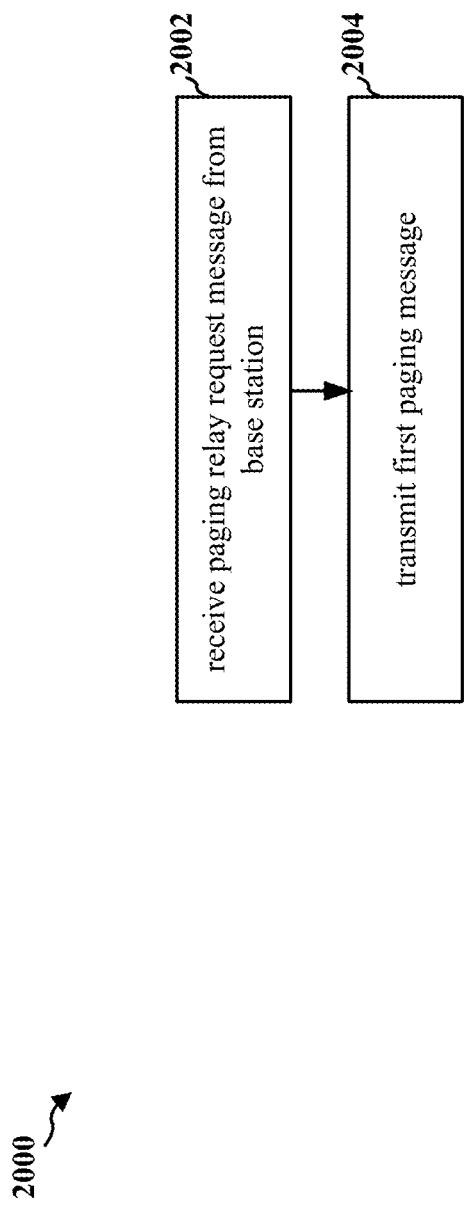
FIG. 20 is a flowchart of a method of wireless communication.

FIG. 20 is a flowchart 2000 of a method of wireless communication. The method may be performed by a second UE (e.g., the relay UE 104, 504, 702, 704, 706, 1104, and 1204; the apparatus 2202). Here, the second UE may be a relay UE. The second UE may transmit, to a first UE (e.g., a target UE), a first paging message or a second paging message through each transmit beam of the set of transmit beams.

At 2002, the second UE may receive, from a base station, a paging relay request message including a paging message for a target UE, the paging relay request message requesting the second UE to transmit the paging message to the target UE. For example, at 1210, the relay UE 1204 may receive, from a base station 1202, a paging relay request message including a paging message for a target UE 1206. Furthermore, 2002 may be performed by a sidelink paging component 2242.

At 2004, the second UE may transmit, to the target UE based on the received paging relay request message, paging message through each transmit beam of a set of transmit beams at the second UE, each transmit beam at the second UE corresponding to one receive beam of a set of receive beam at the target UE. For example, at 1210, the relay UE 1204 may receive, from the relay UE 1204, the first paging message through one or more sidelink channels from each transmit beam of a set of transmit beams of the relay UE 1204 through each receive beam of a set of receive beams at the target UE 1206. Furthermore, 2004 may be performed by the sidelink paging component 2242.

The set of transmit beams may include N transmit beams including the transmit beams $t_1, t_2, \ldots, t_N$, and the set of receive beams may include M receive beams may include the receive beams $r_1, r_2, \ldots, r_M$. The paging messages may be transmitted, for each transmit beam of the set of N transmit beams, from a same transmit beam M times through each receive beam of the set of M receive beams. The paging message may be transmitted, for each of i=1, 2, . . . , N, the paging message, through beam pair $t_i$-$r_j$ for j=1, 2, . . . , M. The paging message may be transmitted, for each receive beam of the set of M receive beams, from a different transmit beam of the set of N transmit beams. The paging message may be transmitted, for each of j=1, 2, . . . , M, the paging message through beam pair $t_i$-$r_j$ for i=1, 2, . . . , N.

The set of transmit beams may include N transmit beams including the transmit beams $t_1, t_2, \ldots, t_N$, and the set of receive beams may include one receive beam r, and the paging message may be transmitted from each transmit beam of the set of N transmit beams through the one receive beam. The paging message may be transmitted from each transmit beam of the set of N transmit beams through the one receive beam.

Figure 21:
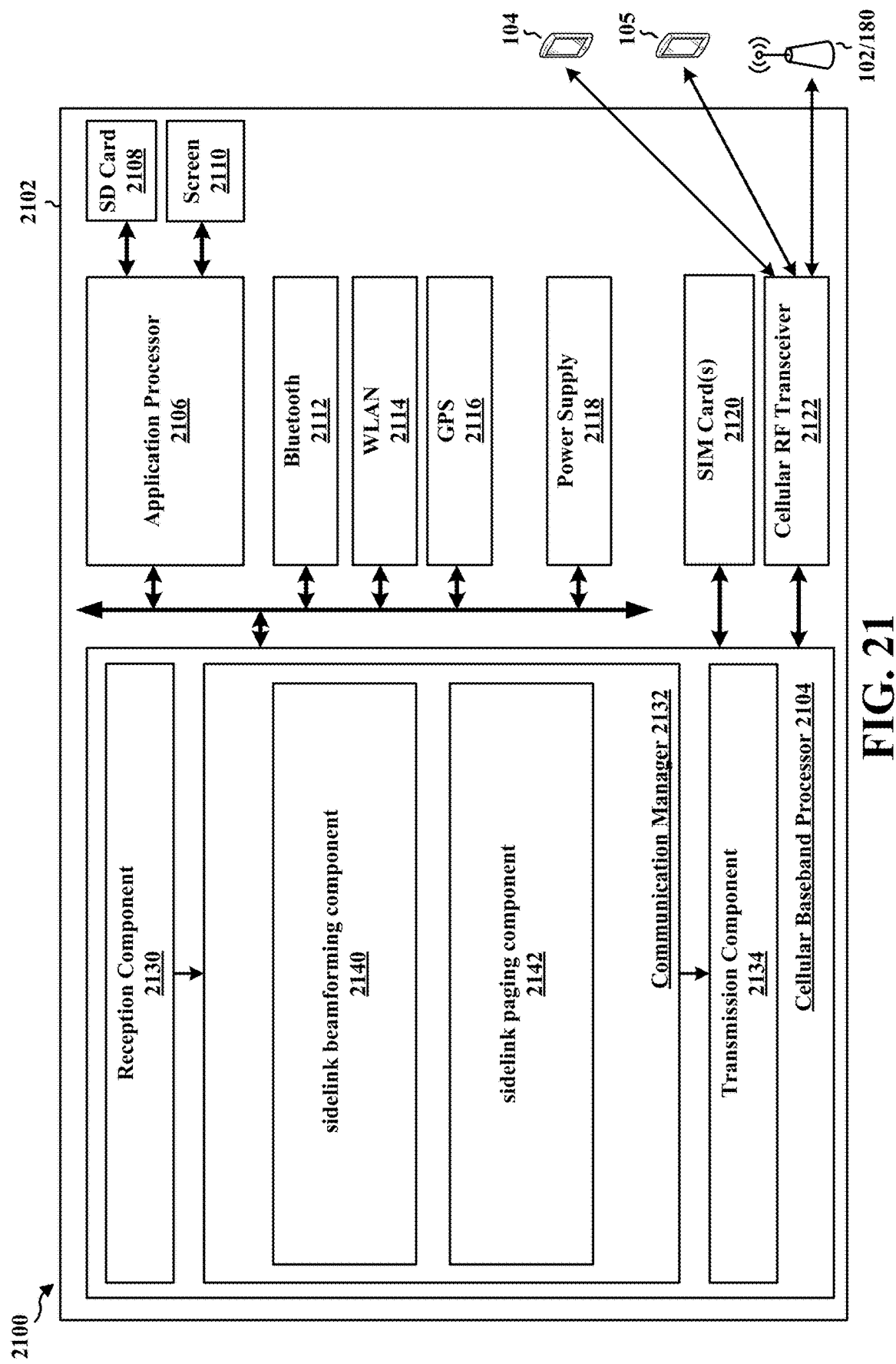
FIG. 21 is a diagram illustrating an example of a hardware implementation for an example apparatus.

FIG. 21 is a diagram 2100 illustrating an example of a hardware implementation for an apparatus 2102. The apparatus 2102 is a relay UE and includes a cellular baseband processor 2104 (also referred to as a modem) coupled to a cellular RF transceiver 2122 and one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, and a power supply 2118. The cellular baseband processor 2104 communicates through the cellular RF transceiver 2122 with another relay UE 104, a target UE 105, and/or BS 102/180. The cellular baseband processor 2104 may include a computer-readable medium/memory. The computer-readable medium/memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the UE 350 and may include the memory 360 and/or at least one of the TX processor 368, the RX processor 356, and the controller/processor 359. In one configuration, the apparatus 2102 may be a modem chip and include just the baseband processor 2104, and in another configuration, the apparatus 2102 may be the entire UE (e.g., see 350 of FIG. 3) and include the aforediscussed additional modules of the apparatus 2102.

The communication manager 2132 includes a sidelink beamforming component 2140 that is configured to receive, from each relay UE of a set of relay UEs, an SSB via each receive beam of a set of receive beams at the relay UE, each receive beam at the first UE corresponding to one transmit beam of a set of transmit beams at the relay UE, wherein the SSB received via each receive beam at the first UE is different from SSB s received from the relay UE via other receive beams of the set of receive beams, identify, for each relay UE of the set of relay UEs, a transmit-beam receive-beam pair, transmit an accept message to the relay UE, and change the one receive beam for receiving paging message to a second receive beam, e.g., as described in connection with 1302, 1304, 1402, 1404, 1706, and 1708. The communication manager 2132 further includes a sidelink paging component 2142 that is configured to receive, from each relay UE of the set of relay UEs, a paging message through one or more sidelink channels via at least the identified transmit-beam receive-beam pair for the relay UE, and decode the received paging message, e.g., as described in connection with 1306, 1308, 1406, 1702, 1704, 1710, 1712, 1802, and 1804.

The apparatus may include additional components that perform each of the blocks of the algorithm in the aforementioned flowcharts of FIGS. 11, 12, 13, 14, 17, and 18. As such, each block in the aforementioned flowcharts of FIGS. 11, 12, 13, 14, 17, and 18 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the cellular baseband processor 2104, includes means for receiving, from each UE of a set of UEs, an SSB through each transmit beam of a set of transmit beams from the UE through each receive beam of a set of receive beams at the first UE, means for determining, for each UE of the set of UEs, a transmit-beam receive-beam pair for the UE based on the received SSBs, the transmit-beam receive-beam pair for the UE including one transmit beam from the set of transmit beams and one receive beam from the set of receive beams, and means for receiving, from each UE of the set of UEs, a paging message through one or more sidelink channels via at least the identified transmit-beam receive-beam pair for the UE. The apparatus 2102 includes means for receiving, from a second UE, a paging message through one or more sidelink channels from each transmit beam of a set of transmit beams of the second UE through each receive beam of a set of receive beams at the first UE, and means for decoding the received paging message. The apparatus 2102 includes means for transmitting, to the second UE in response to receiving and decoding the paging message, an accept message, the accept message indicating at least one transmit beam of the set of transmit beams, means for receiving, from the second UE, a second paging message through one or more sidelink channels from each transmit beam of the at least one transmit beam of the second UE through each receive beam of a set of receive beams at the first UE, and means for decoding the received second paging message. The apparatus 2102 includes means for changing the one receive beam to a second receive beam, means for receiving, from the second UE, a second paging message through one or more sidelink channels from each transmit beam of a set of transmit beams of the second UE through the second receive beam, and means for decoding the received second paging message. The aforementioned means may be one or more of the aforementioned components of the apparatus 2102 configured to perform the functions recited by the aforementioned means. As described supra, the apparatus 2102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 22:
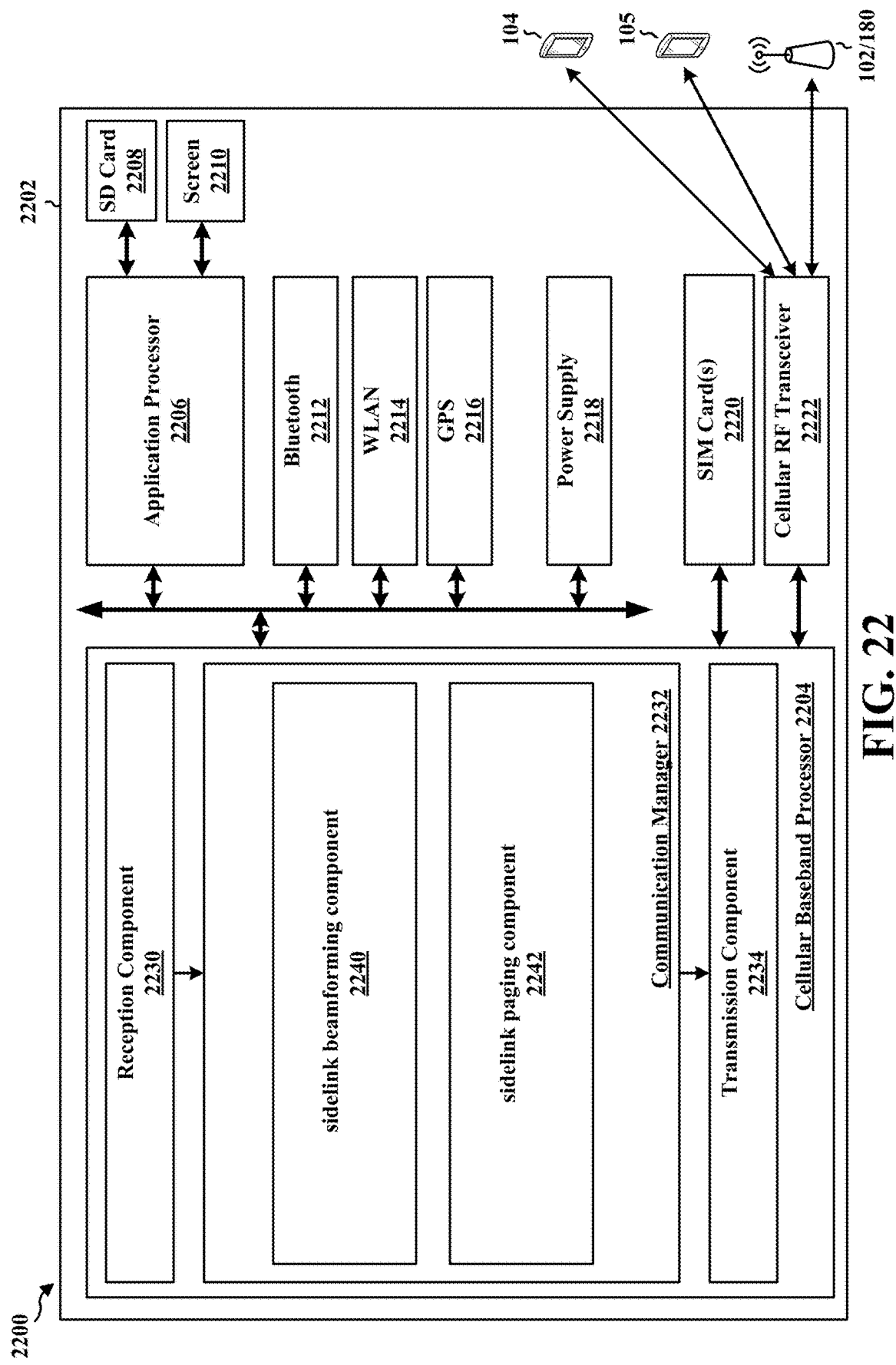
FIG. 22 is a diagram illustrating an example of a hardware implementation for an example apparatus.

FIG. 22 is a diagram 2200 illustrating an example of a hardware implementation for an apparatus 2202. The apparatus 2202 is a UE and includes a cellular baseband processor 2204 (also referred to as a modem) coupled to a cellular RF transceiver 2222 and one or more subscriber identity modules (SIM) cards 2220, an application processor 2206 coupled to a secure digital (SD) card 2208 and a screen 2210, a Bluetooth module 2212, a wireless local area network (WLAN) module 2214, a Global Positioning System (GPS) module 2216, and a power supply 2218. The cellular baseband processor 2204 communicates through the cellular RF transceiver 2222 with the relay UE 104, another target UE 105, and/or BS 102/180. The cellular baseband processor 2204 may include a computer-readable medium/memory. The computer-readable medium/memory may be non-transitory. The cellular baseband processor 2204 is responsible for general processing, including the execution of software stored on the computer-readable medium/memory. The software, when executed by the cellular baseband processor 2204, causes the cellular baseband processor 2204 to perform the various functions described supra. The computer-readable medium/memory may also be used for storing data that is manipulated by the cellular baseband processor 2204 when executing software. The cellular baseband processor 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the cellular baseband processor 2204. The cellular baseband processor 2204 may be a component of the UE 350 and may include the memory 360 and/or at least one of the TX processor 368, the RX processor 356, and the controller/processor 359. In one configuration, the apparatus 2202 may be a modem chip and include just the baseband processor 2204, and in another configuration, the apparatus 2202 may be the entire UE (e.g., see 350 of FIG. 3) and include the aforediscussed additional modules of the apparatus 2202.

The communication manager 2232 includes a sidelink beamforming component 2240 that is configured to transmit, to the target UE, a SSB through each transmit beam of a set of transmit beams at the second UE for each receive beam of a set of receive beams at the target UE, and receive, from the target UE, an accept message in response to the transmitted paging message, e.g., as described in connection with 1504, 1604, and 1906. The communication manager 2232 further includes a sidelink paging component 2242 that is configured to receive, from a base station, a paging relay request message including the paging message for a target UE, transmit, to the target UE based on the received paging relay request message, paging message through each transmit beam of a set of transmit beams at the second UE for each receive beam of a set of receive beams at the target UE, e.g., as described in connection with 1502, 1506, 1606, 1902, 1904, 1908, 2002, and 2004.

The apparatus may include additional components that perform each of the blocks of the algorithm in the aforementioned flowcharts of FIGS. 11, 12, 14 and 16. As such, each block in the aforementioned flowcharts of FIGS. 11, 12, 14 and 16 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2202, and in particular the cellular baseband processor 2204, includes means for transmitting, to a first UE, an SSB through each transmit beam of a set of transmit beams at the second UE for each receive beam of a set of receive beams at the first UE; and means for transmitting, to the first UE, a paging message through one or more sidelink channels via each transmit beam of the set of transmit beams. The apparatus 2202 includes means for receiving, from a base station, a paging relay request message including a paging message for a first UE, the paging relay request message requesting the second UE to transmit the paging message to the first UE; and means for transmitting, to the first UE based on the received paging relay request message, the paging message through each transmit beam of a set of transmit beams at the second UE for each receive beam of a set of receive beams at the first UE. The apparatus 2202 includes means for receiving, from the first UE, an accept message in response to the transmitted paging message, the accept message indicating at least one transmit beam of the set of transmit beams, and means for transmitting, to the first UE based on the accept message indicating the at least one transmit beam, a second paging message through one or more sidelink channels through each transmit beam of the at least one transmit beam of the second UE for each receive beam of a set of receive beams at the first UE. The aforementioned means may be one or more of the aforementioned components of the apparatus 2202 configured to perform the functions recited by the aforementioned means. As described supra, the apparatus 2202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

A target UE may receive, from each relay UE of a set of relay UEs, an SSB through each transmit beam of a set of transmit beams from the UE through each receive beam of a set of receive beams at the target UE. The relay UE may transmit the paging message through each transmit beam of the set of transmit beams. The target UE may determine a beam pair based on the received SSB, and receive the paging messaged using the beam pair.

The target UE may also receive, from a relay UE, a paging message through one or more sidelink channels from each transmit beam of a set of transmit beams of the relay UE through each receive beam of a set of receive beams at the target UE and decode the received paging message.

The set of transmit beams may include N transmit beams and the set of receive beams may include M receive beams. The set of transmit beams may include the beams $t_1, t_2, \ldots, t_N$, and the set of receive beams may include the beams $r_1, r_2, \ldots, r_M$.

The target UE may receive, for each transmit beam of the set of N transmit beams, the paging message from a same transmit beam M times through each receive beam of the set of M receive beams, and the target UE may receive the paging messages from the relay UE may include receiving, for each of $i=1, 2, \ldots, N$, the paging message through beam pair $t_i$-$r_j$ for $j=1, 2, \ldots, M$.

The target UE may receive, for each receive beam of the set of M receive beams, the paging message through the receive beam from a different transmit beam of the set of N transmit beams, and the target UE may receive the paging messages from the relay UE may include receiving, for each of $j=1, 2, \ldots, M$, the paging message through beam pair $t_i$-$r_j$ for $i=1, 2, \ldots, N$.

The set of transmit beams may include N transmit beams and the set of receive beams may include one receive beam. The set of transmit beams may include the beams $t_1, t_2, \ldots, t_N$, and the set of receive beams may include the beam r. The target UE may receive the paging message from each transmit beam of the set of N transmit beams through the one receive beam, and the target UE may receive the paging message through beam pair $t_i$-r for $i=1, 2, \ldots, N$.

In response to receiving and decoding the paging message, the target UE may transmit, to the relay UE, an accept message indicating at least one transmit beam of the set of transmit beams. The target UE may also refine the receive beam by changing the receive beam.

Figure 23:
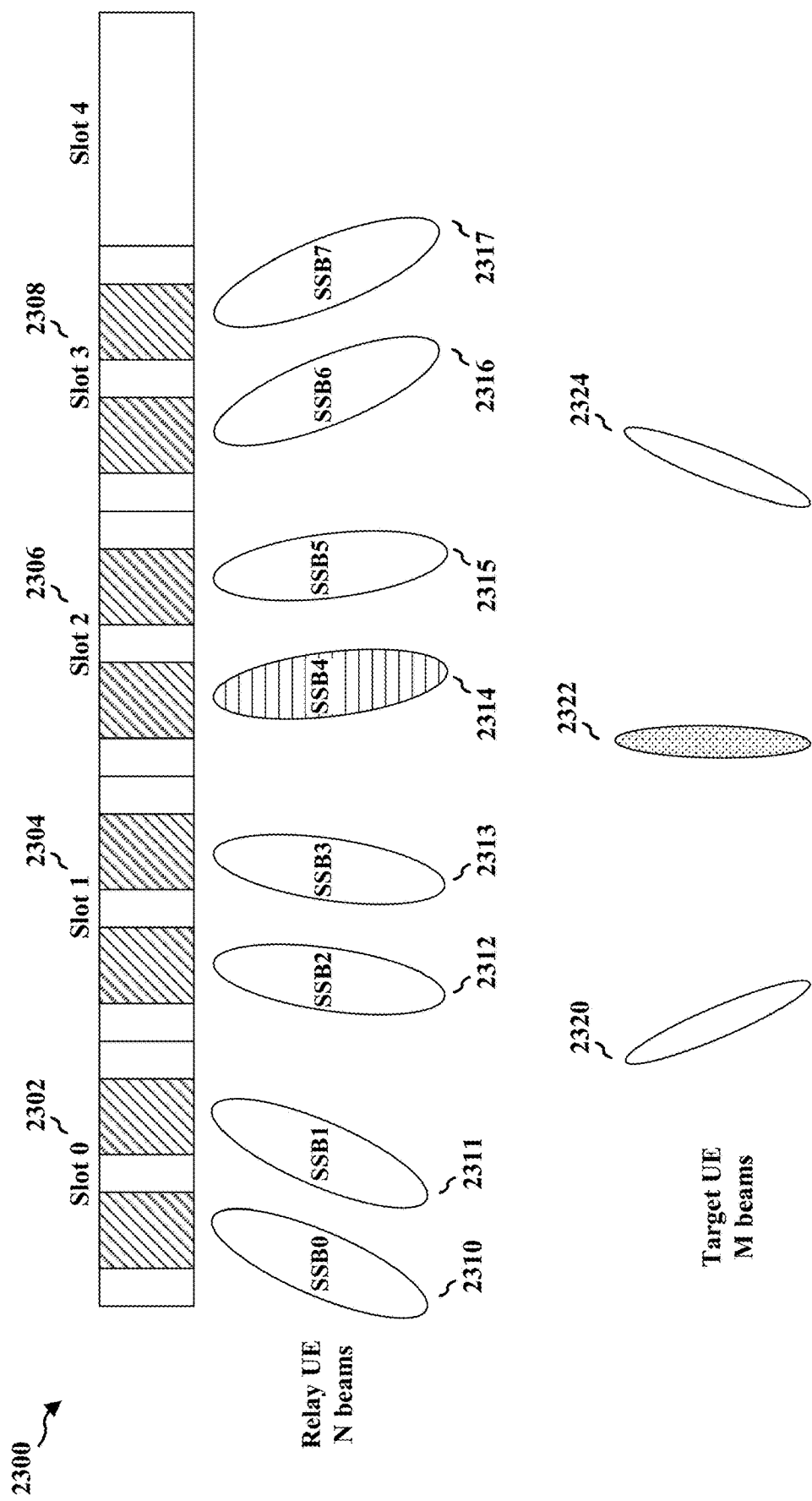
FIG. 23 illustrates an example of beamforming on sidelink communication.

FIG. 23 illustrates an example 2300 of beamforming on sidelink communication. In some aspects, a relay UE and a target UE may have an established paging relay association. That is, the relay UE is associated with the target UE as a relay UE, and the target UE may be aware of that the relay UE is associated with the target UE. The target UE may measure the RSRP of SSB beams from the relay UE, and select the suitable beam pair. The relay UE may transmit the SSBs through a set of N transmit beams, and the target UE may receive SSBs through a set of M receive beams. The target UE may measure beam measurements of the SSBs received through the set of N transmit beams and the set of M receive beams. The target UE may select or determine one or more transmit-beam receive-beam pairs, each of the transmit-beam receive-beam pair including a transmit beam from the set of N transmit beams and a receive beam from the set of M receive beams, based on the beam measurements.

The beamforming may include the relay UE and the target UE to select the Tx/Rx beams by sweeping their beams. In some aspects, the relay UE may transmit SSBs by sweeping N transmit beams. In one aspect, SSB0 may be transmitted on first transmit beam 2310 and SSB1 may be transmitted on second transmit beam 2311 in Slot 0 2302, SSB2 may be transmitted on third transmit beam 2312 and SSB3 may be transmitted on fourth transmit beam 2313 in Slot 1 2304, SSB4 may be transmitted on fifth transmit beam 2314 and SSB5 may be transmitted on sixth transmit beam 2315 in Slot 2 2306, and SSB6 may be transmitted on seventh transmit beam 2316 and SSB7 may be transmitted on eighth transmit beam 2317 in Slot 3 2308 to the target UE. The target UE may receive the SSB0-SSB7 2310 to 2317 through the M receive beams including first receive beam 2320, second receive beam 2322, and third receive beam 2324. The target UE may determine that the SSB received through the fifth transmit beam 2314 and the second receive beam 2322 has the greatest RSRP measurement, and the target UE may determine that the transmit-beam receive-beam pair may include the fifth transmit beam 2314 and the second receive beam 2322.

In some aspects, the target UE may use a suitable Rx beam to receive the paging message. That is, the relay UE may transmit the paging message to the target UE through at least one transmit beam of the set of N transmit beams, the at least one transmit beam including the transmit beam of the determined one or more transmit-beam receive-beam pairs. The target UE may receive the paging message from the relay UE through the receive beam of the determined one or more transmit-beam receive-beam pairs.

In some aspects, the target UE may report the selected SSB beams to the relay UE. That is, the target UE may report the result of determining the one or more transmit-beam receive-beam pairs to the relay UE. The target UE may report the transmit beam associated with the one or more transmit-beam receive-beam pairs to the relay UE. In some aspects, the target UE may transmit a beam measurement report associated with the determined transmit-beam receive-beam pair to the relay UE and determine the transmit beam of the transmit-beam receive-beam pair based on the beam measurement report. The relay UE may transmit the paging message to the target UE through the determined transmit beam of the transmit-beam receive-beam pair. In some aspects, the target UE may transmit information indicating the transmit beam associated with the transmit-beam receive-beam pair, and the relay UE may transmit the paging message to the target UE through the reported transmit beam of the transmit-beam receive-beam pair.

Figure 24:
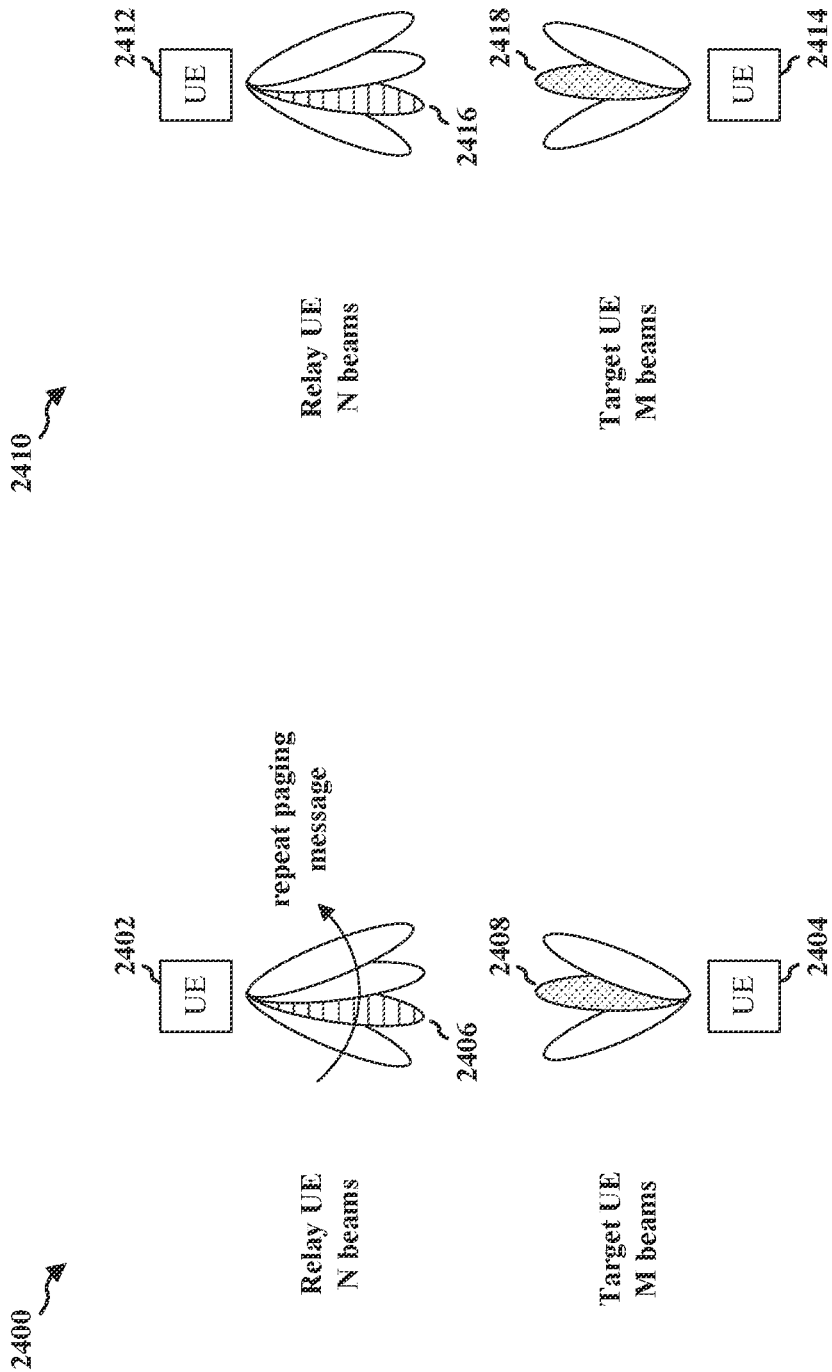
FIGS. 24A and 24B illustrate examples of paging message transmission.

FIGS. 24A and 24B illustrate examples 2400 and 2410 of paging message transmission. Referring to FIG. 24A, the example 2400 may include a relay UE 2402 and a target UE 2404. The target UE 2404 may determine that the transmit beam 2406 of the N transmit beams and the receive beam 2408 of the M receive beams as the one or more transmit-beam receive-beam pairs based on the transmitted SSB. In some aspects, the target UE 2404 may not report the selected beam pair to the relay UE 2402. That is, the target UE 2404 may not report the determined one or more transmit-beam receive-beam pairs to the relay UE 2402.

The relay UE 2402 may not be aware of the beam pair selected by the target UE 2404. That is, the relay UE 2402 may not determine the transmit beam of the N transmit beams associated with the transmit-beam receive-beam pair determined by the target UE 2404. Accordingly, the relay UE 2402 may repeat the transmission of the paging message on all transmit beams. That is, the relay UE 2402 may not determine the transmit beam of the N transmit beams associated with the transmit-beam receive-beam pair to transmit the paging message, and the relay UE 2402 may repeat the transmission of the paging message on all N transmit beams. The target UE 2404 may receive the paging message through the transmit beam 2406 of the N transmit beams and the receive beam 2408 of the M receive beams associated with the one or more transmit-beam receive-beam pairs determined based on the transmitted SSB.

The example 2400 may be a simple operation but may have increased power consumption. That is, the target UE 2404 may omit the reporting of the determined one or more transmit-beam receive-beam pairs to the relay UE 2402, and the overall operation may be simplified. The target UE 2404 may have increased power consumption from repeating the transmission of the paging message on all N transmit beams.

Referring to FIG. 24B, the example 2410 may include a relay UE 2412 and a target UE 2414. The target UE 2414 may determine that the transmit beam 2416 of the N transmit beams and the receive beam 2418 of the M receive beams as the one or more transmit-beam receive-beam pairs based on the transmitted SSB.

In some aspects, the paging relay association may be established through a unicast connection between relay UE 2412 and target UE 2414 (access and mobility management function (AMF)/gNB or target UE may select the relay UEs), and the target UE 2414 may report the selected beam pair to the relay UE 2412 based on configuration. That is, the target UE 2414 may report the determined one or more transmit-beam receive-beam pairs to the relay UE 2412. The report can be a beam measurement report or signal informing the relay UE 2412 about the beams selected by the target UE 2414 to receive the paging messages.

In some aspects, the target UE 2414 may transmit a beam measurement report associated with the determined transmit-beam receive-beam pair to the relay UE 2412 and determine the transmit beam of the transmit-beam receive-beam pair based on the beam measurement report. The relay UE 2412 may transmit the paging message to the target UE 2414 through the determined transmit beam of the transmit-beam receive-beam pair. In some aspects, the target UE 2414 may transmit information indicating the transmit beam associated with the transmit-beam receive-beam pair, and the relay UE 2412 may transmit the paging message to the target UE 2414 through the reported transmit beam of the transmit-beam receive-beam pair.

In some aspects, the signaling/reporting may be transmitted in the form of layer-1, layer-2, or layer-3 signaling. That is, the target UE 2414 may report the determined one or more transmit-beam receive-beam pairs to the relay UE 2412 using the layer-1 (i.e., physical layer) signaling, the layer-2 (i.e., MAC layer, RLC layer, PDCP layer, or SDAP layer) signaling, or the layer-3 (i.e., RRC layer) signaling.

The relay UE 2412 may be aware of the beam pair selected by the target UE 2414. That is, the relay UE 2412 may determine the transmit beam of the N transmit beams associated with the transmit-beam receive-beam pair determined by the target UE 2414. The relay UE 2412 may determine that the transmit beam 2416 is associated with the transmit-beam receive-beam pair based on the transmit-beam receive-beam pair selected by the target UE 2414.

The relay UE 2412 may transmit the paging message on the selected beam pair. That is, the relay UE 2412 may determine the transmit beam of the N transmit beams associated with the transmit-beam receive-beam pair to transmit the paging message, and the relay UE 2412 may transmit the paging message on the transmit beam associated with the transmit-beam receive-beam pair. The relay UE 2412 may transmit the paging message on the transmit beam 2416 associated with the transmit-beam receive-beam pair to the target UE 2414. The target UE 2414 may receive the paging message through the transmit beam 2416 of the N transmit beams and the receive beam 2418 of the M receive beams associated with the one or more transmit-beam receive-beam pairs determined based on the transmitted SSB.

Accordingly, the target UE 2414 of example 2410 may have reduced power consumption from transmitting the paging message on the transmit beam 2416 associated with the transmit-beam receive-beam pair determined by the target UE 2414 and not repeating the transmission of the paging message on all N transmit beams.

Figure 25:
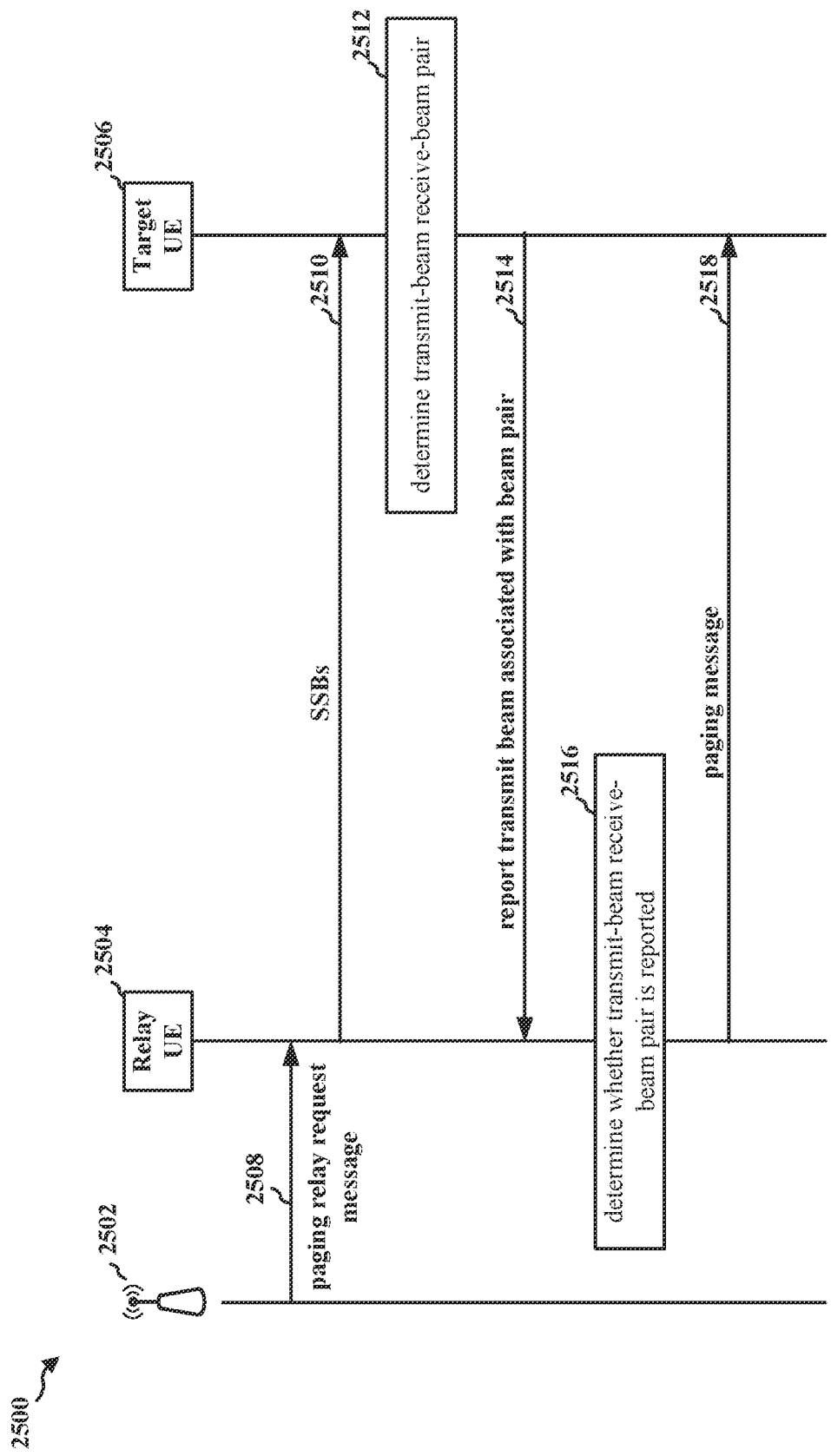
FIG. 25 is a call-flow diagram of a method of wireless communication.

FIG. 25 is a call-flow diagram 2500 of a method of wireless communication. The wireless communication of FIG. 25 may include a base station 2502, a relay UE 2504, and a target UE 2506.

At 2508, the relay UE 2504 may receive, from a base station 2502, a paging relay request message including a paging message for a target UE 2506. The base station 2502 may transmit the paging relay request message to the relay UE 2504 to request the relay UE 2504 to transmit the paging message to the target UE 2506. The relay UE 2504 may transmit the paging message to the target UE 2506 through one or more sidelink channels based on the received paging relay request message.

At 2510, the relay UE may transmit SSBs to the target UE by sweeping N transmit beams, and the target UE may receive the transmitted SSBs from the relay UE by sweeping M receive beams. The relay UE may transmit the SSBs through each transmit beam of the N transmit beams. The target UE may receive the transmitted SSB through each receive beam of the M receive beams.

At 2512, the target UE may determine a transmit-beam receive-beam pair based on the received SSBs. The transmit-beam receive-beam pair may include one transmit beam from the N transmit beams and one receive beam from the M receive beams. The target UE may measure the RSRP of SSBs received from the relay UE, and determine the transmit-beam receive-beam pair based on the RSRP measurement of the received SSBs.

At 2514, the target UE may report the transmit beam associated with the determined transmit-beam receive-beam pair to the relay UE, and the relay UE may receive the reporting that indicates one transmit beam associated with the transmit-beam receive-beam pair based on the transmitted SSBs. In one aspect, the target UE may transmit a beam measurement report associated with the determined transmit-beam receive-beam pair to the relay UE and the relay UE may determine the transmit beam of the transmit-beam receive-beam pair based on the beam measurement report. In another aspect, the target UE may transmit information indicating the transmit beam associated with the transmit-beam receive-beam pair. The reporting may include one or more of layer-1 signaling, layer-2 signaling, or layer-3 signaling.

At 2516, the relay UE may determine whether the reporting that indicates one transmit beam associated with the transmit-beam receive-beam pair based on the transmitted SSBs is received from the target UE.

At 2518, the relay UE may transmit the paging message through one or more sidelink channels via the at least one transmit beam, and the target UE may receive the paging message via the determined transmit-beam receive-beam pair. The target UE may receive the paging message transmitted by the relay UE through the transmit beam and the receive beam associated with the transmit-beam receive-beam pair.

The relay UE may transmit the paging message based on the determination of whether the reporting that indicates one transmit beam associated with the transmit-beam receive-beam pair based on the transmitted SSBs is received from the target UE at 2516. In response to determining that the reporting of the transmit beam associated with the transmit-beam receive-beam pair based on the transmitted SSBs is received from the target UE, the relay UE may transmit the paging message N times through each transmit beam of the N transmit beams. In response to determining that reporting of the transmit beam associated with the transmit-beam receive-beam pair based on the transmitted SSBs is received from the target UE, the relay UE may transmit the paging message through the transmit beam associated with the received transmit-beam receive-beam pair.

Figure 26:
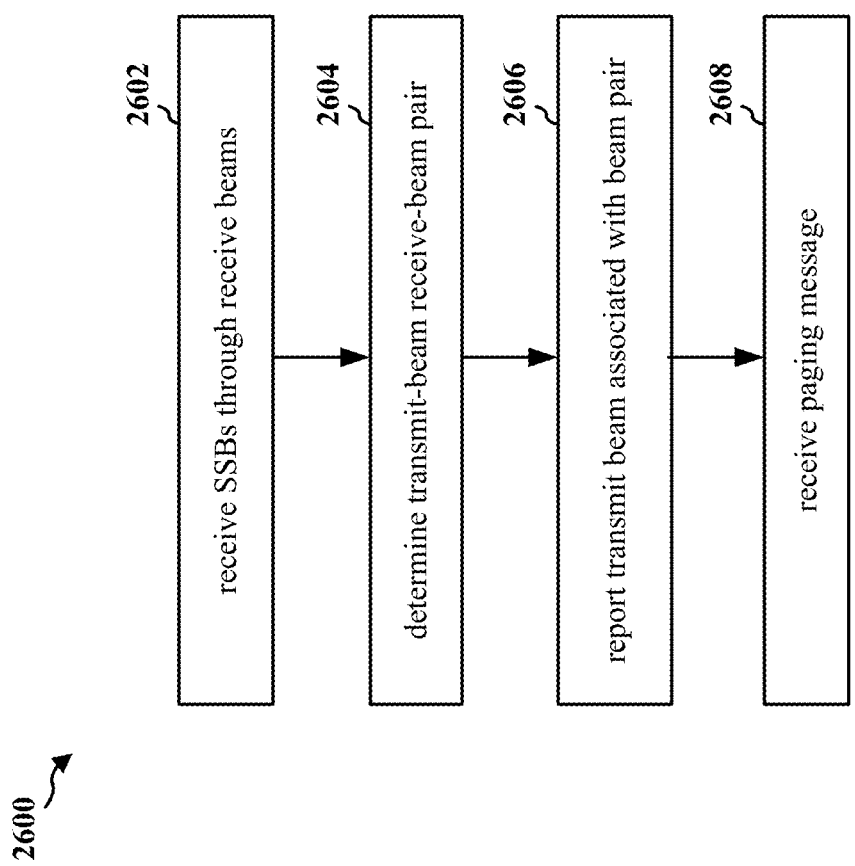
FIG. 26 is a flowchart of a method of wireless communication.

FIG. 26 is a flowchart 2600 of a method of wireless communication. The method may be performed by a first UE (e.g., the target UE 504, 506, 508, 2304, 2404, 2414, and 2506; the apparatus 3002).

At 2602, the first UE may receive an SSB through each transmit beam of a set of transmit beams from a relay UE through each receive beam of a set of receive beams at the first UE (i.e., at 2510). The relay UE may transmit the SSBs through N transmit beams, and the first UE may receive the transmitted SSBs from the relay UE by sweeping M receive beams. The first UE may receive the SSB transmitted by the relay UE through each receive beam of the M receive beams. For example, 2602 may be performed by a sidelink beamforming component 3040.

At 2604, the first UE may determine a transmit-beam receive-beam pair based on the received SSBs. The transmit-beam receive-beam pair may include one transmit beam from the set of transmit beams and one receive beam from the set of receive beams (i.e., at 2512). The transmit-beam receive-beam pair may include one transmit beam from the N transmit beams and one receive beam from the M receive beams. The first UE may measure the RSRP of SSBs received from the relay UE, and determine the transmit-beam receive-beam pair based on the RSRP measurement of the received SSBs. For example, 2604 may be performed by the sidelink beamforming component 3040.

At 2606, the first UE may report the one transmit beam associated with the determined transmit-beam receive-beam pair to the relay UE (i.e., at 2514). The first UE may report the one transmit beam associated with the determined transmit-beam receive-beam pair by transmitting a beam measurement report associated with the determined transmit-beam receive-beam pair to the relay UE. The first UE may report the one transmit beam associated with the determined transmit-beam receive-beam pair by transmitting the information indicating the transmit beam associated with the transmit-beam receive-beam pair. The reporting may be transmitted on one or more of layer-1 signaling, layer-2 signaling, or layer-3 signaling. For example, 2606 may be performed by the sidelink beamforming component 3040.

At 2608, the first UE may receive the paging message through one or more sidelink channels via at least the determined transmit-beam receive-beam pair (i.e., at 2518). The first UE may receive the paging message transmitted by the relay UE through the transmit beam and the receive beam associated with the transmit-beam receive-beam pair. For example, 2608 may be performed by a sidelink paging component 3042.

Figure 27:
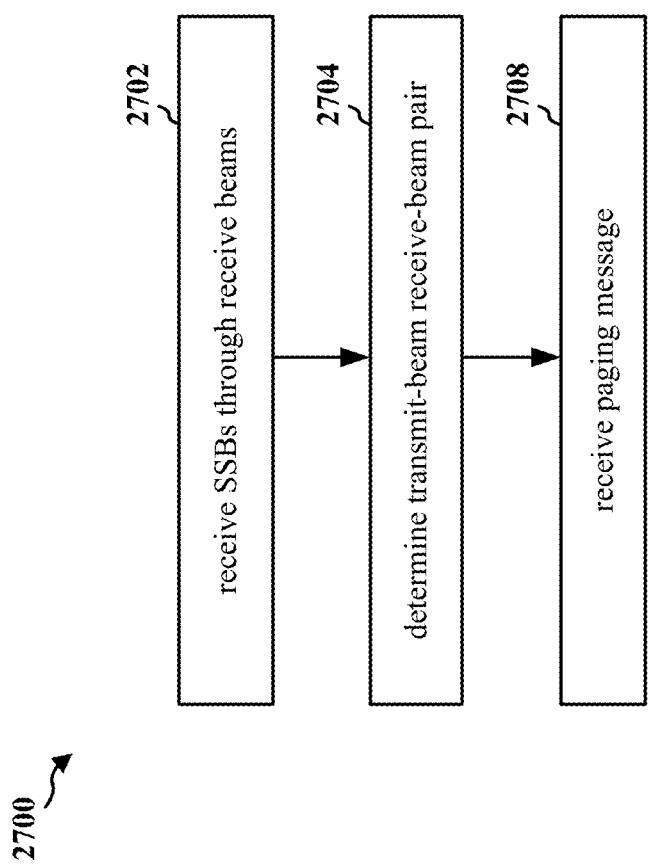
FIG. 27 is a flowchart of a method of wireless communication.

FIG. 27 is a flowchart 2700 of a method of wireless communication. The method may be performed by a first UE (e.g., the target UE 504, 506, 508, 2404, 2414, and 2506; the apparatus 3002).

At 2702, the first UE may receive an SSB through each transmit beam of a set of transmit beams from a relay UE through each receive beam of a set of receive beams at the first UE (i.e., at 2510). The relay UE may transmit the SSBs through N transmit beams, and the first UE may receive the transmitted SSBs from the relay UE by sweeping M receive beams. The first UE may receive the SSB transmitted by the relay UE through each receive beam of the M receive beams. For example, 2702 may be performed by a sidelink beamforming component 3040.

At 2704, the first UE may determine a transmit-beam receive-beam pair based on the received SSBs. The transmit-beam receive-beam pair may include one transmit beam from the set of transmit beams and one receive beam from the set of receive beams (i.e., at 2512). The transmit-beam receive-beam pair may include one transmit beam from the N transmit beams and one receive beam from the M receive beams. The first UE may measure the RSRP of SSBs received from the relay UE, and determine the transmit-beam receive-beam pair based on the RSRP measurement of the received SSBs. For example, 2704 may be performed by the sidelink beamforming component 3040.

At 2708, the first UE may receive the paging message through one or more sidelink channels via at least the determined transmit-beam receive-beam pair (i.e., at 2518). The first UE may receive the paging message transmitted by the relay UE through the transmit beam and the receive beam associated with the transmit-beam receive-beam pair. For example, 2708 may be performed by a sidelink paging component 3042.

Figure 28:
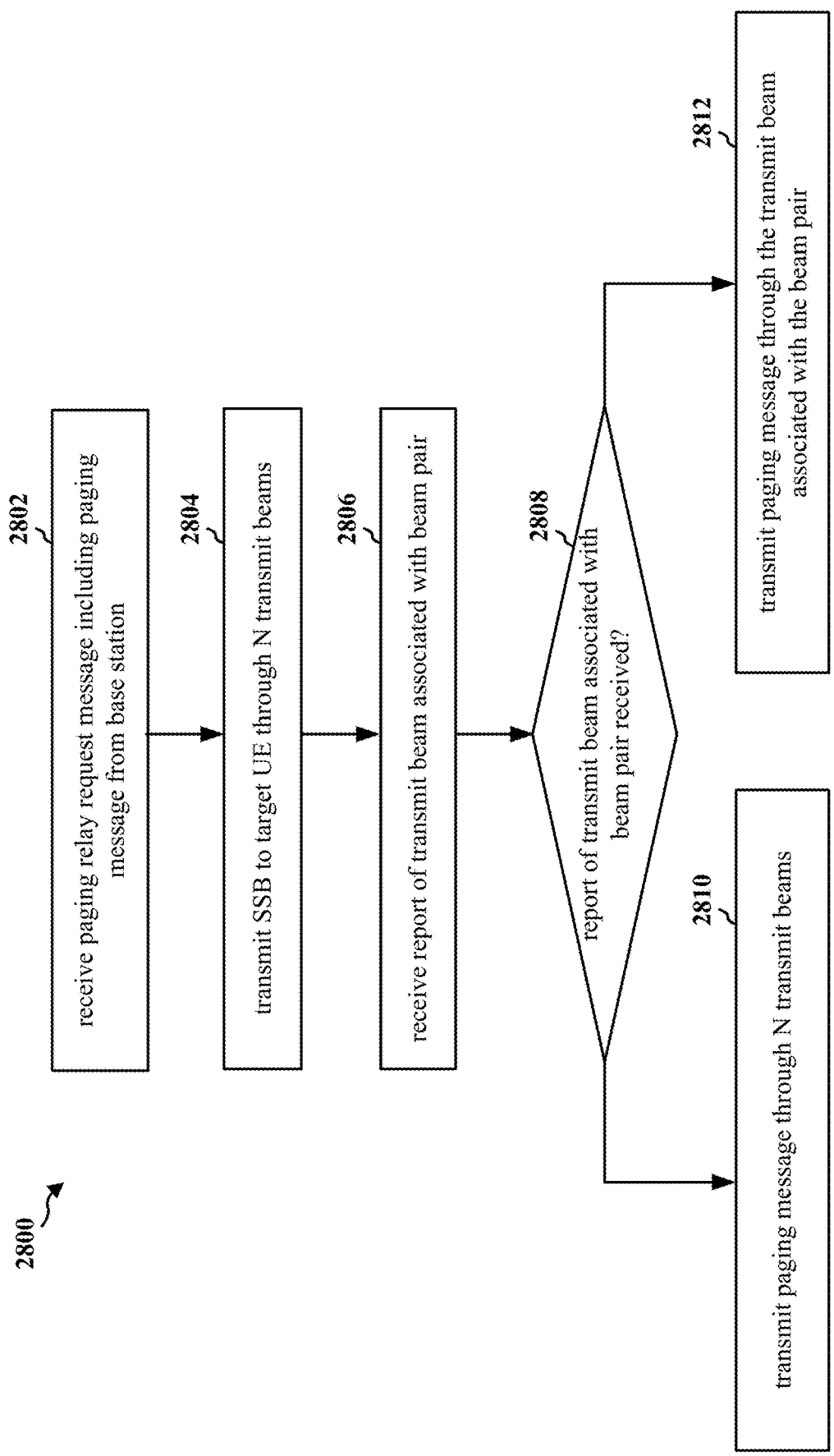
FIG. 28 is a flowchart of a method of wireless communication.

FIG. 28 is a flowchart 2800 of a method of wireless communication. The method may be performed by a second UE (e.g., the relay UE 104, 504, 2402, 2412, and 2504; the apparatus 3002).

At 2802, the second UE may receive, from a base station, a paging relay request message including a paging message for a target UE. (i.e., at 2508). The paging relay request message may be transmitted by the base station to request the second UE to transmit the paging message to the target UE. For example, 2802 may be performed by a sidelink beamforming component 3140.

At 2804, the second UE may transmit, to the target UE, the SSB through each transmit beam of a set of transmit beams for each receive beam of a set of receive beams at the target UE (i.e., at 2510). The second UE may transmit SSBs to the target UE by sweeping N transmit beams, and the target UE may receive the transmitted SSBs from the second UE by sweeping M receive beams. The second UE may transmit the SSBs through each transmit beam of the N transmit beams. For example, 2804 may be performed by the sidelink beamforming component 3140.

At 2806, the second UE may receive the reporting that indicates one transmit beam associated with the transmit-beam receive-beam pair based on the transmitted SSBs (i.e., at 2514). In one aspect, the second UE may receive a beam measurement report associated with the determined transmit-beam receive-beam pair from the target UE determine the transmit beam of the transmit-beam receive-beam pair based on the beam measurement report. In another aspect, the second UE may receive the information indicating the transmit beam associated with the transmit-beam receive-beam pair. The reporting may be received on one or more of layer-1 signaling, layer-2 signaling, or layer-3 signaling. For example, 2806 may be performed by the sidelink beamforming component 3140.

At 2808, the second UE may determine whether the reporting that indicates one transmit beam associated with the transmit-beam receive-beam pair based on the transmitted SSBs is received from the target UE (i.e., at 2516). For example, 2808 may be performed by the sidelink beamforming component 3140.

At 2810, the second UE may transmit the paging message through one or more sidelink channels via the at least one transmit beam (i.e., at 2518). Based on determining that the reporting that indicates one transmit beam associated with the transmit-beam receive-beam pair is not received from the target UE at 2808, the second UE may transmit the paging message N times through each transmit beam of the N transmit beams. For example, 2810 may be performed by a sidelink paging component 3142.

At 2812, the second UE may transmit the paging message through one or more sidelink channels via the one transmit beam (i.e., at 2518). Based on determining that the reporting that indicates one transmit beam associated with the transmit-beam receive-beam pair is received from the target UE at 2808, the second UE may transmit the paging message once through the one transmit beam based on the received reporting. For example, 2812 may be performed by the sidelink paging component 3142.

Figure 29:
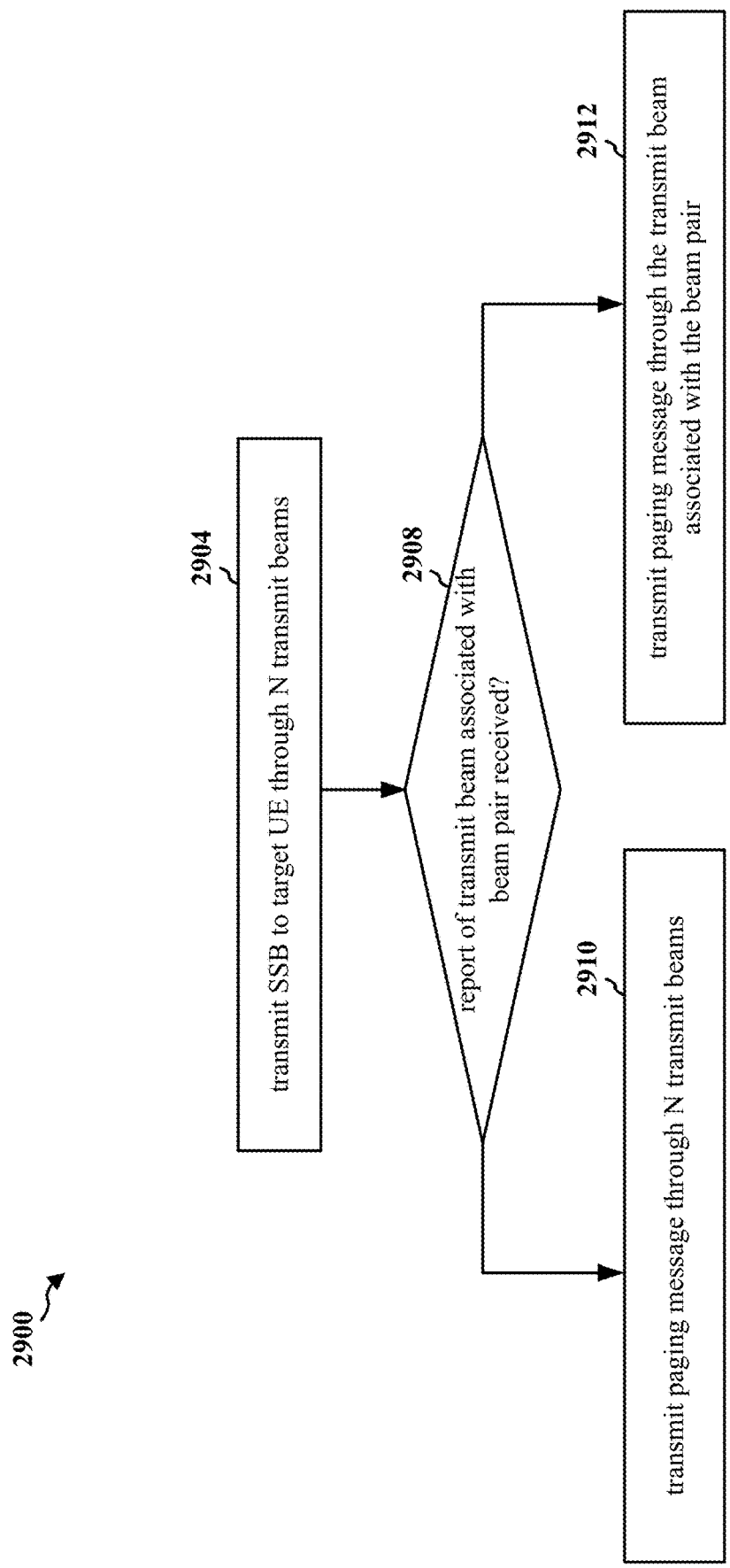
FIG. 29 is a flowchart of a method of wireless communication.

FIG. 29 is a flowchart 2900 of a method of wireless communication. The method may be performed by a second UE (e.g., the relay UE 104, 504, 2402, 2412, and 2504; the apparatus 3002).

At 2904, the second UE may transmit, to the target UE, the SSB through each transmit beam of a set of transmit beams for each receive beam of a set of receive beams at the target UE (i.e., at 2510). The second UE may transmit SSBs to the target UE by sweeping N transmit beams, and the target UE may receive the transmitted SSBs from the second UE by sweeping M receive beams. The second UE may transmit the SSBs through each transmit beam of the N transmit beams. For example, 2904 may be performed by the sidelink beamforming component 3140.

At 2908, the second UE may determine whether the reporting that indicates one transmit beam associated with the transmit-beam receive-beam pair based on the transmitted SSBs is received from the target UE (i.e., at 2516). For example, 2908 may be performed by the sidelink beamforming component 3140.

At 2910, the second UE may transmit the paging message through one or more sidelink channels via the at least one transmit beam (i.e., at 2518). Based on determining that the reporting that indicates one transmit beam associated with the transmit-beam receive-beam pair is not received from the target UE at 2908, the second UE may transmit the paging message N times through each transmit beam of the N transmit beams. For example, 2910 may be performed by a sidelink paging component 3142.

At 2912, the second UE may transmit the paging message through one or more sidelink channels via the one transmit beam (i.e., at 2518). Based on determining that the reporting that indicates one transmit beam associated with the transmit-beam receive-beam pair is received from the target UE at 2908, the second UE may transmit the paging message once through the one transmit beam based on the received reporting. For example, 2912 may be performed by the sidelink paging component 3142.

Figure 30:
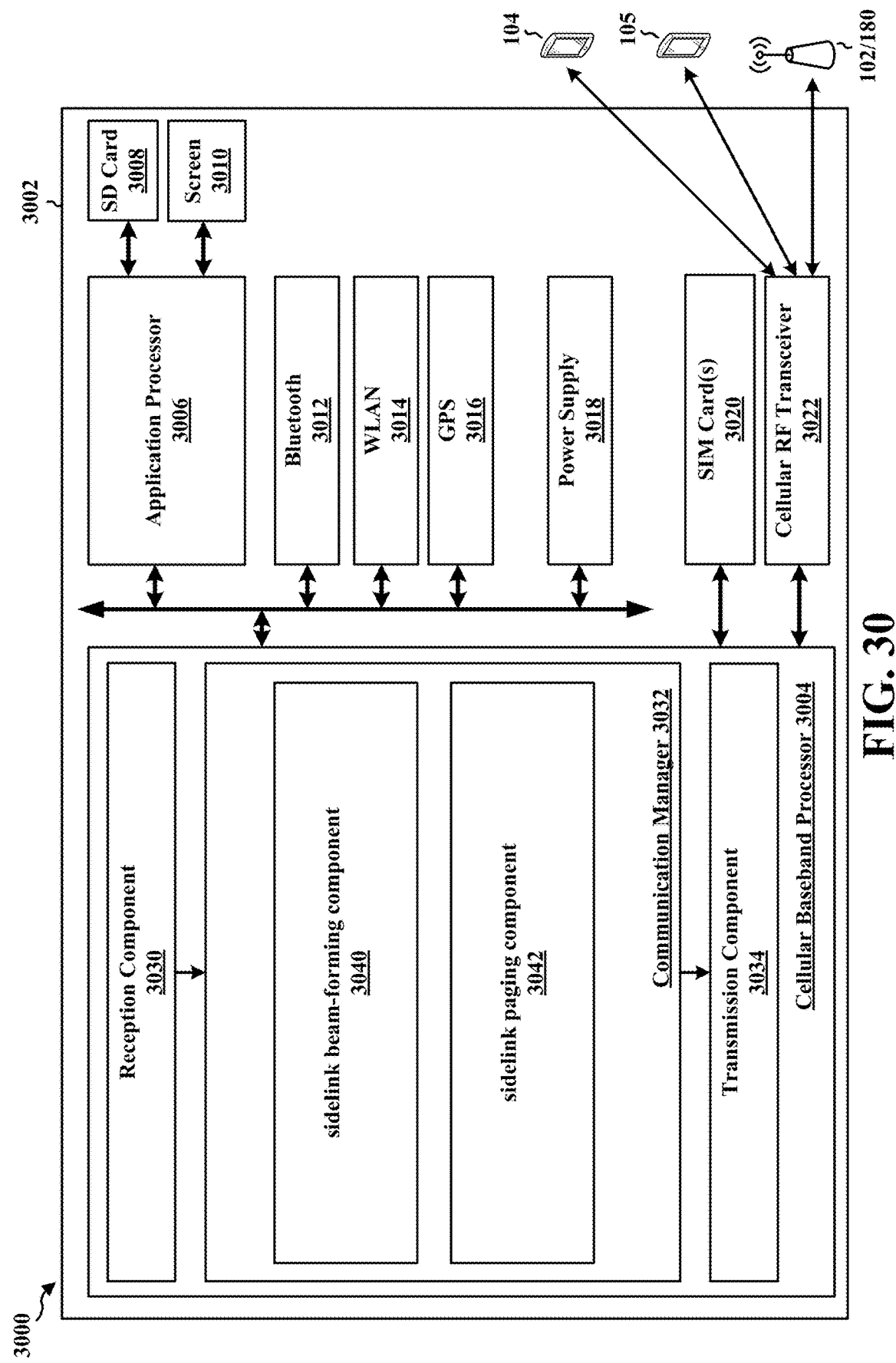
FIG. 30 is a diagram illustrating an example of a hardware implementation for an apparatus.

FIG. 30 is a diagram 3000 illustrating an example of a hardware implementation for an apparatus 3002. The apparatus 3002 is a relay UE and includes a cellular baseband processor 3004 (also referred to as a modem) coupled to a cellular RF transceiver 3022 and one or more subscriber identity modules (SIM) cards 3020, an application processor 3006 coupled to a secure digital (SD) card 3008 and a screen 3010, a Bluetooth module 3012, a wireless local area network (WLAN) module 3014, a Global Positioning System (GPS) module 3016, and a power supply 3018. The cellular baseband processor 3004 communicates through the cellular RF transceiver 3022 with a relay UE 104, another target UE 105, and/or BS 102/180. The cellular baseband processor 3004 may include a computer-readable medium/memory. The computer-readable medium/memory may be non-transitory. The cellular baseband processor 3004 is responsible for general processing, including the execution of software stored on the computer-readable medium/memory. The software, when executed by the cellular baseband processor 3004, causes the cellular baseband processor 3004 to perform the various functions described supra. The computer-readable medium/memory may also be used for storing data that is manipulated by the cellular baseband processor 3004 when executing software. The cellular baseband processor 3004 further includes a reception component 3030, a communication manager 3032, and a transmission component 3034. The communication manager 3032 includes the one or more illustrated components. The components within the communication manager 3032 may be stored in the computer-readable medium/memory and/or configured as hardware within the cellular baseband processor 3004. The cellular baseband processor 3004 may be a component of the UE 350 and may include the memory 360 and/or at least one of the TX processor 368, the RX processor 356, and the controller/processor 359. In one configuration, the apparatus 3002 may be a modem chip and include just the baseband processor 3004, and in another configuration, the apparatus 3002 may be the entire UE (e.g., see 350 of FIG. 3) and include the aforediscussed additional modules of the apparatus 3002.

The communication manager 3032 includes a sidelink beamforming component 3040 that is configured to receive an SSB through each transmit beam of a set of transmit beams from a relay UE through each receive beam of a set of receive beams, determine a transmit-beam receive-beam pair based on the received SSBs, and report the one transmit beam associated with the determined transmit-beam receive-beam pair to the relay UE, e.g., as described in connection with 2602, 2604, 2606, 2702, and 2704. The communication manager 3032 further includes a sidelink paging component 3042 that is configured to receive the paging message through one or more sidelink channels via at least the determined transmit-beam receive-beam pair, e.g., as described in connection with 2608 and 2708.

The apparatus may include additional components that perform each of the blocks of the algorithm in the aforementioned flowcharts of FIGS. 25, 26, and 27. As such, each block in the aforementioned flowcharts of FIGS. 25, 26, and 27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3002, and in particular the cellular baseband processor 3004, includes means for receiving a synchronization signal block (SSB) through each transmit beam of a set of transmit beams from a second UE through each receive beam of a set of receive beams at the first UE, means for determining a transmit-beam receive-beam pair based on the received SSBs, the transmit-beam receive-beam pair including one transmit beam from the set of transmit beams and one receive beam from the set of receive beams, and means for receiving a paging message through one or more sidelink channels via at least the determined transmit-beam receive-beam pair. The apparatus 3002 includes means for reporting to the second UE the one transmit beam associated with the determined transmit-beam receive-beam pair, where the paging message is received through the determined transmit-beam receive-beam pair based on the reporting. The apparatus 3002 includes means for transmitting a beam measurement report associated with the determined transmit-beam receive-beam pair, or means for transmitting information indicating the one transmit beam associated with the determined transmit-beam receive-beam pair. The aforementioned means may be one or more of the aforementioned components of the apparatus 3002 configured to perform the functions recited by the aforementioned means. As described supra, the apparatus 3002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 31:
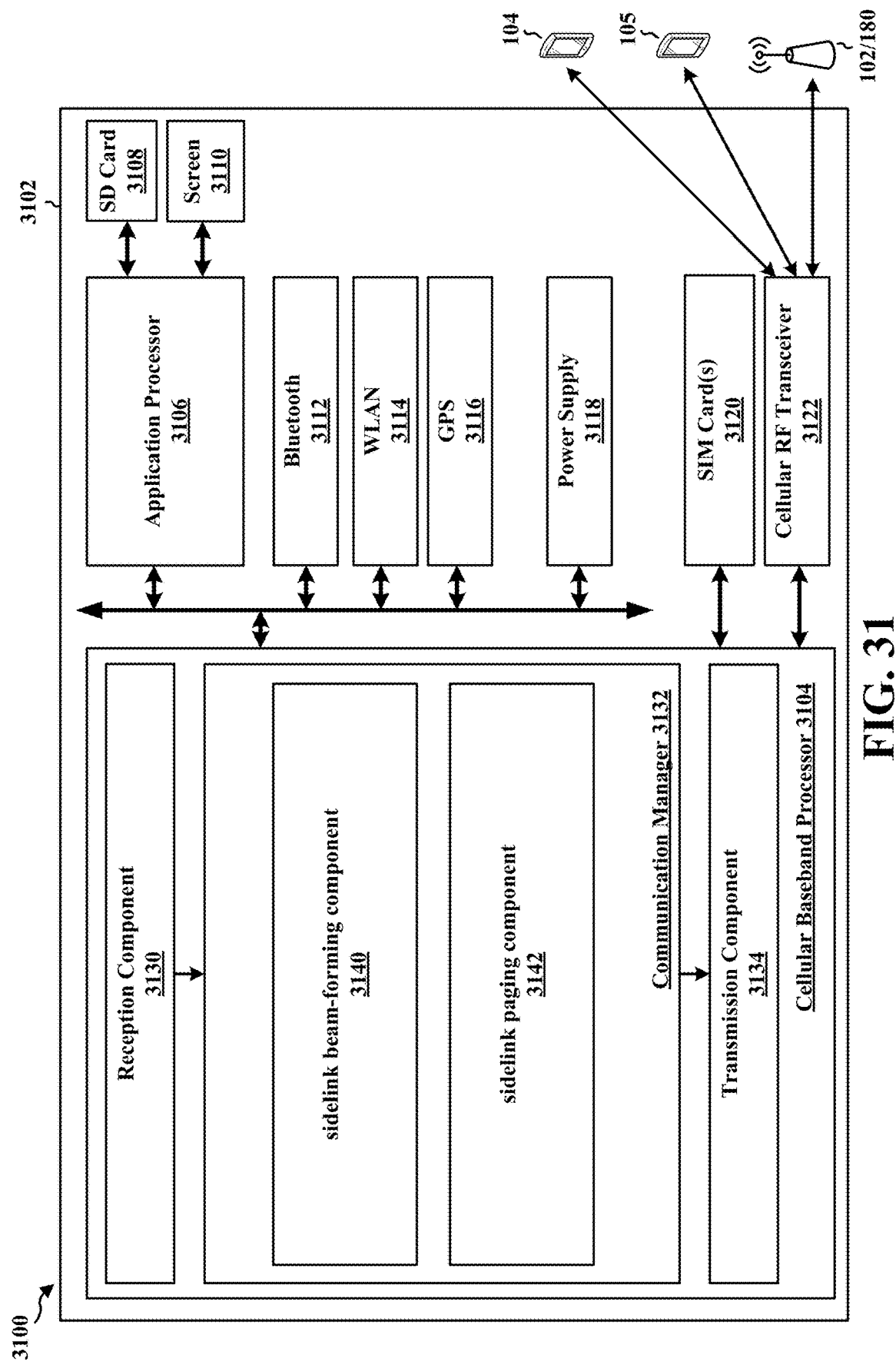
FIG. 31 is a diagram illustrating an example of a hardware implementation for an apparatus.

FIG. 31 is a diagram 3100 illustrating an example of a hardware implementation for an apparatus 3102. The apparatus 3102 is a target UE and includes a cellular baseband processor 3104 (also referred to as a modem) coupled to a cellular RF transceiver 3122 and one or more subscriber identity modules (SIM) cards 3120, an application processor 3106 coupled to a secure digital (SD) card 3108 and a screen 3110, a Bluetooth module 3112, a wireless local area network (WLAN) module 3114, a Global Positioning System (GPS) module 3116, and a power supply 3118. The cellular baseband processor 3104 communicates through the cellular RF transceiver 3122 with another relay UE 104, a target UE 105, and/or BS 102/180. The cellular baseband processor 3104 may include a computer-readable medium/memory. The computer-readable medium/memory may be non-transitory. The cellular baseband processor 3104 is responsible for general processing, including the execution of software stored on the computer-readable medium/memory. The software, when executed by the cellular baseband processor 3104, causes the cellular baseband processor 3104 to perform the various functions described supra. The computer-readable medium/memory may also be used for storing data that is manipulated by the cellular baseband processor 3104 when executing software. The cellular baseband processor 3104 further includes a reception component 3130, a communication manager 3132, and a transmission component 3134. The communication manager 3132 includes the one or more illustrated components. The components within the communication manager 3132 may be stored in the computer-readable medium/memory and/or configured as hardware within the cellular baseband processor 3104. The cellular baseband processor 3104 may be a component of the UE 350 and may include the memory 360 and/or at least one of the TX processor 368, the RX processor 356, and the controller/processor 359. In one configuration, the apparatus 3102 may be a modem chip and include just the baseband processor 3104, and in another configuration, the apparatus 3102 may be the entire UE (e.g., see 350 of FIG. 3) and include the aforediscussed additional modules of the apparatus 3102.

The communication manager 3132 includes a sidelink beamforming component 3140 that is configured to receive a paging relay request message including the paging message for a target UE from a base station, transmitting, to the target UE, a SSB through each transmit beam of a set of transmit beams for each receive beam of a set of receive beams at the target UE, receive a report indicating one transmit beam associated with a transmit-beam receive-beam pair based on the transmitted SSBs, and determine whether the reporting is received from the target UE, e.g., as described in connection with 2802, 2804, 2806, 2808, 2904, and 2908. The communication manager 3132 further includes a sidelink paging component 3142 that is configured to transmit the paging message through one or more sidelink channels via at least one transmit beam or the one transmit beam based on the received reporting, e.g., as described in connection with 2810, 2812, 2910, and 2912.

The apparatus may include additional components that perform each of the blocks of the algorithm in the aforementioned flowcharts of FIGS. 25, 28, and 29. As such, each block in the aforementioned flowcharts of FIGS. 25, 28, and 29 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3102, and in particular the cellular baseband processor 3104, includes means for receiving, from a base station, a paging relay request message including the paging message for the first UE, the paging relay request message requesting the second UE to transmit the paging message to the first UE, where the paging message is transmitted to the first UE based on the received paging relay request message, means for transmitting, to a first UE, a synchronization signal block (SSB) through each transmit beam of a set of transmit beams at the second UE for each receive beam of a set of receive beams at the first UE, means for determining whether a reporting is received from the first UE indicating one transmit beam associated with a transmit-beam receive-beam pair based on the transmitted SSBs, and means for transmitting a paging message through one or more sidelink channels via the at least one transmit beam. The aforementioned means may be one or more of the aforementioned components of the apparatus 3102 configured to perform the functions recited by the aforementioned means. As described supra, the apparatus 3102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

A method of wireless communication including sidelink communication may include a base station, a relay user equipment (UE), and a target UE. The relay UE may transmit, to the target UE, a synchronization signal block (SSB) through each transmit beam of a set of transmit beams at the relay UE for each receive beam of a set of receive beams at the target UE, and the target UE may receive the SSB through each transmit beam of a set of transmit beams from a relay UE through each receive beam of a set of receive beams at the target UE.

The target UE may determine, based on the received SSBs, a transmit-beam receive-beam pair including one transmit beam from the set of transmit beams and one receive beam from the set of receive beams. The target UE may report the one transmit beam associated with the determined transmit-beam receive-beam pair to the relay UE. The relay UE may determine whether a reporting is received from the target UE indicating one transmit beam associated with a transmit-beam receive-beam pair based on the transmitted SSBs. The reporting may include a beam measurement report associated with the one transmit beam of the transmit-beam receive-beam pair. The reporting may include information indicating the one transmit beam associated with the transmit-beam receive-beam pair. The reporting may include at least one of layer-1 signaling, layer-2 signal, or layer-3 signaling.

The relay UE may transmit the paging message through one or more sidelink channels via the at least one transmit beam. In response to determining that the reporting is not received from the target UE, the paging message is transmitted N times through each transmit beam of the set of transmit beams. In response to determining that the reporting is received from the target UE, the paging message is transmitted once through the one transmit beam based on the received reporting. The target UE may receive the paging message through one or more sidelink channels via at least the determined transmit-beam receive-beam pair through the determined transmit-beam receive-beam pair.

The relay UE may receive, from a base station, a paging relay request message including the paging message for the target UE, the paging relay request message requesting the relay UE to transmit the paging message to the target UE based on the received paging relay request message.

Figure 32:
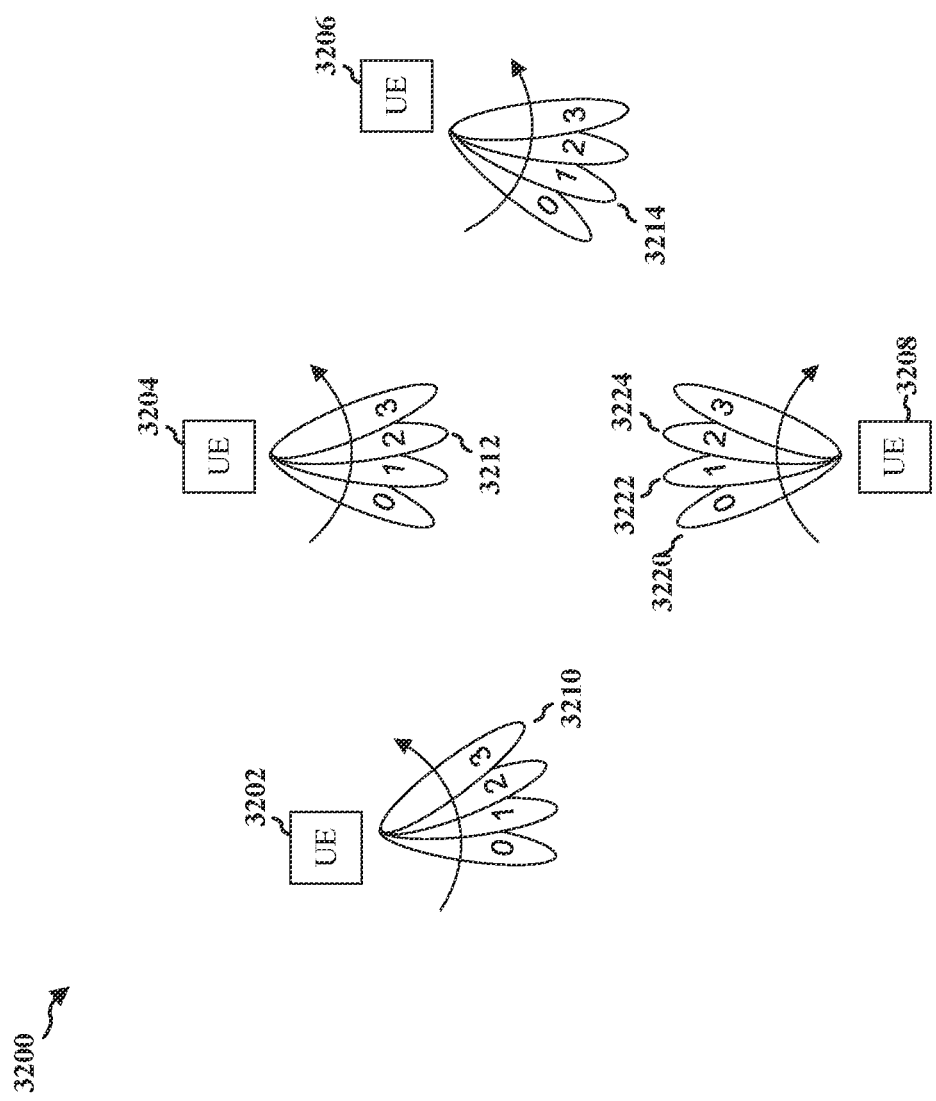
FIG. 32 illustrates an example of beamforming on sidelink communication.

FIG. 32 illustrates an example 3200 of beamforming on sidelink communication. The example 3200 of beamforming on sidelink communication may include a first relay UE 3202, a second relay UE 3204, a third relay UE 3206, and a target UE 3208.

In some aspects, the SSB beam may include UE-identity. The target UE 3208 may monitor the SSB beams from multiple relay UEs to make use of link diversity. For example, the target UE 3208 may establish a paging relay association with the first relay UE 3202. Particularly, the target UE 3208 may monitor the SSB beams from the first UE 3202, the second relay UE 3204, and the third relay UE 3206, and determine to monitor the SSB3 3210 from the first relay UE 3202, the SSB2 3212 from the second relay UE 3204, and the SSB 3214 from third relay UE 3206, instead of monitoring the SSB1, the SSB2, the SSB3 from one relay UE, e.g., the second relay UE 3204. When the target UE 3208 may lose the connection on the sidelink with the first relay UE 3202 for any reason, the target UE 3208 may re-establish the paging relay association with one of the second relay UE 3204 and the third relay UE 3206 using the SSB2 3212 from the second relay UE 3204 or the SSB1 3214 from third relay UE 3206 monitored by the target UE 3208. The target UE 3208 may also include first receive beam 3220, second receive beam 3222, and third receive beam 3224. For example, the target UE may monitor the SSB3 3210 from the first relay UE 3202 via the first receive beam 3220, the SSB2 3212 from the second relay UE 3204 via the second receive beam 3222, and the SSB 3214 from third relay UE 3206 via the third receive beam 3224.

The target UE 3208 may not know the full UE-identity of the relay UEs (TMSI) and may determine that the SSB beams are from different relay UEs. If the SSB beams include the UE-identity, the target UE may identify the relay UE and monitor the SSB beams from best relay UEs that may send paging message. That is, the target UE 3208 may determine the UE-identity of the relay UEs, and the target UE 3208 may determine whether to monitor the SSB received from the corresponding UE and reserve the link diversity. The target UE 3208 may first determine that the relay UE associated with the SSB may function as a relay UE, and further determine to monitor the SSB with an acceptable channel state.

Figure 33:
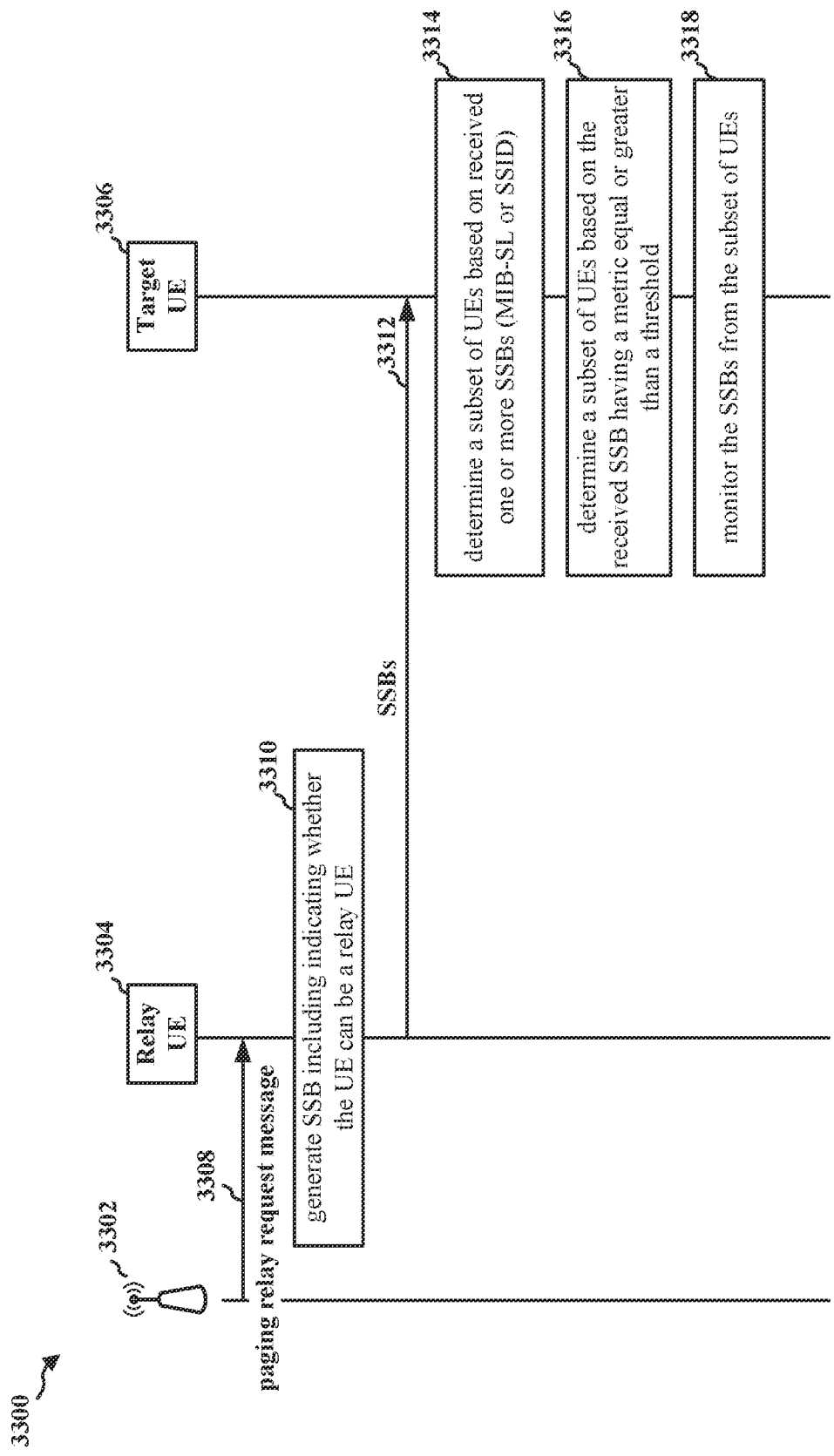
FIG. 33 is a call-flow diagram of a method of wireless communication

FIG. 33 is a call-flow diagram 3300 of a method of wireless communication. The wireless communication of FIG. 33 may include a base station 3302, a relay UE 3304, and a target UE 3306. At 3308, the relay UE 3304 may receive, from a base station 3302, a paging relay request message including a paging message for a target UE 3306. The base station 3302 may transmit the paging relay request message to request the relay UE 3304 to transmit the paging message to the target UE 3306

At 3310, the relay UE 3304 may generate an SSB including information indicating whether the relay UE 3304 can be a relay UE 3304. The SSB may be generated to include a MIB-SL indicating either that the relay UE 3304 is not a relay UE 3304 or can be a relay UE 3304 and an SSID associated with the relay UE 3304.

At 3312, the relay UE 3304 may transmit the SSB to the target UE 3306, and the target UE 3306 may receive the SSB from the relay UE 3304. The target UE 3306 may detect a set of UEs including the relay UE, and the target UE 3306 may receive, from each UE of a set of UEs, one or more SSBs. Each of the one or more SSBs may include information indicating one of whether the UE can be a relay UE or an SSID associated with the UE.

At 3314, the target UE 3306 may determine a subset of UEs based on the received one or more SSBs and the information. That is, the target UE 3306 may receive the SSB from the relay UE 3304, and determine a subset of UEs including the relay UE 3304 based on the MIB-SL and/or the SSID of the received SSBs. In some aspects, the target UE 3306 may determine the subset of UEs including the relay UE 3304 based on the received one or more SSBs including the MIB-SL indicating that the subset of UEs can be a relay UE. In some aspects, the target UE 3306 may determine the subset of UEs including the relay UE 3304 having SSID information matching SSID information in a relay UE SSID list at the target UE 3306.

At 3316, the target UE 3306 may determine the subset of UEs based on an RSRP, an RSRQ, an SINR, or an SNR of the SSBs of the preliminary subset of UEs of the set of UEs including the relay UE 3304. The determination may be based on whether the SSBs of the preliminary subset of UEs of the set of UEs including the relay UE 3304 have one or more the RSRP, the RSRQ, the SINR, or the SNR greater than a threshold. Here, the target UE 3306 may first determine a preliminary subset of UEs of the set of UEs including the relay UE 3304 in which the information including the MIB-SL in the SSBs indicating that the UE can be a relay UE at 3314, and determine the subset of UEs of the preliminary subset of UEs in which at least one SSB of the one or more SSBs has the RSRP, the RSRQ, the SINR, or the SNR greater than the threshold value.

At 3318, the target UE 3306 may monitor the SSBs from the subset of UEs including the relay UE 3304, based on the determination at 3314 and 3316.

Figure 34:
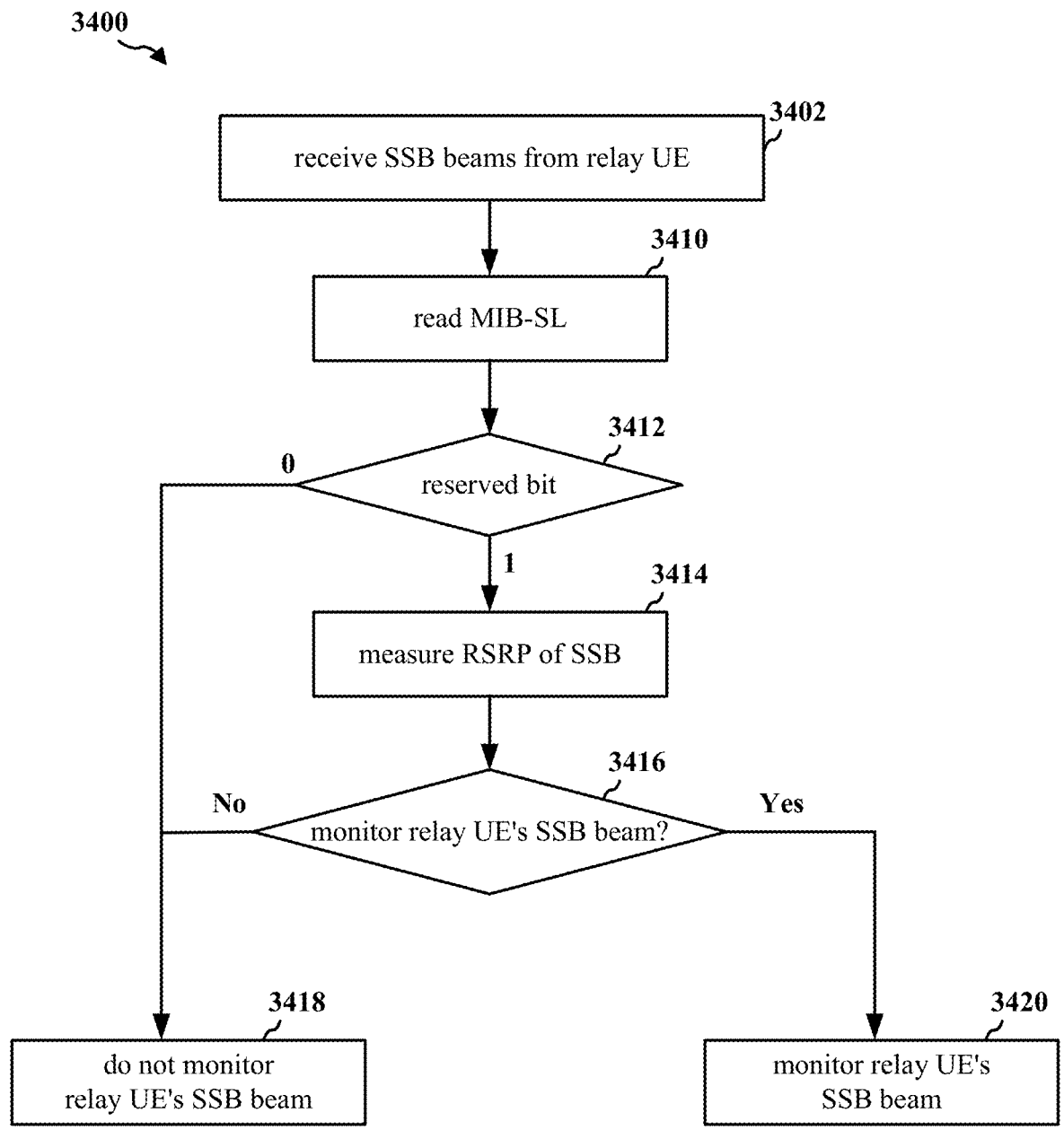
FIG. 34 is a flowchart of a method of wireless communication.

FIG. 34 is a flowchart 3400 of a method of wireless communication. The method may be performed by a first UE (e.g., the target UE 105, 506, 508, and 3306; the apparatus 3802).

At 3402, the first UE may receive, from UE of a set of UEs, an SSB (i.e., at 3312).

The SSB may include information indicating whether the UE can be a relay UE or an SSID associated with the UE. For example, 3402 may be performed by a sidelink paging component 3840. The first UE may determine a subset of UEs of the set of UEs based on the received SSBs and the information including a MIB-SL indicating one of whether the UE can be a relay UE.

At 3410, the first UE may read the MIB-SL from the SSB received from the UE of a set of UEs (i.e., at 3314). The MIB-SL may be received in a PSBCH within the receive SSB. For example, 3410 may be performed by the sidelink paging component 3840.

At 3412, the first UE may determine whether the MIB-SL indicates that the UE can be a relay UE (i.e., at 3314). In one aspect, the MIB-SL may include a reserved bit with a value of 1 to indicate that the UE has the capability to be a relay UE. For example, 3412 may be performed by the sidelink paging component 3840.

At 3414, in response to determining that the UE may be a relay UE at 3412, the first UE may measure one or more metric of the received SSB (i.e., at 3316). The metric of the received SSB may include one or more of the RSRP, the RSRQ, the SINR, or the SNR. For example, 3414 may be performed by the sidelink paging component 3840.

At 3416, the first UE may determine whether the measured metric of the SSB is greater than a threshold value (i.e., at 3316). For example, 3416 may be performed by the sidelink paging component 3840.

At 3418, in response to determining that the UE may not be a relay UE at 3412, or in response to determining that the measured metric of the SSB is smaller than or equal to the threshold value at 3416, the first UE may determine not to monitor the SSB beam of the UE. For example, 3418 may be performed by a sidelink paging component 3840.

At 3420, in response to determining that the measured metric of the SSB is greater than the threshold value at 3416, the first UE may determine to monitor the SSB beam of the UE (i.e., at 3318). For example, 3420 may be performed by the sidelink paging component 3840.

Figure 35:
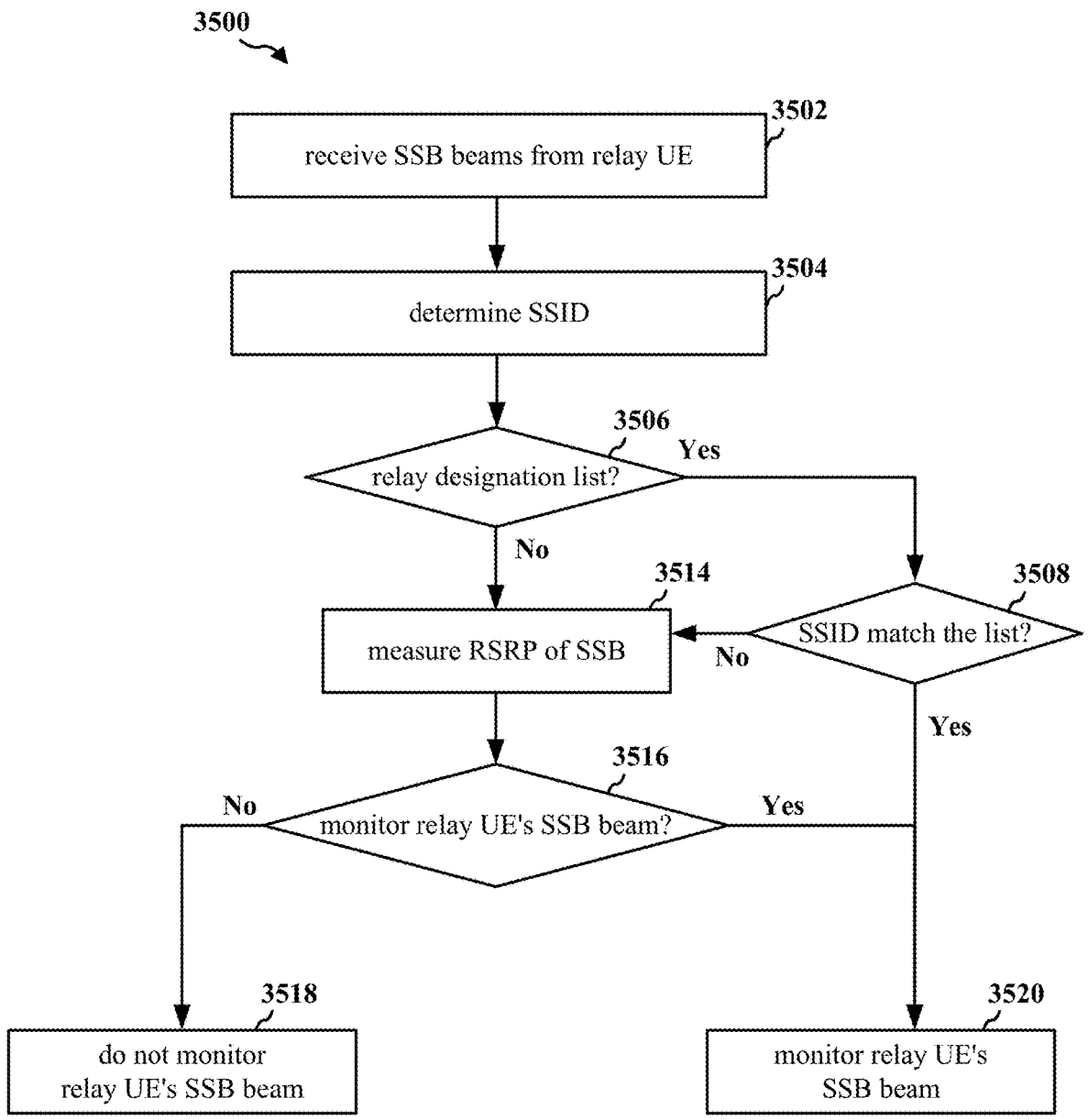
FIG. 35 is a flowchart of a method of wireless communication.

FIG. 35 is a flowchart 3500 of a method of wireless communication. The method may be performed by a first UE (e.g., the target UE 105, 506, 508, and 3306; the apparatus 3802).

At 3502, the first UE may receive, from UE of a set of UEs, an SSB (i.e., at 3312). The SSB may include information indicating whether the UE can be a relay UE or an SSID associated with the UE. For example, 3502 may be performed by a sidelink paging component 3840. The first UE may determine a subset of UEs of the set of UEs based on the received SSBs and the SSIDs indicating whether each UE of the set of UEs is a relay UE designated to the first UE.

At 3504, the first UE may determine the SSID of the UE of the set of UEs from the SSB received from the UE (i.e., at 3314). The first UE may determine the SSID from the SPSS and SSSS included in the SSB. For example, 3504 may be performed by the sidelink paging component 3840. The UE may determine whether each UE of the set of UEs is a relay UE designated to the first UE by determining whether the SSID matches an SSID information in a relay UE SSID list maintained at the first UE.

At 3506, the first UE may determine whether the first UE maintains the relay UE SSID list including SSIDs of the relay UE designated to the first UE (i.e., at 3314). For example, 3506 may be performed by the sidelink paging component 3840.

At 3508, in response to determining that the first UE maintains the relay UE SSID at 3506, the first UE may determine whether the SSID of the UE of the set of UEs matches an SSID information in the relay UE SSID list at the first UE (i.e., at 3314). For example, 3508 may be performed by the sidelink paging component 3840.

At 3514, in response to determining that the first UE does not maintain the relay UE SSID list at 3506, or in response to determining that the SSID of the UE of the set of UEs does not match an SSID information in the relay UE SSID list at the first UE at 3508, the first UE may measure one or more metric of the received SSB (i.e., at 3316). The metric of the received SSB may include one or more of the RSRP, the RSRQ, the SINR, or the SNR. For example, 3514 may be performed by the sidelink paging component 3840.

At 3516, the first UE may determine whether the measured metric of the SSB is greater than a threshold value (i.e., at 3316). For example, 3516 may be performed by the sidelink paging component 3840.

At 3518, in response to determining that the first UE does not maintain the relay UE SSID at 3506, in response to determining that the UE may not be a relay UE at 3508, or in response to determining that the measured metric of the SSB is smaller than or equal to the threshold value at 3516, the first UE may determine not to monitor the SSB beam of the UE. For example, 3518 may be performed by a sidelink paging component 3840.

At 3520, in response to determining that the SSID of the UE of the set of UEs matches an SSID information in the relay UE SSID list at the first UE at 1108, or in response to determining that the measured metric of the SSB is greater than the threshold value at 3516, the first UE may determine to monitor the SSB beam of the UE (i.e., at 3318). For example, 3520 may be performed by the sidelink paging component 3840.

Figure 36:
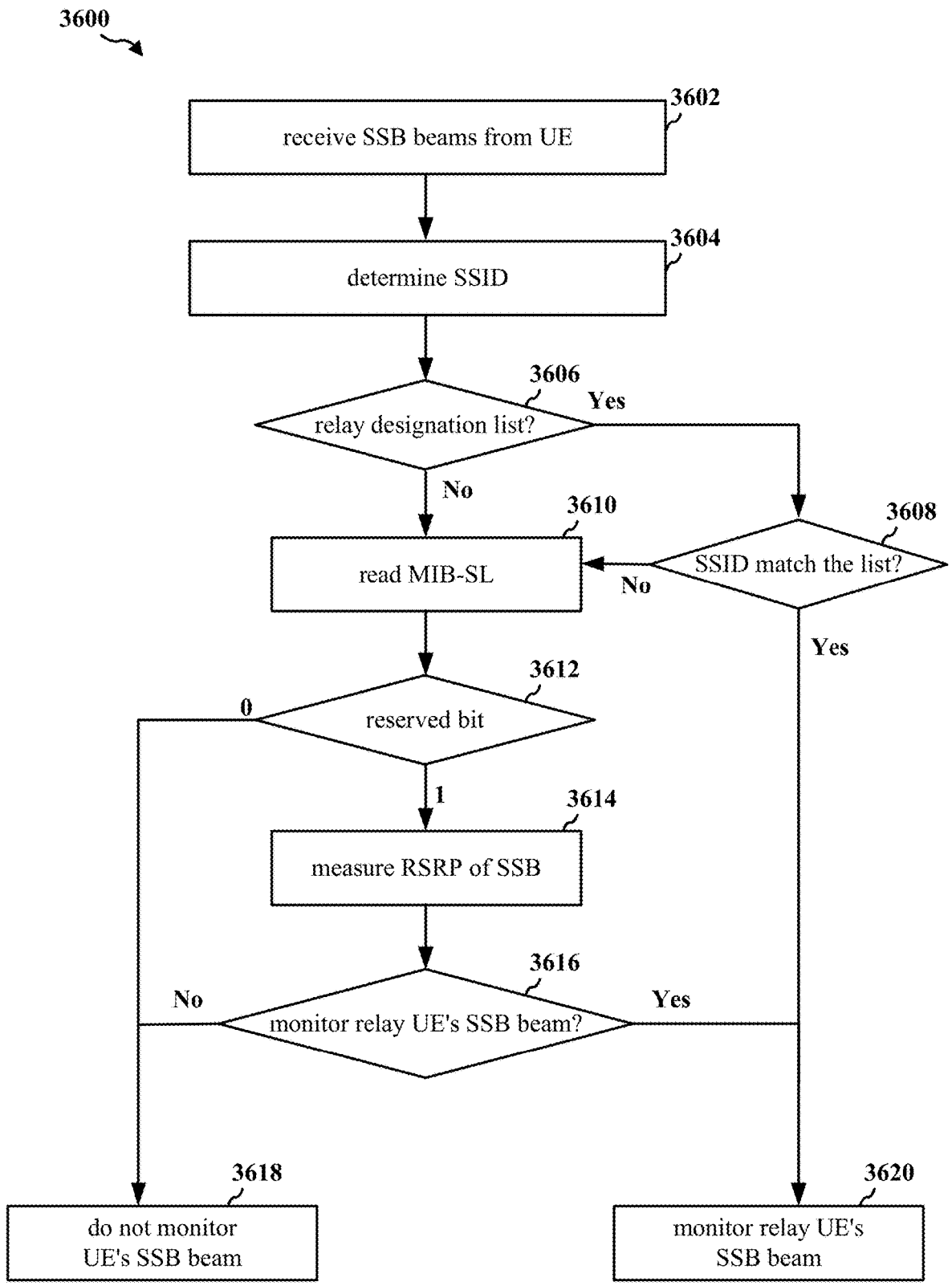
FIG. 36 is a flowchart of a method of wireless communication.

FIG. 36 is a flowchart 3600 of a method of wireless communication. The method may be performed by a first UE (e.g., the target UE 105, 506, 508, and 3306; the apparatus 3802).

At 3602, the first UE may receive, from UE of a set of UEs, an SSB (i.e., at 3312). The SSB may include information indicating whether the UE can be a relay UE or an SSID associated with the UE. For example, 3602 may be performed by a sidelink paging component 3840. The first UE may determine a subset of UEs of the set of UEs based on the received SSBs and the information indicating one of whether the UE can be a relay UE or the SSIDs indicating whether each UE of the set of UEs is a relay UE designated to the first UE.

At 3604, the first UE may determine the SSID of the UE of the set of UEs from the SSB received from the UE (i.e., at 3314). The first UE may determine the SSID from the SSPS and SSSS included in the SSB. For example, 3604 may be performed by the sidelink paging component 3840. The UE may determine whether each UE of the set of UEs is a relay UE designated to the first UE by determining whether the SSID matches an SSID information in a relay UE SSID list maintained at the first UE.

At 3606, the first UE may determine whether the first UE maintains the relay UE SSID list including SSIDs of the relay UE designated to the first UE (i.e., at 3314). For example, 3606 may be performed by the sidelink paging component 3840.

At 3608, the first UE may determine whether the SSID of the UE of the set of UEs matches an SSID information in the relay UE SSID list at the first UE (i.e., at 3314). For example, 3608 may be performed by the sidelink paging component 3840.

At 3610, in response to determining that the first UE does not maintain the relay UE SSID at 3606 or in response to determining that the SSID of the UE of the set of UEs does not match an SSID information in the relay UE SSID list at the first UE at 3608, the first UE may read a MIB-SL from the SSB received from the UE of a set of UEs (i.e., at 3314). The MIB-SL may be received in a PSBCH within the receive SSB. For example, 3610 may be performed by the sidelink paging component 3840.

At 3612, the first UE may determine whether the MIB-SL indicates that the UE can be a relay UE (i.e., at 3314). The MIB-SL may include a reserved bit with a value of 1 to indicate that the UE has the capability to be a relay UE. For example, 3612 may be performed by the sidelink paging component 3840.

At 3614, in response to determining that the UE may be a relay UE at 3612, the first UE may measure one or more metric of the received SSB (i.e., at 3316). The metric of the received SSB may include one or more of the RSRP, the RSRQ, the SINR, or the SNR. For example, 3614 may be performed by the sidelink paging component 3840.

At 3616, the first UE may determine whether the measured metric of the SSB is greater than a threshold value (i.e., at 3316). For example, 3616 may be performed by the sidelink paging component 3840.

At 3618, in response to determining that the UE may not be a relay UE at 3612, or in response to determining that the measured metric of the SSB is smaller than or equal to the threshold value at 3616, the first UE may determine not to monitor the SSB beam of the UE for relay message. For example, 3618 may be performed by a sidelink paging component 3840.

At 3620, in response to determining that the SSID of the UE of the set of UEs matches an SSID information in the relay UE SSID list at the first UE at 3608, or in response to determining that the measured metric of the SSB is greater than the threshold value at 3616, the first UE may determine to monitor the SSB beam of the UE for relay message (i.e., at 3318). For example, 3620 may be performed by the sidelink paging component 3840.

Figure 37:
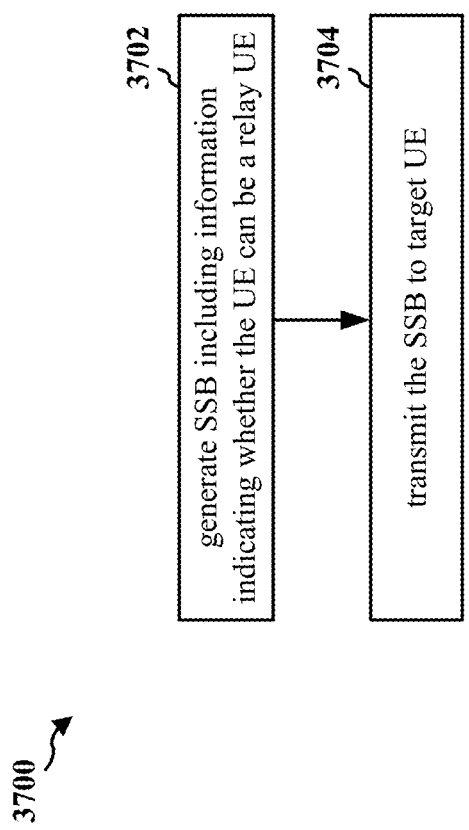
FIG. 37 is a flowchart of a method of wireless communication.

FIG. 37 is a flowchart 3700 of a method of wireless communication. The method may be performed by a second UE (e.g., the relay UE 104, 504, 3202, 3204, 3206, and 3304; the apparatus 3902).

At 3702, the second UE may generate an SSB including information indicating whether the second UE can be a relay UE (i.e., at 3310). The SSB may be generated to include a MIB-SL indicating either that the second UE is not a relay UE or can be a relay UE and an SSID associated with the second UE. For example, 3702 may be performed by a sidelink paging component 3940.

At 3704, the second UE may transmit the SSB to a first UE (i.e., at 3312). For example, 3704 may be performed by the sidelink paging component 3940.

Figure 38:
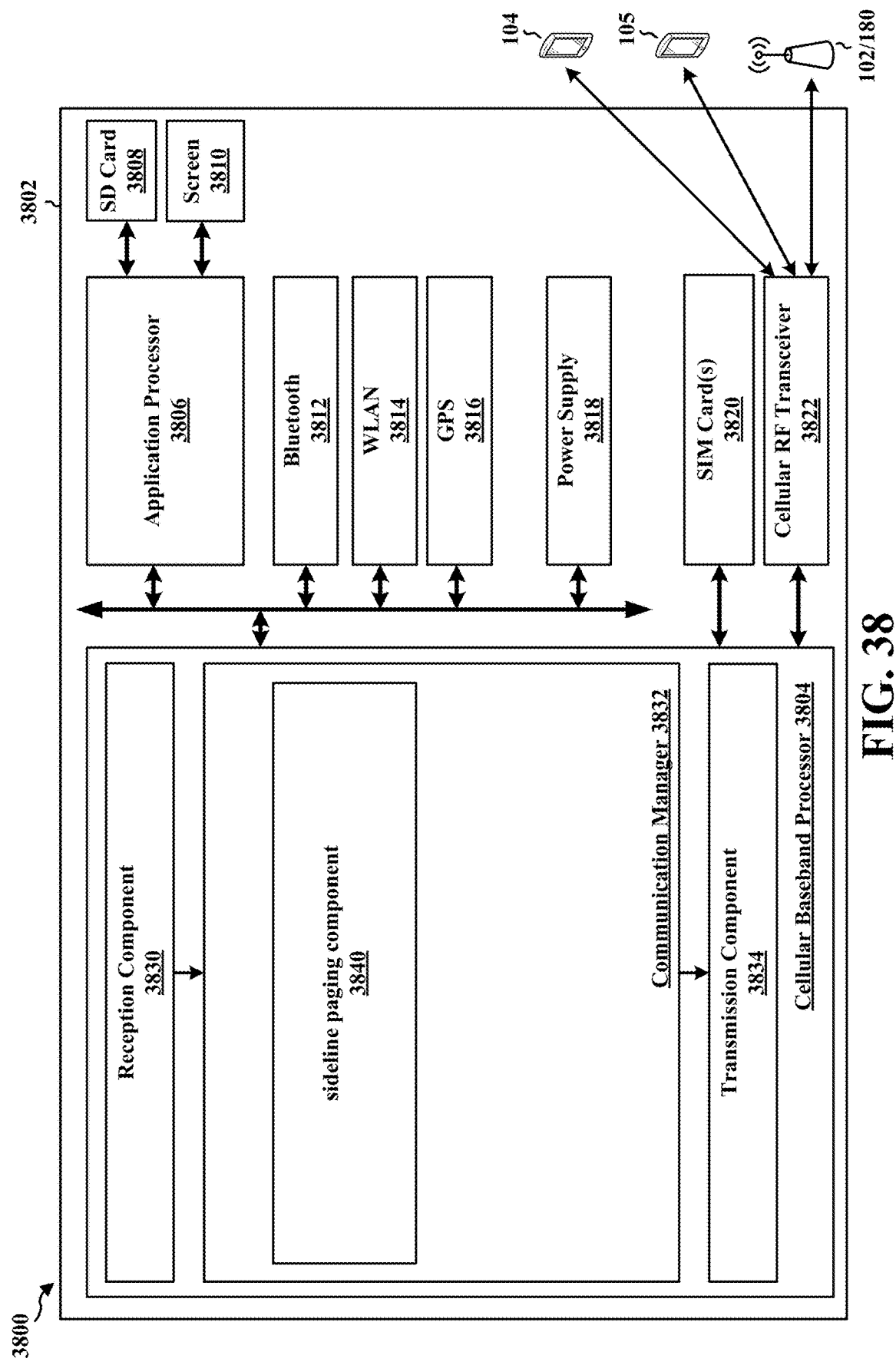
FIG. 38 is a diagram illustrating an example of a hardware implementation for an apparatus.

FIG. 38 is a diagram 3800 illustrating an example of a hardware implementation for an apparatus 3802. The apparatus 3802 is a relay UE and includes a cellular baseband processor 3804 (also referred to as a modem) coupled to a cellular RF transceiver 3822 and one or more subscriber identity modules (SIM) cards 3820, an application processor 3806 coupled to a secure digital (SD) card 3808 and a screen 3810, a Bluetooth module 3812, a wireless local area network (WLAN) module 3814, a Global Positioning System (GPS) module 3816, and a power supply 3818. The cellular baseband processor 3804 communicates through the cellular RF transceiver 3822 with a relay UE 104, another target UE 105, and/or BS 102/180. The cellular baseband processor 3804 may include a computer-readable medium/memory. The computer-readable medium/memory may be non-transitory. The cellular baseband processor 3804 is responsible for general processing, including the execution of software stored on the computer-readable medium/memory. The software, when executed by the cellular baseband processor 3804, causes the cellular baseband processor 3804 to perform the various functions described supra. The computer-readable medium/memory may also be used for storing data that is manipulated by the cellular baseband processor 3804 when executing software. The cellular baseband processor 3804 further includes a reception component 3830, a communication manager 3832, and a transmission component 3834. The communication manager 3832 includes the one or more illustrated components. The components within the communication manager 3832 may be stored in the computer-readable medium/memory and/or configured as hardware within the cellular baseband processor 3804. The cellular baseband processor 3804 may be a component of the UE 350 and may include the memory 360 and/or at least one of the TX processor 368, the RX processor 356, and the controller/processor 359. In one configuration, the apparatus 3802 may be a modem chip and include just the baseband processor 3804, and in another configuration, the apparatus 3802 may be the entire UE (e.g., see 350 of FIG. 3) and include the aforediscussed additional modules of the apparatus 3802.

The communication manager 3832 includes a sidelink paging component 3840 that is configured to receive, from UE of a set of UEs, an SSB, determine the SSID of the UE of the set of UEs from the SSB received from the UE, determine whether the SSID of the UE of the set of UEs matches an SSID information in the relay UE SSID list at the first UE, read a MIB-SL from the SSB, determine whether the MIB-SL indicates that the UE can be a relay UE, measure one or more metric of the received SSB, determine whether the measured metric of the SSB is greater than a threshold value, and monitor the SSB beam of the UE for relay message, e.g., as described in connection with 3402, 3410, 3412, 3414, 3416, 3418, 3420, 3502, 3504, 3506, 3508, 3514, 3516, 3518, 3520, 3602, 3604, 3606, 3608, 3610, 3612, 3614, 3616, 3618, and 3620.

The apparatus may include additional components that perform each of the blocks of the algorithm in the aforementioned flowcharts of FIGS. 33, 34, 35, and 36. As such, each block in the aforementioned flowcharts of FIGS. 33, 34, 35, and 36 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3802, and in particular the cellular baseband processor 3804, includes means for receiving, from each UE of a set of UEs, one or more SSBs, each of the one or more SSBs including information indicating one of whether the UE can be a relay UE or a SSID associated with the UE, means for determining a subset of UEs of the set of UEs based on the received one or more SSBs and the information indicating one of whether the UE can be a relay UE or the SSID from each UE of the set of UEs, and means for monitoring the SSBs from the subset of UEs based on the determination. The apparatus 3802 includes means for determining the subset of UEs based on the information in the one or more SSBs from each UE indicating that the UE can be a relay UE, means for determining the subset of UEs based on the SSID information in the one or more SSBs having matching SSID information in a relay UE SSID list at the first UE, and means for determining the subset of UEs of the preliminary subset of UEs in which at least one SSB of the one or more SSBs has a RSRP, a RSRQ, a SINR, or a SNR greater than a threshold. The aforementioned means may be one or more of the aforementioned components of the apparatus 3802 configured to perform the functions recited by the aforementioned means. As described supra, the apparatus 3802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 39:
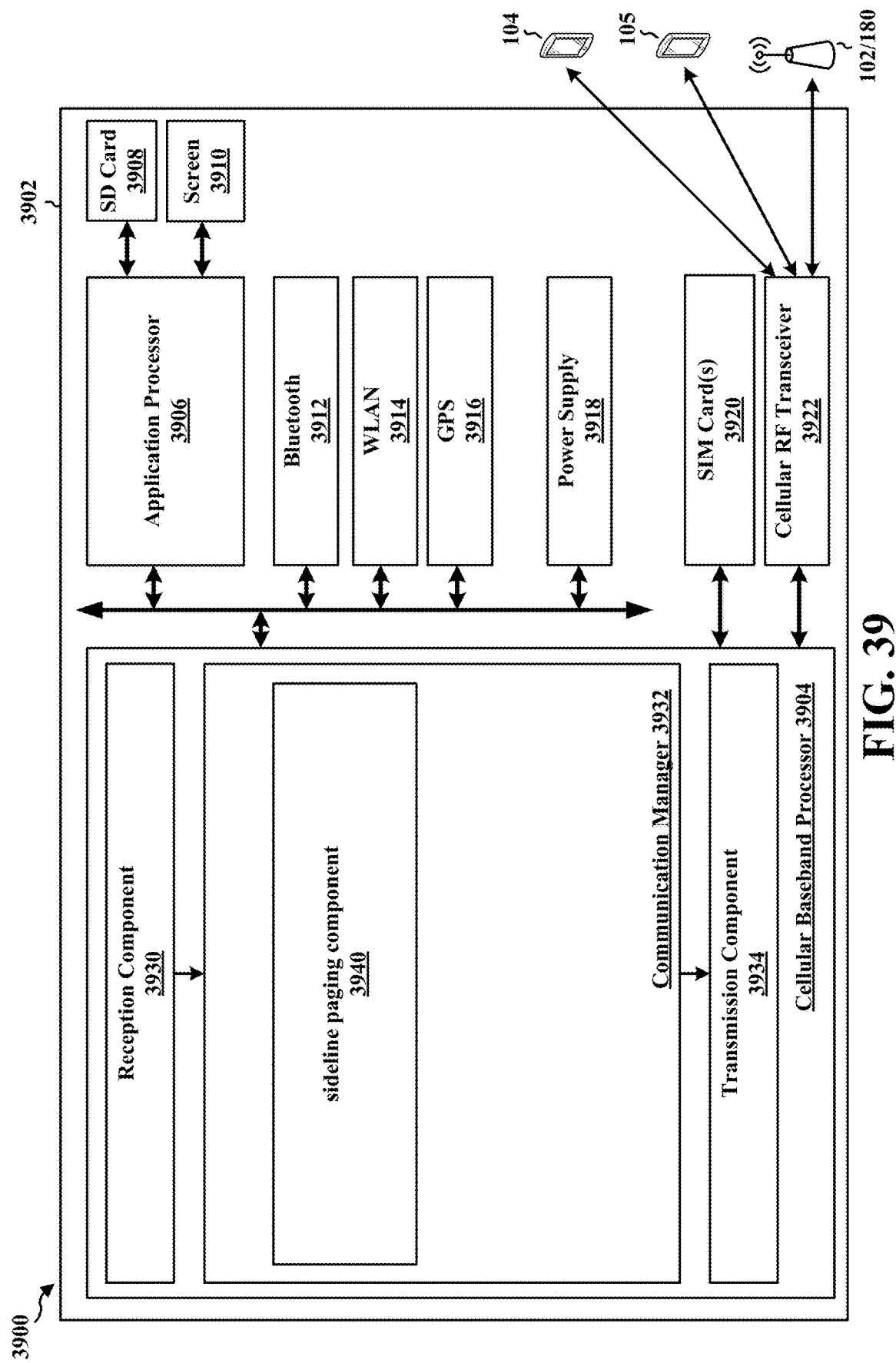
FIG. 39 is a diagram illustrating an example of a hardware implementation for an apparatus.

FIG. 39 is a diagram 3900 illustrating an example of a hardware implementation for an apparatus 3902. The apparatus 3902 is a target UE and includes a cellular baseband processor 3904 (also referred to as a modem) coupled to a cellular RF transceiver 3922 and one or more subscriber identity modules (SIM) cards 3920, an application processor 3906 coupled to a secure digital (SD) card 3908 and a screen 3910, a Bluetooth module 3912, a wireless local area network (WLAN) module 3914, a Global Positioning System (GPS) module 3916, and a power supply 3918. The cellular baseband processor 3904 communicates through the cellular RF transceiver 3922 with another relay UE 104, a target UE 105, and/or BS 102/180. The cellular baseband processor 3904 may include a computer-readable medium/ memory. The computer-readable medium/memory may be non-transitory. The cellular baseband processor 3904 is responsible for general processing, including the execution of software stored on the computer-readable medium/ memory. The software, when executed by the cellular baseband processor 3904, causes the cellular baseband processor 3904 to perform the various functions described supra. The computer-readable medium/memory may also be used for storing data that is manipulated by the cellular baseband processor 3904 when executing software. The cellular baseband processor 3904 further includes a reception component 3930, a communication manager 3932, and a transmission component 3934. The communication manager 3932 includes the one or more illustrated components. The components within the communication manager 3932 may be stored in the computer-readable medium/memory and/or configured as hardware within the cellular baseband processor 3904. The cellular baseband processor 3904 may be a component of the UE 350 and may include the memory 360 and/or at least one of the TX processor 368, the RX processor 356, and the controller/processor 359. In one configuration, the apparatus 3902 may be a modem chip and include just the baseband processor 3904, and in another configuration, the apparatus 3902 may be the entire UE (e.g., see 350 of FIG. 3) and include the aforediscussed additional modules of the apparatus 3902.

The communication manager 3932 includes a sidelink paging component 3940 that is configured to generate an SSB including information indicating whether the second UE can be a relay UE, and transmit the SSB to a first UE, e.g., as described in connection with 3702 and 3704.

The apparatus may include additional components that perform each of the blocks of the algorithm in the aforementioned flowcharts of FIGS. 33 and 37. As such, each block in the aforementioned flowcharts of FIGS. 33 and 37 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3902, and in particular the cellular baseband processor 3904, includes means for generating an SSB including an SSID associated with the UE or a MIB-SL indicating whether the UE is not a relay UE or can be a relay UE, and means for transmitting the SSB to a target UE. The aforementioned means may be one or more of the aforementioned components of the apparatus 3902 configured to perform the functions recited by the aforementioned means. As described supra, the apparatus 3902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

A relay UE may generate an SSB indicating an SSID and a MIB-SL including information indicating whether the relay UE can be a relay UE. The relay UE may transmit the SSB to a target UE. The target UE may receive, from each UE of a set of UEs, one or more SSBs, each of the one or more SSBs including information indicating one of whether the UE can be a relay UE or an SSID associated with the UE, determine a subset of UEs of the set of UEs based on the received one or more SSBs and the information indicating one of whether the UE can be a relay UE or the SSID from each UE of the set of UEs.

Each of the one or more SSBs from each UE in the set of UEs may include information indicating the SSID associated with the UE. The target UE may determine whether the SSID information in the one or more SSBs have a matching SSID information in a relay UE SSID list at the target UE. The target UE may determine the subset of UEs in response to determining that the SSID information in the SSB from each UE of the subset of UEs has matching SSID information in a relay UE SSID list at the target UE.

Each of the one or more SSBs from each UE in the set of UEs may include information indicating whether the UE can be a relay UE. The SSB from each UE of the set of UEs may include, and the MIB-SL may indicate either that the UE is not a relay UE or can be a relay UE. The MIB-SL may be received in a PSBCH within the SSB. The target UE may determine the subset of UEs of the set of UEs in response to determining that the SSBs for each UE in the subset of UEs includes information indicating that the UE can be a relay UE.

The target UE may also determine whether the SSB has an RSRP, an RSRQ, an SINR, or an SNR greater than a threshold.

Accordingly, the target UE may determine to monitor the SSB beam from each UE of the set of UEs based on the MIB-SL, the SSID, and the metric of the SSB, and monitor the SSBs from the subset of UEs based on the determination.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first UE. The method includes receiving, from each UE of a set of UEs, a SSB via each receive beam of a set of receive beams at the first UE, each receive beam at the first UE corresponding to one transmit beam of a set of transmit beams at the UE, wherein the SSB received from the UE via each receive beam at the first UE is different from SSBs received from the UE via other receive beams of the set of receive beams at the first UE, identifying, for each UE of the set of UEs, a transmit-beam receive-beam pair for the UE based on the received SSBs, the transmit-beam receive-beam pair for the UE including one transmit beam from the set of transmit beams at the UE and one receive beam from the set of receive beams at the first UE, and receiving, from each UE of the set of UEs, a paging message through one or more sidelink channels via at least the transmit-beam receive-beam pair identified for the UE of the set of UEs.

Aspect 2 is the method of aspect 1, where the SSBs are received periodically from each UE of the set of UEs, and the transmit-beam receive-beam pair for each UE is identified periodically based on the received SSBs.

Aspect 3 is the method of aspect 1 and 2, further including decoding the paging message received through one or more sidelink channels via at least the transmit-beam receive-beam pair identified for the each UE of the set of UEs.

Aspect 4 is an apparatus for wireless communication including at least one processor coupled to a memory and configured to implement a method as in any of aspects 1 to 3, further including at least one of an antenna or a transceiver coupled to the at least one processor.

Aspect 5 is an apparatus for wireless communication including means for implementing a method as in any of aspects 1 to 3.

Aspect 6 is a computer-readable medium storing computer executable code, where the code when executed by a processor causes the processor to implement a method as in any of aspects 1 to 3.

Aspect 7 is a method of wireless communication of a first UE, including receiving, from a second UE, a paging message through one or more sidelink channels via each receive beam of a set of receive beams at the first UE, each receive beam at the first UE corresponding to one transmit beam of a set of transmit beams at the second UE, and decoding the received paging message.

Aspect 8 is the method of aspect 7, where the set of transmit beams includes N transmit beams and the set of receive beams includes M receive beams, and the receiving the paging messages from the second UE includes receiving, for each transmit beam of the N transmit beams, the paging message from a same transmit beam M times through each receive beam of the M receive beams.

Aspect 9 is the method of aspect 8, where the set of transmit beams includes the beams $t_1, t_2, \ldots, t_N$, and the set of receive beams includes the beams $r_1, r_2, \ldots, r_M$, and the receiving the paging messages from the second UE includes receiving, for each of i=1, 2, . . . , N, the paging message through beam pair $t_i$-$r_j$ for j=1, 2, . . . , M.

Aspect 10 is the method of aspect 7, where the set of transmit beams includes N transmit beams and the set of receive beams includes M receive beams, and the receiving the paging messages from the second UE includes receiving, for each receive beam of the M receive beams, the paging message through the receive beam from a different transmit beam of the N transmit beams.

Aspect 11 is the method of aspect 10, where the set of transmit beams includes the beams $t_1, t_2, \ldots, t_N$, and the set of receive beams includes the beams $r_1, r_2, \ldots, r_M$, and the receiving the paging messages from the second UE includes receiving, for each of j=1, 2, . . . , M, the paging message through beam pair $t_i$-$r_j$ for i=1, 2, . . . , N.

Aspect 12 is the method of aspect 7, where the set of transmit beams includes N transmit beams and the set of receive beams includes one receive beam, and the receiving the paging messages from the second UE includes receiving the paging message from each transmit beam of the N transmit beams through the one receive beam.

Aspect 13 is the method of aspect 12, where the set of transmit beams includes the beams $t_1$, $t_2$, . . . , $t_N$, and the set of receive beams includes the beam r, and the receiving the paging messages from the second UE includes receiving the paging message through beam pair $t_i$-r for i=1, 2, . . . , N.

Aspect 14 is the method of aspect 13, further including changing the one receive beam to a second receive beam, receiving, from the second UE, a second paging message through the one or more sidelink channels from each transmit beam of the set of transmit beams at the second UE through the second receive beam, and decoding the received second paging message.

Aspect 15 is the method of any of aspects 7 to 14, further including transmitting, to the second UE in response to receiving and decoding the paging message, an accept message, the accept message indicating at least one transmit beam of the set of transmit beams.

Aspect 16 is the method of aspect 15, further including receiving, from the second UE, a second paging message through one or more sidelink channels from each transmit beam of the at least one transmit beam of the second UE through each receive beam of a set of receive beams at the first UE, and decoding the received second paging message.

Aspect 17 is the method of any of aspects 12 to 16, further including changing the one receive beam to a second receive beam, receiving, receive, from the second UE, a second paging message through the one or more sidelink channels from each transmit beam of the at least one transmit beam of the second UE through each receive beam of the set of receive beams at the first UE, and decoding the received second paging message.

Aspect 18 is an apparatus for wireless communication including at least one processor coupled to a memory and configured to implement a method as in any of aspects 7 to 17, further including at least one of an antenna or a transceiver coupled to the at least one processor.

Aspect 19 is an apparatus for wireless communication including means for implementing a method as in any of aspects 7 to 17.

Aspect 20 is a computer-readable medium storing computer executable code, where the code when executed by a processor causes the processor to implement a method as in any of aspects 7 to 17.

Aspect 21 is a method of wireless communication of a second UE, including transmitting, to a first UE, a SSB through each transmit beam of a set of transmit beams at the second UE, each transmit beam at the second UE corresponding to one receive beam of a set of receive beams at the first UE, where the SSB transmitted via each transmit beam at the second UE is different from other SSBs transmitted via other transmit beams of the set of transmit beams at the second UE, and transmitting, to the first UE, a paging message through one or more sidelink channels via each transmit beam of the set of transmit beams.

Aspect 22 is the method of aspect 21, where the SSBs are transmitted periodically to the first UE Aspect 23 is the method of any of aspects 21 and 22, further including receiving, from a base station, a paging relay request message including the paging message for the first UE, the paging relay request message requesting the second UE to transmit the paging message to the first UE.

Aspect 24 is an apparatus for wireless communication including at least one processor coupled to a memory and configured to implement a method as in any of aspects 21 and 23, further including at least one of an antenna or a transceiver coupled to the at least one processor.

Aspect 25 is an apparatus for wireless communication including means for implementing a method as in any of aspects 21 and 23.

Aspect 26 is a computer-readable medium storing computer executable code, where the code when executed by a processor causes the processor to implement a method as in any of aspects 21 and 23.

Aspect 27 is a method of wireless communication of a second UE. The method includes receiving, from a base station, a paging relay request message including a paging message for a first UE, the paging relay request message requesting the second UE to transmit the paging message to the first UE, and transmitting, to the first UE based on the received paging relay request message, the paging message through each transmit beam of a set of transmit beams at the second UE, each transmit beam at the second UE corresponding to one receive beam of a set of receive beams at the first UE.

Aspect 28 is the method of aspect 27, where the set of transmit beams includes N transmit beams and the set of receive beams includes M receive beams, and the transmitting the paging messages to the first UE includes transmitting, for each transmit beam of the N transmit beams, the paging message from a same transmit beam M times for each receive beam of the M receive beams.

Aspect 29 is the method of aspect 28, where the set of transmit beams includes the beams $t_1$, $t_2$, . . . , $t_N$, and the set of receive beams includes the beams $r_1$, $r_2$, . . . , $r_M$, and the transmitting the paging messages to the second UE includes transmitting, for each of i=1, 2, . . . , N, the paging message through beam pair $t_i$-$r_j$ for j=1, 2, . . . , M.

Aspect 30 is the method of aspect 27, where the set of transmit beams includes N transmit beams and the set of receive beams includes M receive beams, and the transmitting the paging messages to the first UE includes transmitting, for each receive beam of the M receive beams, the paging message for the receive beam from a different transmit beam of the N transmit beams.

Aspect 31 is the method of aspect 30 where the set of transmit beams includes the beams $t_1$, $t_2$, . . . , $t_N$, and the set of receive beams includes the beams $r_1$, $r_2$, . . . , $r_M$, and the transmitting the paging messages to the second UE includes transmitting, for each of j=1, 2, . . . , M, the paging message through beam pair $t_i$-$r_j$ for i=1, 2, . . . , N.

Aspect 32 is the method of aspect 27, where the set of transmit beams includes N transmit beams and the set of receive beams includes one receive beam, and the transmitting the paging messages to the first UE includes transmitting the paging message from each transmit beam of the N transmit beams for the one receive beam.

Aspect 33 is the method of aspect 32, where the set of transmit beams includes the beams $t_1$, $t_2$, . . . , $t_N$, and the set of receive beams includes the beam r, and the transmitting the paging messages to the second UE includes transmitting the paging message through beam pair $t_i$-r for i=1, 2, . . . , N.

Aspect 34 is the method of any of aspects 27 to 33, further including receiving, from the first UE, an accept message in response to the transmitted paging message, the accept message indicating at least one transmit beam of the set of transmit beams.

Aspect 35 is the method of aspect 34, further including transmitting, to the first UE based on the accept message indicating the at least one transmit beam, a second paging message through one or more sidelink channels through each transmit beam of the at least one transmit beam of the second UE for each receive beam of the set of receive beams at the first UE.

Aspect 36 is an apparatus for wireless communication including at least one processor coupled to a memory and configured to implement a method as in any of aspects 27 to 35, further including at least one of an antenna or a transceiver coupled to the at least one processor.

Aspect 37 is an apparatus for wireless communication including means for implementing a method as in any of aspects 27 to 35.

Aspect 38 is a computer-readable medium storing computer executable code, where the code when executed by a processor causes the processor to implement a method as in any of aspects 27 to 35.

Aspect 39 is a method of wireless communication of a target UE. The method includes receiving a synchronization signal block (SSB) through each transmit beam of a set of transmit beams from a second UE through each receive beam of a set of receive beams at the first UE, determining a transmit-beam receive-beam pair based on the received SSBs, the transmit-beam receive-beam pair including one transmit beam from the set of transmit beams and one receive beam from the set of receive beams, and receiving a paging message through one or more sidelink channels via at least the determined transmit-beam receive-beam pair.

Aspect 40 is the method of aspect 39, further including refraining from reporting to the second UE the one transmit beam associated with the determined transmit-beam receive-beam pair, where the paging message is received through the determined transmit-beam receive-beam pair based on the non-reporting.

Aspect 41 is the method of any of aspects 39 and 40, further including reporting to the second UE the one transmit beam associated with the determined transmit-beam receive-beam pair, where the paging message is received through the determined transmit-beam receive-beam pair based on the reporting.

Aspect 42 is the method of aspect 41, where the reporting includes transmitting a beam measurement report associated with the determined transmit-beam receive-beam pair.

Aspect 43 is the method of aspect 41, where the reporting includes transmitting information indicating the one transmit beam associated with the determined transmit-beam receive-beam pair.

Aspect 44 is the method of any of aspects 41 to 43, where the reporting includes at least one of layer-1 signaling, layer-2 signal, or layer-3 signaling.

Aspect 45 is an apparatus for wireless communication including at least one processor coupled to a memory and configured to implement a method as in any of aspects 39 to 44, further including at least one of an antenna or a transceiver coupled to the at least one processor.

Aspect 45 is an apparatus for wireless communication including means for implementing a method as in any of aspects 39 to 44.

Aspect 46 is a computer-readable medium storing computer-executable code, where the code when executed by a processor causes the processor to implement a method as in any of aspects 39-44.

Aspect 47 is a method of wireless communication of a relay UE. The method includes transmitting, to a first UE, a synchronization signal block (SSB) through each transmit beam of a set of transmit beams at the second UE for each receive beam of a set of receive beams at the first UE, determining whether a reporting is received from the first UE indicating one transmit beam associated with a transmit-beam receive-beam pair based on the transmitted SSBs, and transmitting a paging message through one or more sidelink channels via the at least one transmit beam.

Aspect 48 is the method of aspect 47, where the reporting is determined not to be received indicating the one transmit beam associated with the transmit-beam receive-beam pair, the set of transmit beams includes N transmit beams, and the transmitting the paging message via the at least one transmit beam includes transmitting the paging message N times through each transmit beam of the set of transmit beams.

Aspect 49 is the method of aspect 47, where reporting is determined to be received indicating the one transmit beam associated with the transmit-beam receive-beam pair, and the paging message is transmitted once through the one transmit beam based on the received reporting.

Aspect 50 is the method of aspect 49, where the reporting includes a beam measurement report associated with the one transmit beam of the transmit-beam receive-beam pair.

Aspect 51 is the method of aspect 49, where the reporting includes information indicating the one transmit beam associated with the transmit-beam receive-beam pair.

Aspect 52 is the method of any of aspects 49 to 51, where the reporting includes at least one of layer-1 signaling, layer-2 signal, or layer-3 signaling.

Aspect 53 is the method of any of aspects 47 to 52, further including receiving, from a base station, a paging relay request message including the paging message for the first UE, the paging relay request message requesting the second UE to transmit the paging message to the first UE, where the paging message is transmitted to the first UE based on the received paging relay request message.

Aspect 54 is an apparatus for wireless communication including at least one processor coupled to a memory and configured to implement a method as in any of aspects 47 to 53, further including at least one of an antenna or a transceiver coupled to the at least one processor.

Aspect 55 is an apparatus for wireless communication including means for implementing a method as in any of aspects 47 to 53.

Aspect 56 is a computer-readable medium storing computer-executable code, where the code when executed by a processor causes the processor to implement a method as in any of aspects 47 to 53.

Aspect 57 is a method of wireless communication of a first UE. The method includes receiving, from each UE of a set of UEs, one or more SSBs, each of the one or more SSBs including information indicating one of whether the UE can be a relay UE or an SSID associated with the UE, determining a subset of UEs of the set of UEs based on the received one or more SSBs and the information indicating one of whether the UE can be a relay UE or the SSID from each UE of the set of UEs, and monitoring the SSBs from the subset of UEs based on the determination.

Aspect 58 is the method of aspect 57, where each of the one or more SSBs from each UE in the set of UEs includes information indicating whether the UE can be a relay UE, and where the one or more SSBs for each UE in the subset of UEs includes information indicating that the UE can be a relay UE.

Aspect 59 is the method of aspect 58, where each SSB of the one or more SSBs received from each UE of the set of UEs includes a MIB-SL, and the MIB-SL indicates either that the UE is not a relay UE or can be a relay UE.

Aspect 60 is the method of aspect 59, where the MIB-SL is received in a PSBCH within each SSB of the one or more SSBs.

Aspect 61 is the method of aspect 58, where the determining the subset of UEs of the set of UEs includes determining the subset of UEs based on the information in the one or more SSBs from each UE indicating that the UE can be a relay UE.

Aspect 62 is the method of aspect 58, where the determining the subset of UEs of the set of UEs includes determining a preliminary subset of UEs of the set of UEs in which the information in the one or more SSBs from each UE indicates that the UE can be a relay UE, and determining the subset of UEs of the preliminary subset of UEs in which at least one SSB of the one or more SSBs has an RSRP, an RSRQ, an SINR, or an SNR greater than a threshold.

Aspect 63 is the method of aspect 57, where each of the one or more SSBs from each UE in the set of UEs includes information indicating the SSID associated with the UE.

Aspect 64 is the method of aspect 63, where the determining the subset of UEs of the set of UEs includes determining the subset of UEs based on the SSID information in the one or more SSBs having matching SSID information in a relay UE SSID list at the first UE.

Aspect 65 is the method of aspect 63, where the determining the subset of UEs of the set of UEs includes determining the subset of UEs of the set of UEs based on the SSID information in the one or more SSBs having matching SSID information in a relay UE SSID list at the first UE.

Aspect 66 is the method of any of aspects 63 to 65, where the determining the subset of UEs of the set of UEs includes determining the subset of UEs of the subset of UEs in which at least one SSB of the one or more SSBs has the RSRP, the RSRQ, the SINR, or the SNR greater than a threshold, where there is no matching SSID information.

Aspect 67 is the method of aspect 57, where each of the one or more SSBs from each UE in the set of UEs includes information indicating whether the UE can be a relay UE, and information indicating the SSID associated with the UE.

Aspect 68 is the method of aspect 67, where the determining the subset of UEs of the set of UEs includes determining whether the SSID information matches SSID information in a relay UE SSID list at the UE, and determining the subset of UEs based on the SSID information matching SSID information in the relay UE SSID list when there is matching SSID information.

Aspect 69 is the method of any of aspects 67 and 68, where the determining the subset of UEs further includes determining a preliminary subset of the subset of UEs based on the information in the one or more SSBs from each UE indicating that the UE can be a relay UE where there is no matching SSID information, and determining the subset of UEs of the preliminary subset of UEs based on at least one SSB of the one or more SSBs having the RSRP, the RSRQ, the SINR, or the SNR greater than a threshold.

Aspect 70 is an apparatus for wireless communication including at least one processor coupled to a memory and configured to implement a method as in any of aspects 57 to 69, further including at least one of an antenna or a transceiver coupled to the at least one processor.

Aspect 71 is an apparatus for wireless communication including means for implementing a method as in any of aspects 571 to 69.

Aspect 72 is a computer-readable medium storing computer executable code, where the code when executed by a processor causes the processor to implement a method as in any of aspects 57 to 69.

Aspect 73 is a method of wireless communication of a first UE. The method includes generating an SSB including information indicating whether the second UE can be a relay UE, and transmitting, to a first UE, the SSB.

Aspect 74 is the method of aspect 73, where the SSB is generated to include a MIB-SL, and the MIB-SL indicates either that the second UE is not a relay UE or can be a relay UE.

Aspect 75 is the method of any of aspects 73 and 74, where the MIB-SL is transmitted in a PSBCH within the SSB.

Aspect 76 is the method of any of aspects 73 to 75, where the SSB further indicates an SSID associated with the second UE.

Aspect 77 is an apparatus for wireless communication including at least one processor coupled to a memory and configured to implement a method as in any of aspects 73 to 76, further including at least one of an antenna or a transceiver coupled to the at least one processor.

Aspect 78 is an apparatus for wireless communication including means for implementing a method as in any of aspects 73 to 76.

Aspect 79 is a computer-readable medium storing computer executable code, where the code when executed by a processor causes the processor to implement a method as in any of aspects 73 to 76.

What is claimed is:

1. An apparatus of wireless communication of a first user equipment (UE), comprising:
    a memory; and
    at least one processor coupled to the memory and configured, at least in part with the memory, to:
        receive, from each UE of a set of UEs, a synchronization signal block (SSB) via each receive beam of a set of receive beams at the first UE, each receive beam at the first UE corresponding to one transmit beam of a set of transmit beams at the UE, wherein the SSB received from the UE via each receive beam at the first UE is different from SSBs received from the UE via other receive beams of the set of receive beams at the first UE;
        identify, for each UE of the set of UEs, a transmit-beam receive-beam pair for the UE based on the received SSBs, the transmit-beam receive-beam pair for the UE including one transmit beam from the set of transmit beams at the UE and one receive beam from the set of receive beams at the first UE; and
        receive, from each UE of the set of UEs, a paging message through one or more sidelink channels via at least the transmit-beam receive-beam pair identified for the UE of the set of UEs.

2. The apparatus of claim 1, wherein the at least one processor is further configured to periodically receive the SSBs from each UE of the set of UEs, and wherein the at least one processor is further configured to periodically identify the transmit-beam receive-beam pair for each UE based on the received SSBs.

3. The apparatus of claim 1, wherein the at least one processor is further configured to decode the paging message received through the one or more sidelink channels via at least the transmit-beam receive-beam pair identified for the each UE of the set of UEs.

4. The apparatus of claim 1, further comprising a transceiver coupled to the at least one processor.

5. An apparatus of wireless communication of a second user equipment (UE), comprising:
- a memory; and
- at least one processor coupled to the memory and configured, at least in part with the memory, to:
  - transmit, to a first UE, a synchronization signal block (SSB) through each transmit beam of a set of transmit beams at the second UE, each transmit beam at the second UE corresponding to one receive beam of a set of receive beams at the first UE, wherein the SSB transmitted via each transmit beam at the second UE is different from other SSBs transmitted via other transmit beams of the set of transmit beams at the second UE; and
  - transmit, to the first UE, a paging message through one or more sidelink channels via each transmit beam of the set of transmit beams.

6. The apparatus of claim 5, wherein the at least one processor is further configured to periodically transmit the SSBs to the first UE.

7. The apparatus of claim 5, wherein the at least one processor is further configured to:
- receive, from a base station, a paging relay request message including the paging message for the first UE, the paging relay request message requesting the second UE to transmit the paging message to the first UE.

8. The apparatus of claim 5, further comprising a transceiver coupled to the at least one processor.

9. An apparatus of wireless communication of a first user equipment (UE), comprising:
- a memory; and
- at least one processor coupled to the memory and configured, at least in part with the memory, to:
  - receive, from a second UE, a paging message through one or more sidelink channels via each receive beam of a set of receive beams at the first UE, each receive beam at the first UE corresponding to one transmit beam of a set of transmit beams at the second UE; and
  - decode the received paging message.

10. The apparatus of claim 9, wherein the set of transmit beams comprises N transmit beams and the set of receive beams comprises M receive beams, and
wherein, to receive the paging messages from the second UE, the at least one processor is further configured to receive, for each transmit beam of the N transmit beams, the paging message from a same transmit beam M times through each receive beam of the M receive beams.

11. The apparatus of claim 10, wherein the set of transmit beams comprises beams $t_1, t_2, \ldots, t_N$, and the set of receive beams comprises beams $r_1, r_2, \ldots, r_M$, and
wherein, to receive the paging messages from the second UE, the at least one processor is further configured to receive, for each of $i=1, 2, \ldots, N$, the paging message through beam pair $t_i$-$r_j$ for $j=1, 2, \ldots, M$.

12. The apparatus of claim 9, wherein the set of transmit beams comprises N transmit beams and the set of receive beams comprises M receive beams, and
wherein, to receive the paging messages from the second UE, the at least one processor is further configured to receive, for each receive beam of the M receive beams, the paging message through the receive beam from a different transmit beam of the N transmit beams.

13. The apparatus of claim 12, wherein the set of transmit beams comprises beams $t_1, t_2, \ldots, t_N$, and the set of receive beams comprises beams $r_1, r_2, \ldots, r_M$, and
wherein, to receive the paging messages from the second UE, the at least one processor is further configured to receive, for each of $j=1, 2, \ldots, M$, the paging message through beam pair $t_i$-$r_h$ for $i=1, 2, \ldots, N$.

14. The apparatus of claim 9, wherein the set of transmit beams comprises N transmit beams and the set of receive beams comprises one receive beam, and
wherein, to receive the paging messages from the second UE, the at least one processor is further configured to receive the paging message from each transmit beam of the N transmit beams through the one receive beam.

15. The apparatus of claim 14, wherein the set of transmit beams comprises beams $t_1, t_2, \ldots, t_N$, and the set of receive beams comprises beam r, and
wherein, to receive the paging messages from the second UE, the at least one processor is further configured to receive the paging message through beam pair $t_i$-r for $i=1, 2, \ldots, N$.

16. The apparatus of claim 14, wherein the at least one processor is further configured to:
- change the one receive beam to a second receive beam;
- receive, from the second UE, a second paging message through the one or more sidelink channels from each transmit beam of the set of transmit beams at the second UE through the second receive beam; and
- decode the received second paging message.

17. The apparatus of claim 9, wherein the at least one processor is further configured to:
- transmit, to the second UE in response to receiving and decoding the paging message, an accept message, the accept message indicating at least one transmit beam of the set of transmit beams.

18. The apparatus of claim 17, wherein the at least one processor is further configured to:
- receive, from the second UE, a second paging message through the one or more sidelink channels from each transmit beam of the at least one transmit beam of the second UE through each receive beam of the set of receive beams at the first UE; and
- decode the received second paging message.

19. The apparatus of claim 9, further comprising a transceiver coupled to the at least one processor.

20. An apparatus of wireless communication of a second user equipment (UE), comprising:
- a memory; and
- at least one processor coupled to the memory and configured, at least in part with the memory, to:
  - receive, from a base station, a paging relay request message including a paging message for a first UE, the paging relay request message requesting the second UE to transmit the paging message to the first UE; and
  - transmit, to the first UE based on the received paging relay request message, the paging message through each transmit beam of a set of transmit beams at the second UE, each transmit beam at the second UE corresponding to one receive beam of a set of receive beams at the first UE.

21. The apparatus of claim 20, wherein the set of transmit beams comprises N transmit beams and the set of receive beams comprises M receive beams, and
wherein, to transmit the paging messages to the first UE, the at least one processor is further configured to transmit, for each transmit beam of the N transmit beams, the paging message from a same transmit beam M times for each receive beam of the M receive beams.

22. The apparatus of claim 21, wherein the set of transmit beams comprises beams $t_1, t_2, \ldots, t_N$, and the set of receive beams comprises beams $r_1, r_2, \ldots, r_M$, and wherein, to transmit the paging messages to the first UE, the at least one processor is further configured to transmit, for each of $i=1, 2, \ldots, N$, the paging message through beam pair $t_i$-$r_j$ for $j=1, 2, \ldots, M$.

23. The apparatus of claim 20, wherein the set of transmit beams comprises N transmit beams and the set of receive beams comprises M receive beams, and wherein, to transmit the paging messages to the first UE, the at least one processor is further configured to transmit, for each receive beam of the M receive beams, the paging message for the receive beam from a different transmit beam of the N transmit beams.

24. The apparatus of claim 23, wherein the set of transmit beams comprises beams $t_1, t_2, \ldots, t_N$, and the set of receive beams comprises beams $r_1, r_2, \ldots, r_M$, and wherein, to transmit the paging messages to the first UE, the at least one processor is further configured to transmit, for each of $j=1, 2, \ldots, M$, the paging message through beam pair $t_i$-$r_j$ for $i=1, 2, \ldots, N$.

25. The apparatus of claim 20, wherein the set of transmit beams comprises N transmit beams and the set of receive beams comprises one receive beam, and wherein, to transmit the paging messages to the first UE, the at least one processor is further configured to transmit the paging message from each transmit beam of the N transmit beams for the one receive beam.

26. The apparatus of claim 25, wherein the set of transmit beams comprises beams $t_1, t_2, \ldots, t_N$, and the set of receive beams comprises beam r, and wherein, to transmit the paging messages to the first UE, the at least one processor is further configured to transmit the paging message through beam pair $t_i$-r for $i=1, 2, \ldots, N$.

27. The apparatus of claim 20, wherein the at least one processor is further configured to:

receive, from the first UE, an accept message in response to the transmitted paging message, the accept message indicating at least one transmit beam of the set of transmit beams.

28. The apparatus of claim 27, wherein the at least one processor is further configured to:

transmit, to the first UE based on the accept message indicating the at least one transmit beam, a second paging message through one or more sidelink channels through each transmit beam of the at least one transmit beam of the second UE for each receive beam of the set of receive beams at the first UE.

29. The apparatus of claim 20, further comprising a transceiver coupled to the at least one processor.

* * * * *